US007005518B2

(12) United States Patent
Peng et al.

(10) Patent No.: US 7,005,518 B2
(45) Date of Patent: Feb. 28, 2006

(54) PHTHALOCYANINE DYES

(75) Inventors: Xinzhan Peng, Lincoln, NE (US); Daniel R. Draney, Lincoln, NE (US); Jiyan Chen, Lincoln, NE (US)

(73) Assignee: Li-Cor, Inc., Lincoln, NE (US)

( * ) Notice: Subject to any disclaimer, the term of this patent is extended or adjusted under 35 U.S.C. 154(b) by 57 days.

(21) Appl. No.: 10/693,300

(22) Filed: Oct. 23, 2003

(65) Prior Publication Data
US 2004/0171827 A1 Sep. 2, 2004

Related U.S. Application Data

(60) Provisional application No. 60/421,287, filed on Oct. 25, 2002.

(51) Int. Cl.
C07B 47/00 (2006.01)
C07F 5/10 (2006.01)
A61B 10/00 (2006.01)
C07D 487/22 (2006.01)
C09B 47/04 (2006.01)

(52) U.S. Cl. .................... 540/145; 540/123; 540/125; 540/128; 534/15; 536/29.11; 424/9.362; 424/9.61

(58) Field of Classification Search ............... 540/145, 540/123, 125, 128; 534/15; 536/26.11; 424/9.362, 6.61

See application file for complete search history.

(56) References Cited

U.S. PATENT DOCUMENTS

| 3,094,536 A | 6/1963 | Kenney |
| 4,997,928 A | 3/1991 | Hobbs, Jr. |
| 5,135,717 A | 8/1992 | Renzoni et al. |
| 5,166,197 A * | 11/1992 | Kenney et al. .......... 514/63 |
| 5,171,534 A | 12/1992 | Smith et al. |
| 5,332,666 A | 7/1994 | Prober et al. |
| 5,346,670 A | 9/1994 | Renzoni et al. |
| 5,403,928 A | 4/1995 | Arrhenuis |
| 5,484,778 A * | 1/1996 | Kenney et al. .......... 514/63 |
| 5,846,703 A | 12/1998 | Devlin et al. |
| 5,872,248 A | 2/1999 | Cheng et al. |
| 6,027,709 A | 2/2000 | Little et al. |
| 6,060,598 A | 5/2000 | Devlin et al. |
| 6,323,186 B1 | 11/2001 | Klaubert et al. |
| 2002/0077487 A1 | 6/2002 | Leung et al. |

FOREIGN PATENT DOCUMENTS

| EP | 1 038 938 A2 | 9/2000 |
| WO | WO 89/09282 A1 | 10/1989 |
| WO | WO 91/11533 A1 | 8/1991 |
| WO | WO 91/18007 A1 | 11/1991 |
| WO | WO 92/03575 A1 | 3/1992 |

(Continued)

OTHER PUBLICATIONS

Rywkin, S. et al., "Selective protection against IgG binding to red cells treated with phthalocyanines and red light for viur inactivation", Transfusion (Malden, MA U.S.) (1995), 35(5), 414-20.*

(Continued)

Primary Examiner—Richard Raymond
Assistant Examiner—Paul V. Ward
(74) Attorney, Agent, or Firm—Townsend & Townsend & Crew LLP

(57) ABSTRACT

Fluorescent dyes are disclosed which are useful as reporter groups for labeling biomolecules. The silicon phthalocyanine dyes disclosed are preferably water soluble, isomericly pure, possess high quantum yield, and are useful in bioassays.

36 Claims, 5 Drawing Sheets

FOREIGN PATENT DOCUMENTS

| WO | WO 94/05688 A1 | 3/1994 |
|---|---|---|
| WO | WO 02/24815 A1 | 3/2002 |
| WO | WO 02/096913 A1 | 12/2002 |
| WO | WO 03/082988 A1 | 10/2003 |

OTHER PUBLICATIONS

Rywkin, S. et al., "New phthalocyanines for photodynamic virus inactivation in red blood cell concentrates", Photochemistry & Photobiology (1994), 60(2), 165-70.*

Barrel, B., "DNA sequencing: present limitations and prospects for the future" FASEB Journal 5(1):40-45 (1991).

Bruschi, P. et al., "Sensing properties of polypyrrole-polytetrafluoroethylene composite thin films from granular metal-polymer precursors" Sensors and Actuators A 32:313-317 (1992).

Chen, Z. et al., "Monomerization of cationic phthalocyanine in AOT reversed micelles" Langmuir 17:7957-7959 (2001).

De Filippis, M. et al., "Synthesis of a new water-soluble octa-cationic phthalocyanine derivative for PDT" Tetrahedron Lett 41:91 43-9147 (2000).

Esposito, J. et al., "The synthesis and physical properties of some organo- and organosilicon phthalocyanines" Inorganic Chemistry 5(11): 1979-1984 (1979) (Reprinted from 1966).

Hermanson, G., *Bioconjugate Technicues*, Pierce Chemical Company, Rockford Illnois, Academic Press, pp. 487-492 (1995).

Hu, M. et al., "Hydroxyphthalocyanines as potential photodynamic agents for cancer therapy" J. Med. Chem. 41:1789-1802 (1998).

Innis M. et al., "DNA sequencing with Thermus aquaticus DNA polymerase and direct sequencing of polymerase chain reaction-simplified DNA" Proc Natl Acad Sci U S A. 85(24):9436-40 (1988).

Jouve, C. et al., "Conductive polyethylene as sensitive layer for gas detection" Sensors and Actuators 6 28:75-80 (1995).

Joyner, R. et al., "Diphenoxysilicon phthalocyanine" J. Inorg. Nucl. Chem. 15:387-388 (1980).

Kasuga, K. et al., "Preparation of unsymmetrical phthalocyanine by means of a ring expansion of subphthalocyanine" Inorganica Chimica Acta 196: 127-128 (1992).

Kimura, M. et al., "Catalytic oxidation of 2-mercaptoethanol by cationic water-soluble phthalocyaninetocobalt(II) complexes" J. Porhyrins and Phthalocyanines 1:309-313 (1997).

Kobayashi, N. et al., "New route to unsymmetrical phthalocyanine analogues by the use of structurally distorted subphthalocyanines" J. Am. Chem. Soc. 112:9640-9641 (1990).

Licha, K. "Contrast agents for optical Imaging" *Topics in Current Chemistry* vol. 222, Springer-Verlag Berlin Heidelberg, pp. 1-29 (2002).

Lundberg, B. et al., "Resistivity of a composite conducting polymer as a function of temperature, pressure, and environment: Applications as a pressure and gas concentration transducer" J. Appl. Phys. 80(3):1074-1079 (1988).

Maxam, A. et al., "Sequencing end-labeled DNA with base-specific chemical cleavages" Meth. in Enzym. 85:499-560 (1980).

Middendorf, L. et al., "Sequencing Technology" Chapter in *Biotechnology, vol. 5b, Genomics and Bioinformatics* Rehm and Reed (Eds.), Wiley-VCH Publishers, Germany, (2001) ISBN: 3-527-28328-5.

Minnock, A. et al., "Mechanism of uptake of a cationic water-soluble pyridinium zinc phthalocyanine across the outer membrane of *Escherichia coli*" Antimicrobial Agents and Chemotherapy 44(3):522-527 (2000).

Minnock, A. et al., "Photoinactivation of bacteria. Use of a cationic water-soluble zinc phthalocyanine to photoinactivate both gram-negative and gram positive bacteria" J. Photochem. Photobiol. B: Biol. 32 (3):159-164 (1996) Abstract Only.

Neuburger, G. et al., "Chemically actuated electronic switch" Sensors and Actuators, 81 326-332 (1990).

Ngai, T. et al., "Disstacking of phthalocyanine in water by poly(ethylene oxide)" Langmuir 17:1381-1383 (2001).

Ruschau, G. et al., "0-3 ceramic/polymer composite chemical sensors" Sensors and Actuators 20:269-275 (1989).

Sanger et al., "DNA sequencing with chain-terminating inhibitors" Proc. Natl. Acad. Sci. USA 74(12):5463-7 (1977).

Sastre, A. et al., "Synthesis of novel unsymmetrically substituted push-pull phthalocyanines" J. Org. Chem. 61 (24):8591-8597 (1996).

Sastre, A. et al., "Synthesis of novel unsymmetrical monoaminated phthalocyanines" Tetrahedron Letters 36 (48):8501-8504 (1995).

Sharman, W. et al., "Novel water-soluble phthalocyanines substituted with phosphonate moieties on the benzo rings" Tetrahedron Lett. 37(33):5831-5834 (1996).

Stahl, S. et al., "Solid phase DNA sequencing using the biotin-avidin system" Nucleic Acids Res. 16(7):3025-38 (1988).

Tabor, S. et al., "DNA sequence analysis with a modified bacteriophage T7 DNA polymerase" Proc. Natl. Acad. Sci. USA 84:4767-71 (1987).

Trainor, G., "DNA sequencing, automation, and the human genome" Anal. Chem. 62(5):418-428 (1990).

Wang, X. et al., "Synthesis, spectral and aggregation properties of a novel water-soluble tetracarboxynaphthalocyaninatozinc" Dyes and Pigments 41 (3):193-198 (1999).

Weber, J. et al., "Complexes derived from strong field ligands. XIX. Magnetic properties of transition metal derivatives of 4,4',4'',4'''-tetrasulfophthalocyanine" Inorg. Chem. 4(4):469-471 (1965).

Weitemeyer, A. et al., "Unsymmetrically substituted phthalocyanine derivatives via a modified ring enlargement reaction of unsubstituted subphthalocyanine" J. Org. Chem. 60:4900-4904 (1995).

Yang, Y. et al., "Dimerization of cobalt(II) tetrasulfonated phthalocyanine in water and aqueous alcoholic solutions" Inorg. Chem. 24:1765-1769 (1985).

Zaheer, A. et al., "In vivo near-infrared fluorescence Imaging of osteoblastic activity" Nature Biotech. 19:1148-1154 (2001).

* cited by examiner

PHTHALOCYANINE DYES

CROSS-REFERENCE TO RELATED APPLICATIONS

The present application claims priority to U.S. Provisional Patent Application No. 60/421,287, filed Oct. 25, 2002, the teachings of which are hereby incorporated by reference in its entirety for all purposes.

BACKGROUND OF THE INVENTION

Silicon phthalocyanine dyes with axial ligands were described by Kenney et al., in U.S. Pat. No. 3,094,536 as well as by Joyner, R. D. et al., *J. Inorg. Nucl. Chem.* 1960, 15, 387 and Esposito, J. N. et al., *Inorg. Chem.* 1966, 5, 1979–1984. The method of making silicon phthalocyanine is to react a phthalocyanine precursor e.g., diiminoisoindoline, with silicon tetrachloride to form silicon phthalocyanine directly. Recently, a more flexible method to make silicon phthalocyanine has been disclosed in U.S. Pat. No. 5,872,248, by inserting silicon into a metal-free phthalocyanine. The method includes providing a metal-free phthalocyanine and reacting the metal-free phthalocyanine with $HSiCl_3$ to provide a reaction product, then reacting the reaction product with water; and extracting a silicon phthalocyanine.

A variety of silicon phthalocyanines have been reported. The application of silicon phthalocyanine dyes span wide fields, including for example, colorants, cancer therapy agents, detergents, and non-linear optical materials. However, silicon phthalocyanine dyes that are used as fluorescent reporter groups in bioassays are rare due to the fact that only a few water soluble or reactive silicon phthalocyanine dyes have been reported to date.

One silicon phthalocyanine dye having both water solubility and the activated/reactive functionalities, which is useful as a marker in bioassays, can be found in U.S. Pat. Nos. 6,060,598, 5,846,703, 5,403,928; and in WO 91/18007. These patent documents describe a silicon phthalocyanine dye structure, known as "La Jolla Blue" dye, which features two water-soluble axial polyoxyhydrocarbyl moieties, and also two reactive carboxylic acid groups on their peripheral positions. This dye is a mixture of similar dye structures due to the polymer groups attached.

Water solubility of dyes is a useful feature for bioassays. Even though only a few water-soluble silicon phthalocyanine dyes have been made, other phthalocyanine dye structures with water-solubility are known. These water-soluble phthalocyanine dyes typically have four identical water-soluble substituents on the peripheral positions of the macrocycle. Water soluble groups include phosphonate groups, carboxylate groups, sulfonate groups, quaternary ammonium groups or pyridinium groups (see, for example, Sharman, W. M. et al, *Tetrahedron Lett.* 1996, 37(33), 5831–5834; Wang, X. et al, *Dyes and Pigments* 1999, 41, 193–198; Ngai, T. et al, *Langmuir* 2001, 17, 1381–1383; Weber, J. H. et al, *Inorg. Chem.* 1965, 4(4), 469–471; Yang, Y. C. et al, *Inorg. Chem.* 1985, 24, 1765; Kimura, M. et al, *J. of Porphyrins and Phthalocyanines* 1997, 1, 309–313; Filippis, M. P. D. et al, *Tetrahedron Lett.* 2000, 41, 9143–9147; Chen, Z. et al, *Langmuir* 2001, 17, 7957–7959; Minnock, A. et al, *Antimicrobial Agents and Chemotherapy* 2000, 44(3), 522–527). These water soluble phthalocyanines are isomeric mixtures due to the random substitution of the water-soluble groups on the macrocycle, and do not have an activated or reactive group which can be utilized to conjugate biomolecules.

The presence of an activated/reactive group on the dye structure is another useful feature for a dye in bioassays. To make a mono-functional activated/reactive phthalocyanine dye, mono-substituted unsymmetrical phthalocyanine dye structures are desired for one class of dyes. However, mono- or di-substituted unsymmetrical phthalocyanines are difficult to synthesize. In most cases, mono- or di-substituted unsymmetrical phthalocyanines are transition metal or metal-free phthalocyanines without aqueous solubility (see, for example, Hu, M. et al., *J. Med. Chem.* 1998, 41, 1789–1802; Weitemeyer, A. et al., *J. Org. Chem.* 1995, 60, 4900–4904; Sastre, A. et al., *J. Org. Chem.* 1996, 61, 8591–8597; Sastre A. et al *Tetrahedron Letters* 1995, 36(46), 8501–8504; Kasuga, K. et al *Inorganica Chimica Acta.* 1992, 196, 127–128; and Kobayashi, N. et al., *J. Am. Chem. Soc.* 1990, 112, 9640–9641). Synthetic strategies for mono- or di-substituted phthalocyanines include a mixed condensation of two different dinitriles or diiminoisoindolines, or by a selective synthetic strategy to expand a subphthalocyanine with substituted diiminoisoindolines. The substituents on unsymmetrical phthalocyanines are typically non-reactive groups, but a few reactive mono- or di-substituted unsymmetrical phthalocyanines, such as monohydroxyl zinc or metal-free phthalocyanines (see, Hu, M. et al *J. Med. Chem.* 1998, 41, 1789–1802) and monoaminated zinc or metal-free phthalocyanines (see, Sastre A. et al *Tetrahedron Letters*, 1995, 36(46), 8501–8504) have been made. These reactive groups on the phthalocyanine dyes have low reactivity, are not water-soluble, and are difficult to derivatize.

A group of phthalocyanine dyes and their analogues were described in U.S. Pat. Nos. 5,346,670 and 5,135,717. However, these phthalocyanine dyes are isomeric mixtures due to the random substitution of the water-soluble groups.

In view of the foregoing shortcomings, what is needed in the art are new phthalocyanine dyes that are water soluble, isomericly pure, and which possess high quantum yield. The present invention satisfies these and other needs.

SUMMARY OF THE INVENTION

The present invention provides phthalocyanine dyes (e.g., silicon) that are useful for conjugation to materials, such as biomolecules, and which can be used in bioassays. Preferably, the dyes comprise a water-soluble group, exist as a single isomer, and also possess a mono-functional reactive group or activatible group. Advantageously, these dyes can be tailored to fluoresce at specified wavelengths by incorporating certain functional groups during their synthesis.

As such, in one embodiment, the present invention provides a phthalocyanine dye comprising a luminescent fluorophore moiety having at least one silicon containing aqueous-solubilizing moiety, wherein the phthalocyanine dye has a core atom selected from Si, Ge, Sn, and Al. Preferably, the phthalocyanine dye exists as a single core isomer, essentially free of other isomers and has a reactive or activatible group. The core atom is preferably Si.

In one embodiment, the present invention provides a compound of Formula I:

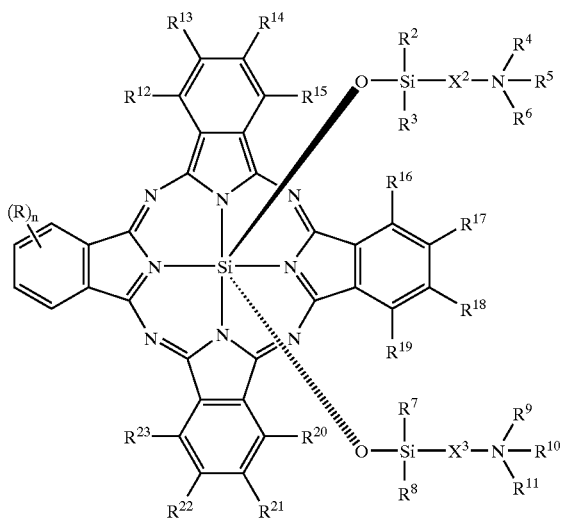

In Formula I, R is selected from -L-Q and -L-Z$^1$.

L, in Formula I, is selected from a direct link, or a covalent linkage, wherein the covalent linkage is linear or branched, cyclic or heterocyclic, saturated or unsaturated, having 1–60 atoms selected from C, N, P, O, and S, wherein L can have additional hydrogen atoms to fill valences (in addition to the 1–60 atoms), wherein the linkage contains any combination of ether, thioether, amine, ester, carbamate, urea, thiourea, oxy or amide bonds; or single, double, triple or aromatic carbon-carbon bonds; or phosphorus-oxygen, phosphorus-sulfur, nitrogen-nitrogen, nitrogen-oxygen, or nitrogen-platinum bonds; or aromatic or heteroaromatic bonds.

Q, in Formula I, is a reactive group or an activatible group.

Z$^1$, in Formula I, is a material, such as a biomolecule. The index "n" is 1 or 2. When n is 1, the phthalocyanine may be substituted either at the 1 or 2 position. If n is 2, each R may be the same or different, or alternatively, they may join to form a 5- or 6-membered ring.

In Formula I, R$^2$, R$^3$, R$^7$, and R$^8$ are each independently selected from optionally substituted alkyl, and optionally substituted aryl.

In Formula I, R$^4$, R$^5$, R$^6$, R$^9$, R$^{10}$, and R$^{11}$, if present, are each independently selected from the group of hydrogen, optionally substituted alkyl, optionally substituted alkanoyl, optionally substituted alkoxycarbonyl, optionally substituted alkylcarbamoyl, and a chelating ligand, wherein at least one of R$^4$, R$^5$, R$^6$, R$^9$, R$^{10}$, and R$^{11}$ comprises a water soluble group, more preferably, at least two of the foregoing comprise water soluble groups, and more preferably, three or more comprise water soluble groups. The nitrogen atom(s) can be trivalent or tetravalent. As used herein, the term "chelating ligand" means for example, when an anhydride form of a chelating agent such as ethylenediamine-N,N,N', N'-tetraacetic acid, is reacted with a primary amine (wherein R$^4$ and R$^5$ are hydrogen, R$^6$ is absent) to form an amide. Suitable chelating agents include, for example, ethylenediamine-N,N,N'-tetraacetic acid (EDTA), diethylenetriamine-N,N,N',N',N"-pentaacetic acid (DTPA), triethylenetetraamine-N,N,N',N",N'",N'"-hexaacetic acid (TTHA), 1,4,7,10-tetraazacyclododecane-1,4,7,10-tetraacetic acid (DOTA) and N,N-bis(carboxymethyl)glycine (NTA). Those of skill in the art will know of other chelating agents suitable for use in the present invention. The presence of a chelating ligand will allow chelating the compound of Formnula I to a rare earth metal such as lanthanide, among other applications.

In Formula I, R$^{12}$, R$^{13}$, R$^{14}$, R$^{15}$, R$^{16}$ R$^{17}$, R$^{18}$, R$^{19}$, R$^{20}$, R$^{21}$, R$^{22}$ and R$^{23}$ are each functional groups, independently selected from hydrogen, halogen, optionally substituted alkylthio, optionally substituted alkylamino and optionally substituted alkoxy.

In an alternative embodiment, at least one of i) R$^{13}$, R$^{14}$, and the carbons to which they are attached, or ii) R$^{17}$, R$^{18}$, and the carbons to which they are attached, or iii) R$^{21}$, R$^{22}$ and the carbons to which they are attached, join to form a fused ring.

In Formula I, X$^2$ and X$^3$ are each independently selected from C$_1$–C$_{10}$ alkylene optionally interrupted by a heteroatom.

In one preferred aspect, the compound of Formula I has an activated peripheral mono-alkoxyl substituent and contains water-soluble axial ligands, such as tris-sulfoalkyl quaternary ammoniums or bis-sulfoalkyl amines.

In another preferred aspect, in the compounds of Formula I, L is an alkylthio linkage and further, R$^{12}$, R$^{15}$, R$^{16}$, R$^{19}$, R$^{20}$, and R$^{23}$ are each independently an optional substituted alkoxy.

In another embodiment, the compound of Formula I has Formula Ia:

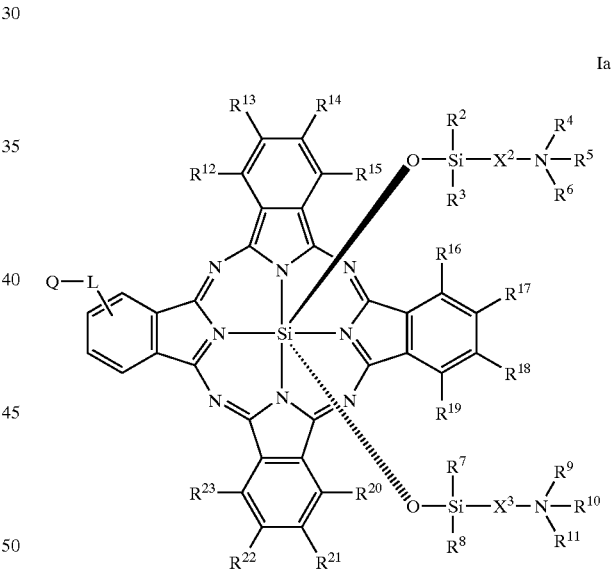

In certain preferred aspects, Q comprises a reactive group for optional attachment to a biomolecule. Preferably, Q comprises a reactive group that is reactive with a carboxyl group, an amine, or a thiol group on the biomolecule. Suitable reactive groups include, but are not limited to, an activated ester, an acyl halide, an alkyl halide, an optionally substituted amine, an anhydride, a carboxylic acid, a carbodiimide, a hydroxyl, iodoacetamide, an isocyanate, an isothiocyanate, a maleimide, an NHS ester, a phosphoramidite, a sulfonate ester, a thiol, or a thiocyanate.

L, in Formula Ia, is selected from a direct link, or a covalent linkage, wherein the covalent linkage is linear or branched, cyclic or heterocyclic, saturated or unsaturated, having 1–60 atoms selected from C, N, P, O, wherein L can have additional hydrogen atoms to fill valences (in addition to the 1–60 atoms), wherein the linkage contains any combination of ether, thioether, amine, ester, carbamate, urea, thiourea, oxy or amide bonds; or single, double, triple or aromatic carbon-carbon bonds; or phosphorus-oxygen, phosphorus-sulfur, nitrogen-nitrogen, nitrogen-oxygen, or nitrogen-platinum bonds; or aromatic or heteroaromatic bonds.

In Formula Ia, $R^2$, $R^3$, $R^7$, and $R^8$ are each independently selected from optionally substituted alkyl, and optionally substituted aryl.

In Formula Ia, $R^4$, $R^5$, $R^6$, $R^9$, $R^{10}$, and $R^{11}$, if present, are each independently selected from the group of hydrogen, optionally substituted alkyl, optionally substituted alkanoyl, optionally substituted alkoxycarbonyl, optionally substituted alkylcarbamoyl and a chelating ligand, wherein at least one of $R^4$, $R^5$, $R^6$, $R^9$, $R^{10}$, and $R^{11}$ comprises a water soluble group, more preferably, at least two of the foregoing comprise water soluble groups, and more preferably, three or more comprise water soluble groups. As used herein, "water soluble group" means a group comprising one or more polar and/or ionic substituents that improves the solubility of the overall molecule in aqueous media. The nitrogen atom(s) can be trivalent or tetravalent.

In Formula Ia, $R^{12}$, $R^{13}$, $R^{14}$, $R^{15}$, $R^{16}$ $R^{17}$, $R^{18}$, $R^{19}$, $R^{20}$, $R^{21}$, $R^{22}$ and $R^{23}$ are each functional groups, independently selected from hydrogen, halogen, optionally substituted alkylthio, optionally substituted alkylamino and optionally substituted alkoxy.

In an alternative embodiment, at least one of i) $R^{13}$, $R^{14}$, and the carbons to which they are attached, or ii) $R^{17}$, $R^{18}$, and the carbons to which they are attached, or iii) $R^{21}$, $R^{22}$ and the carbons to which they are attached, join to form a fused ring.

In Formula Ia, $X^2$ and $X^3$ are each independently selected from $C_1$–$C_{10}$ alkylene optionally interrupted by a heteroatom.

In another preferred embodiment, the compound of Formula I has Formula If:

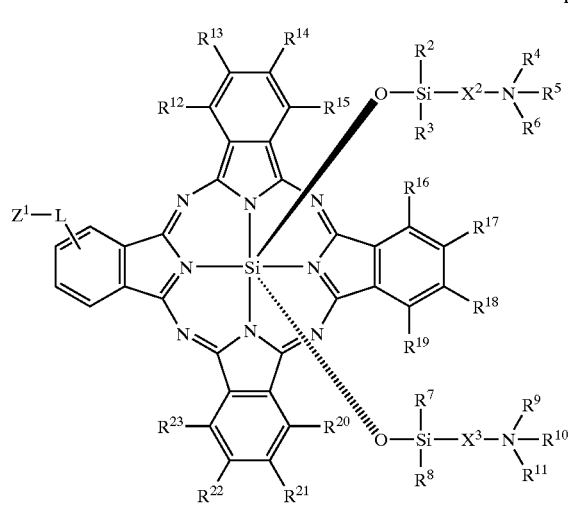

If

In Formula If, $Z^1$ is a material such as a biomolecule or solid surface. Suitable biomolecules include, but are not limited to, a small molecule, a cell, a liposome, a protein, a peptide, an enzyme substrate, a hormone, an antibody, an antigen, a hapten, an avidin, a streptavidin, biotin, a carbohydrate, an oligosaccharide, a polysaccharide, a nucleic acid, a deoxy nucleic acid, a fragment of DNA, a fragment of RNA, nucleotide triphosphates, acyclo terminator triphosphates, PNA and the like.

L, in Formula If, is selected from a direct link, or a covalent linkage, wherein the covalent linkage is linear or branched, cyclic or heterocyclic, saturated or unsaturated, having 1–60 atoms selected from C, N, P, O, wherein L can have additional hydrogen atoms to fill valences (in addition to the 1–60 atoms), wherein the linkage contains any combination of ether, thioether, amine, ester, carbamate, urea, thiourea, oxy or amide bonds; or single, double, triple or aromatic carbon-carbon bonds; or phosphorus-oxygen, phosphorus-sulfur, nitrogen-nitrogen, nitrogen-oxygen, or nitrogen-platinum bonds; or aromatic or heteroaromatic bonds.

In Formula If, $R^2$, $R^3$, $R^7$, and $R^8$ are each independently selected from optionally substituted alkyl, and optionally substituted aryl.

In Formula $R^4$, $R^5$, $R^6$, $R^9$, $R^{10}$, and $R^{11}$, if present, are each independently selected from the group of hydrogen, optionally substituted alkyl, optionally substituted alkanoyl, optionally substituted alkoxycarbonyl, optionally substituted alkylcarbamoyl and a chelating ligand, wherein at least one of $R^4$, $R^5$, $R^6$, $R^9$, $R^{10}$, and $R^{11}$ comprises a water soluble group, more preferably, at least two of the foregoing comprise water soluble groups, and more preferably, three or more comprise water soluble groups. The nitrogen atom(s) can be trivalent or tetravalent.

In Formula If $R^{12}$, $R^{13}$, $R^{14}$, $R^{15}$, $R^{16}$ $R^{17}$, $R^{18}$, $R^{19}$, $R^{20}$, $R^{21}$, $R^{22}$ and $R^{23}$ are each functional groups, independently selected from hydrogen, halogen, optionally substituted alkylthio, and optionally substituted alkoxy.

In an alternative embodiment, at least one of i) $R^{13}$, $R^{14}$, and the carbons to which they are attached, or ii) $R^{17}$, $R^{18}$, and the carbons to which they are attached, or iii) $R^{21}$, R22 and the carbons to which they are attached, join to form a fused benzene ring.

In Formula If, $X^2$ and $X^3$ are each independently selected from $C_1$–$C_{10}$ alkylene optionally interrupted by a heteroatom.

In still another embodiment, the present invention provides a process for making a dye-labeled biomolecule, comprising: contacting a biomolecule and an optional activating reagent with a compound having Formula Ia, thereby making a dye-labeled biomolecule.

In yet another embodiment, the present invention provides a kit comprising a compound of Formula I and instructions for use. In a preferred embodiment, the kit further comprises a buffer.

These and other aspects, objects and advantages of the present invention will become more apparent when read with the detailed description and figures which follow.

DETAILED DESCRIPTION OF THE INVENTION

I. Definitions

Figure 1:
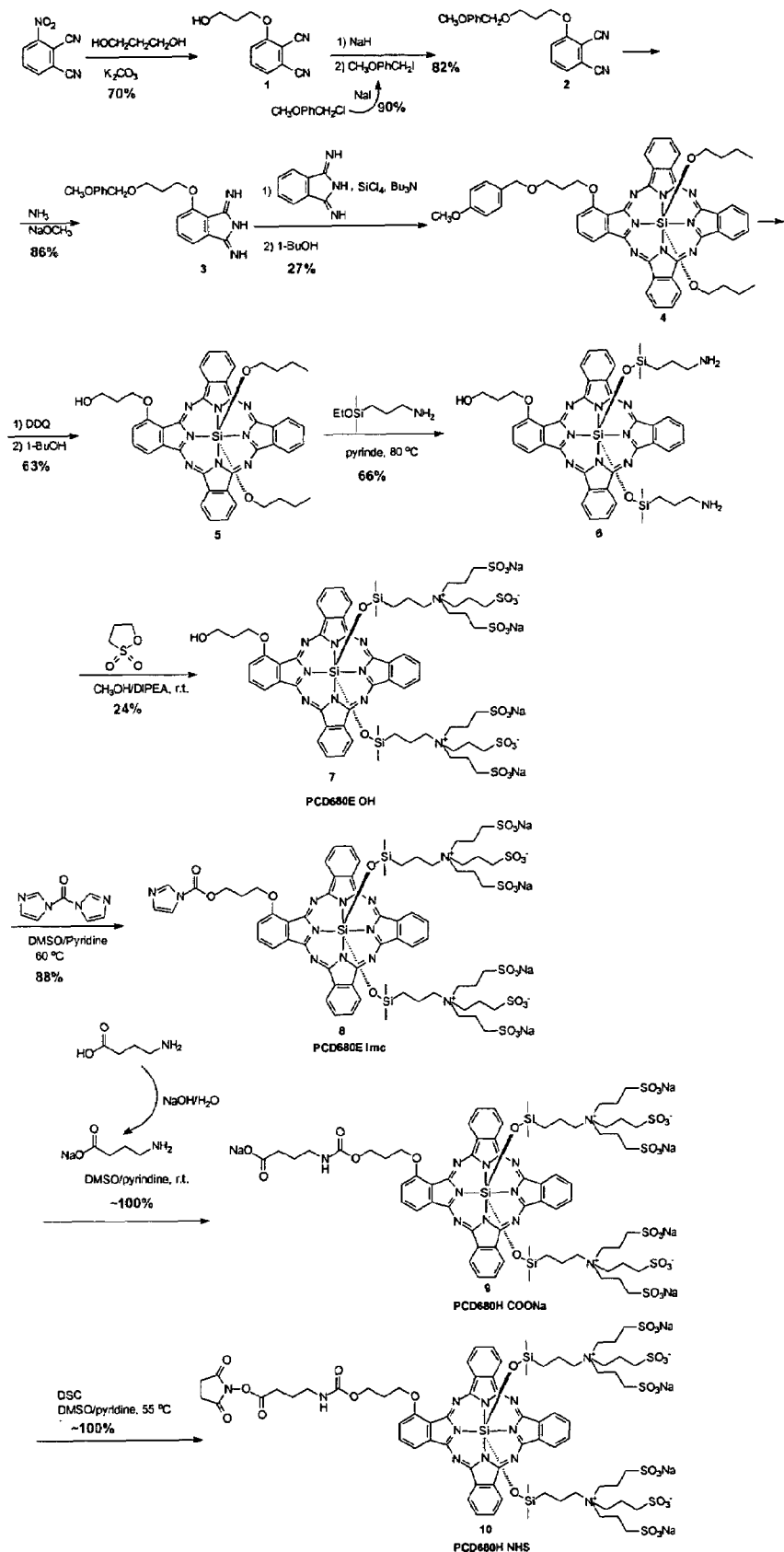
FIG. 1 illustrates one synthesis method for compounds of the present invention.
Figure 2:
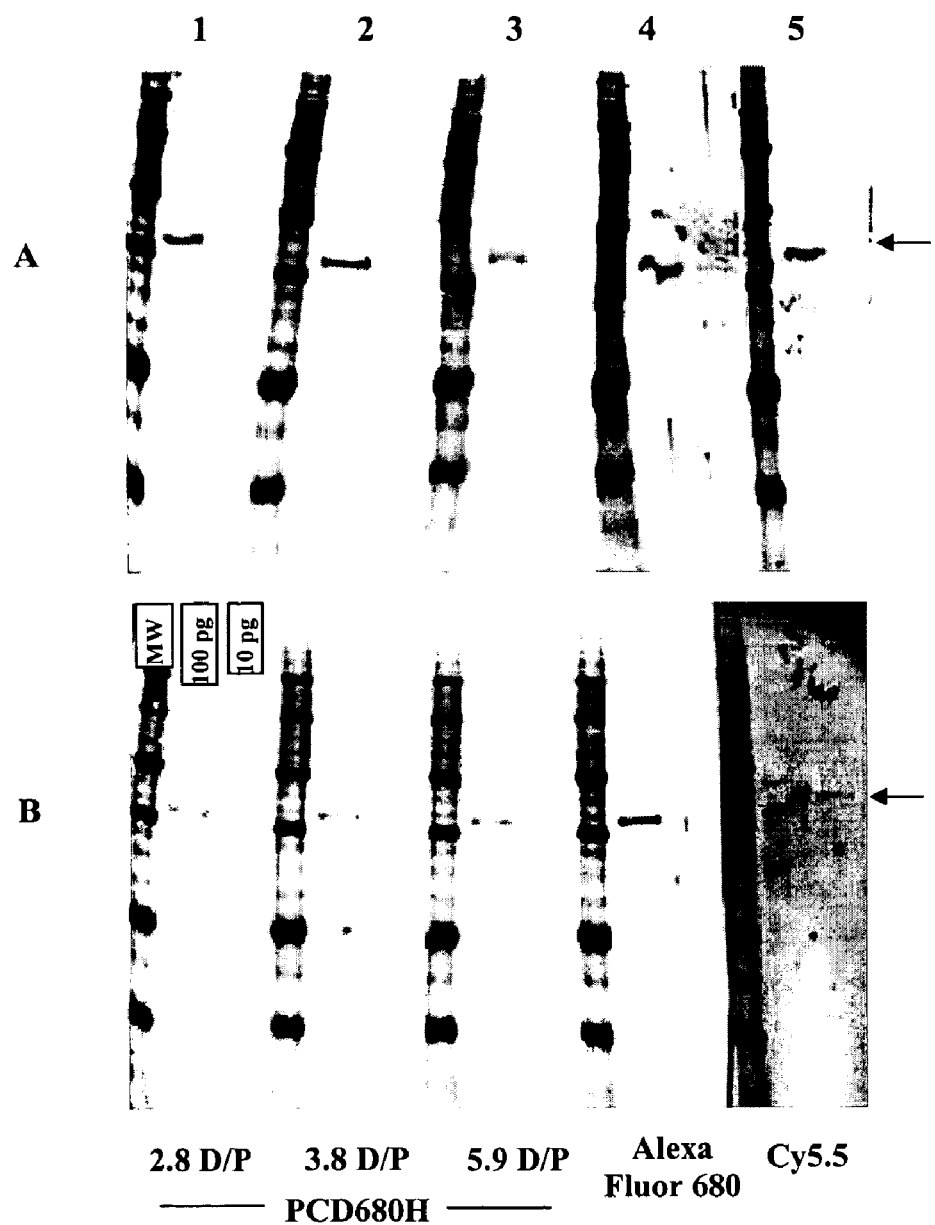
FIG. 2 illustrates detection of transferrin protein on Western blots using dye-labeled secondary antibodies. Purified human transferrin protein (100 pg or 10 pg) was separated by SDS-PAGE and then electrophoretically transferred to nitrocellulose (panels 1–5 A) or PVDF (panels 1–5 B) membranes. Fluorescent molecular weight markers (MW) were also present on each blot. Blots were blocked in a solution of 0.1% sodium caseinate in PBS for 1 hr (antibodies were subsequently diluted in this blocking solution, with the addition of 0.2% Tween-20 for nitrocellulose membranes and 0.02% SDS for PVDF membranes). Rabbit anti-transferrin primary antibody (DAKO) was diluted at 1:1000 and incubated with the blots for 1 hr. Goat anti-rabbit secondary antibodies labeled with PCD680H (panels 1–3) or with Alexa Fluor 680 or Cy5.5 for comparison (panels 4&5) were used for detection at a concentration of 0.2 ug/ml and incubated with the blots for 1 hr. Dye/protein (D/P) ratio is indicated for PCD680 antibodies; Alexa Fluor 680 and Cy5.5 antibodies were obtained commercially from Molecular Probes and Rockland Immunochemicals, respectively. After antibody incubations and washing, blots were imaged with the Odyssey Infrared Imaging System at 169 um resolution to visualize the near-infrared fluorophores. PCD680H-labeled secondary antibodies displayed excellent detection sensitivity on Western blots, and could detect 10 pg purified transferrin protein with similar signal intensity to Alexa Fluor 680 and Cy5.5.
Figure 3:
FIG. 3 shows transferrin detection on Western blots using increased amounts of PCD680H secondary antibody. As in FIG. 2, purified human transferrin was electrophoresed and transferred to nitrocellulose (panels 1–5 A) or PVDF (panels 1–5 B). Blocking and antibody dilution were performed in 0.1% sodium caseinate/PBS plus detergents as described in FIG. 2. Rabbit anti-transferrin primary antibody (DAKO) was diluted at 1:1000 and incubated with the blots for 1 hr. Goat anti-rabbit secondary antibodies labeled with PCD680H (or Alexa Fluor 680 for comparison) were used for detection. Alexa Fluor 680 secondary antibody (panel 1) was used at 0.2 ug/ml. PCD680H antibodies were used at 0.8 ug/ml (panels 2–4) or 1.6 ug/ml (panel 5), and D/P ratios were as indicated. After antibody incubations and washing, blots were imaged with the Odyssey Infrared Imaging System at 169 um resolution. Using increased concentrations of PCD680H antibody boosted transferrin signal to levels that were as strong or stronger than detection with Alexa Fluor 680, yet retained acceptable levels of membrane background.
Figure 4:
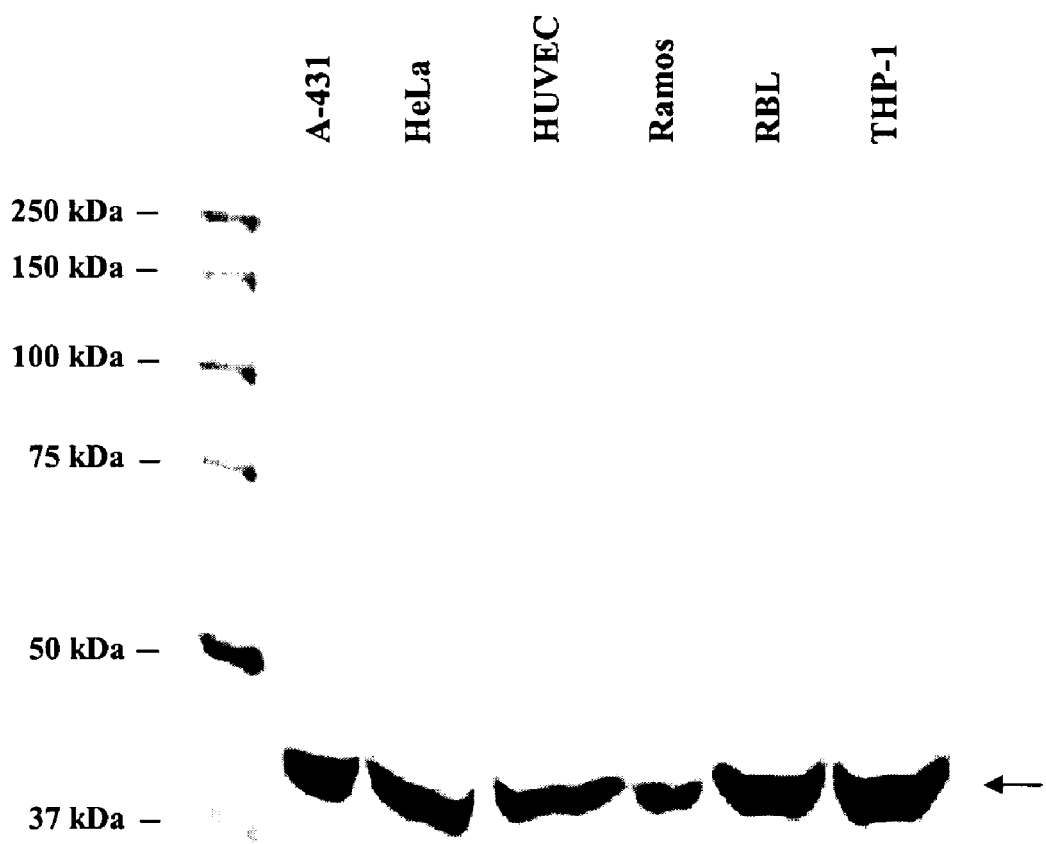
FIG. 4 shows specific detection of actin in complex protein mixtures on a Western blot using PCD680H secondary antibody. 10 ul aliquots of six different whole cell lysates were electrophoresed and transferred to PVDF membrane. Molecular weight marker was loaded in the far left lane. Lysates were made from the following types of human cultured cells (left to right): A-431, HeLa, HUVEC, Ramos, RBL, and THP-1. Similar amounts of total protein were loaded in each lane. Blocking and antibody dilution were performed in 0.1% sodium caseinate/PBS plus detergents as described in FIG. 2. Mouse anti-actin primary antibody (Chemicon) was diluted at 1:1000 and incubated with the blot for 1 hr. Goat anti-mouse secondary antibody labeled with PCD680H at a D/P ratio of 3.8 was used for detection at a concentration of 0.4 ug/ml, and incubated with the blot for 1 hr. After antibody incubations and washing, blots were imaged with the Odyssey Infrared Imaging System at 84 um resolution. The actin band is indicated with an arrow. Although hundreds of proteins are present throughout each lane, detection with PCD680H secondary antibody is highly specific and reveals a single strong actin band in each lysate lane at the appropriate molecular weight of 42 kDa, with very little background. Signal and specificity were comparable to that seen when Alexa Fluor 680 goat anti-mouse secondary antibody was used for detection (not shown).

"Alkanoyl" means an alkyl-C(O) group wherein the alkyl group is as defined herein. Representative alkanoyl groups include methoyl, ethoyl, and the like.

"Alkoxy" means an alkyl-O— group wherein the alkyl group is as defined herein. Representative alkoxy groups include methoxy, ethoxy, n-propoxy, i-propoxy, n-butoxy, heptoxy, and the like.

"Alkoxyalkyl" means an alkyl-O-alkylene- group wherein alkyl and alkylene are as defined herein. Representative alkoxyalkyl groups include methoxyethyl, ethoxymethyl, n-butoxymethyl and cyclopentylmethyloxyethyl.

"Alkoxycarbonyl" means an ester group; i.e., an alkyl-O—CO— group wherein alkyl is as defined herein. Representative alkoxycarbonyl groups include methoxycarbonyl, ethoxycarbonyl, t-butyloxycarbonyl, and the like.

"Alkylcarbamoyl" means an alkyl-NH—CO— group wherein alkyl group is defined herein. Preferred alkylcarbamoyl groups are those wherein the alkyl group is lower alkyl.

"Alkoxycarbonylalkyl" means an alkyl-O—CO-alkylene- group wherein alkyl and alkylene are as defined herein. Representative alkoxycarbonylalkyl include methoxycarbonylmethyl, and ethoxycarbonylmethyl, methoxycarbonyl ethyl, and the like.

"Alkyl" means an aliphatic hydrocarbon group, which may be straight or branched-chain, having about 1 to about 20 carbon atoms in the chain. Preferred alkyl groups have 1 to about 12 carbon atoms in the chain. Branched means that one or more lower alkyl groups such as methyl, ethyl or propyl are attached to a linear alkyl chain. "Lower alkyl" means 1 to about 4 carbon atoms in the chain, which may be straight or branched. The alkyl is optionally substituted with one or more "alkyl group substituents" which may be the same or different, and include halo, cycloalkyl, hydroxy, alkoxy, amino, carbamoyl, acylamino, aroylamino, carboxy, alkoxycarbonyl, aralkyloxycarbonyl, or heteroaralkyloxycarbonyl. Representative alkyl groups include methyl, trifluoromethyl, cyclopropylmethyl, cyclopentylmethyl, ethyl, n-propyl, i-propyl, n-butyl, 1-butyl, n-pentyl, 3-pentyl, methoxyethyl, carboxymethyl, methoxycarbonylethyl, benzyloxycarbonylmethyl, and pyridylmethyloxycarbonylmethyl.

"Alkylene" means a straight or branched bivalent hydrocarbon chain of 1 to about 6 carbon atoms. The alkylene is optionally substituted with one or more "alkylene group substituents" which may be the same or different, and include halo, cycloalkyl, hydroxy, alkoxy, carbamoyl, carboxy, cyano, aryl, heteroaryl or oxo. The alkylene is optionally interrupted by a heteroatom, i.e., a carbon thereof is substituted by, —O—, —S(=O)$_m$ (where m is 0–2), or —NR'-(where R' is lower alkyl). Preferred alkylene groups are the lower alkylene groups having 1 to about 4 carbon atoms. Representative alkylene groups include methylene, ethylene, and the like.

"Alkyleneoxycarbonyl", means an ester group; i.e., an alkylene-O—CO— group wherein alkylene is as defined herein.

"Alkylenecarbamoyl" means an alkylene-NH—CO— group wherein alkylene group is defined herein. Preferred alkylenecarbamoyl groups are those wherein the alkylene group is lower alkylene.

"Alkylenesulfonyl" means an alkylene-$SO_2$— group wherein the alkylene group is as defined herein. Preferred alkylenesulfonyl groups are those wherein the alkylene group is lower alkylene.

Alkylenesulfonylcarbamoyl means an alkylene-$SO_2$—NH—CO— group wherein alkylene group is defined herein.

"Alkenylene" means a straight or branched bivalent hydrocarbon chain containing at least one carbon—carbon double bond. The alkenylene is optionally substituted with one or more "alkylene group substituents" as defined herein. The alkenylene is optionally interrupted by a heteroatom, i.e., a carbon thereof is substituted by, —O—, —$S(O)_m$— (where m is 0–2), or —NR'-(where R' is lower alkyl). Representative alkenylene include —CH=CH—, —$CH_2$ CH=CH—, —C($CH_3$)=CH—, —$CH_2$ CH=CH$CH_2$—, and the like.

"Alkylsulfinyl" means an alkyl-SO— group wherein the alkyl group is as defined above. Preferred alkylsulfinyl groups are those wherein the alkyl group is lower alkyl.

"Alkylsulfonyl" means an alkyl-$SO_2$— group wherein the alkyl group is as defined herein. Preferred alkylsulfonyl groups are those wherein the alkyl group is lower alkyl.

"Alkylsulfonylcarbamoyl" means an alkyl-$SO_2$—NH—CO— group wherein alkyl group is defined herein. Preferred alkylsulfonylcarbamoyl groups are those wherein the alkyl group is lower alkyl.

"Alkylthio" means an alkyl-S— group wherein the alkyl group is as defined herein. Preferred alkylthio groups are those wherein the alkyl group is lower alkyl. Representative alkylthio groups include methylthio, ethylthio, i-propylthio, heptylthio, and the like.

"Alkynyl" means a straight or branched aliphatic hydrocarbon group of 2 to about 15 carbon atoms which contains at least one carbon-carbon triple bond. Preferred alkynyl groups have 2 to about 12 carbon atoms. More preferred alkynyl groups contain 2 to about 4 carbon atoms. "Lower alkynyl" means alkynyl of 2 to about 4 carbon atoms. The alkynyl group may be substituted by one or more alkyl group substituents as defined herein. Representative alkynyl groups include ethynyl, propynyl, n-butynyl, 2-butynyl, 3-methylbutynyl, n-pentynyl, heptynyl, octynyl, decynyl, and the like.

"Alkynyloxy" means an alkynyl-O— group wherein the alkynyl group is as defined herein. Representative alkynyloxy groups include propynyloxy, 3-butynyloxy, and the like.

"Amino" means a group of formula $Y_1Y_2N$— wherein $Y_1$ and $Y_2$ are independently hydrogen; acyl; or alkyl, or $Y_1$ and $Y_2$ taken together with the N through which $Y_1$ and $Y_2$ are linked form a 4 to 7 membered azaheterocyclyl. Representative amino groups include amino ($H_2N$—), methylamino, dimethylamino, diethylamino, and the like.

"Aminoalkyl" means an amino-alkylene- group wherein amino and alkylene are defined herein. Representative aminoalkyl groups include aminomethyl, aminoethyl, dimethylaminomethyl, and the like.

"Aralkenyl" means an aryl-alkenylene- group wherein aryl and alkenylene are as defined herein. Preferred aralkenyls contain a lower alkenylene moiety. A representative aralkenyl group is 2-phenethenyl.

"Aralkyloxy" means an aralkyl-O— group wherein aralkyl is defined herein. Representative aralkyloxy groups include benzyloxy, naphth-1-ylmethoxy, naphth-2-ylmethoxy, and the like.

"Aralkyloxyalkyl" means an aralkyl-O-alkylene- group wherein aralkyl and alkylene are as defined herein. A representative aralkyloxyalkyl group is benzyloxyethyl.

"Aralkyloxycarbonyl" means an aralkyl-O—CO-group wherein aralkyl is as defined herein. A representative aralkoxycarbonyl group is benzyloxycarbonyl.

"Aralkyl" means an aryl-alkylene- group wherein aryl and alkylene are as defined herein. Preferred aralkyls contain a lower alkyl moiety. Representative aralkyl groups include benzyl, 2-phenethyl, naphthlenemethyl, and the like.

"Aralkylthio" means an aralkyl-S— group wherein aralkyl is as defined herein. A representative aralkylthio group is benzylthio.

"Aroyl" means an aryl-CO— group wherein aryl is defined herein. Representative aroyl include benzoyl, naphth-1-oyl and naphth-2-oyl.

"Aryl" means an aromatic monocyclic or multicyclic ring system of 6 to about 14 carbon atoms, preferably of 6 to about 10 carbon atoms. The aryl is optionally substituted with one or more "ring system substituents" which may be the same or different, and are as defined herein. Representative aryl groups include phenyl and naphthyl.

"Arylene" means a bivalent aromatic monocyclic or multicyclic ring system radical of 6 to about 14 carbon atoms, preferably of 6 to about 10 carbon atoms. The arylene radical is optionally substituted with one or more "ring system substituents" which may be the same or different, and are as defined herein. Representative aryl groups include phenylene and naphthylene.

"Arylenensulfonyl" means an arylene-$SO_2$— group wherein the arylene group is as defined herein.

"Aryleneoxycarbonyl" means an ester group; i.e., an arylene-O—CO— group wherein arylene is as defined herein.

"Arylenecarbamoyl" means an arylene-NHCO— group, wherein arylene is defined herein.

"Arylenesulfonylcarbamoyl" means an arylene-$SO_2$—NH—CO— group wherein arylene is defined herein.

"Arylsulfinyl" means an aryl-SO— group wherein the aryl group is as defined herein.

"Aralkynyl" means an aryl-alkynylene- group wherein aryl and alkynylene are defined herein. Representative aralkynyl groups include phenylacetylenyl and 3-phenylbut-2-ynyl.

"Arylcarbamoyl" means an aryl-NHCO— group, wherein aryl is defined herein.

"Arylsulfinyl" means an aryl-SO— group wherein the aryl group is as defined herein. Preferred arylsulfinyl groups are those wherein the aryl group is a substituted phenyl.

"Arysulfonyl" means an aryl-$SO_2$— group wherein the aryl group is as defined herein. Preferred arylsulfonyl groups are those wherein the aryl group is a substituted phenyl.

"Arylsulfonylcarbamoyl" means an aryl-$SO_2$—NH—CO— group wherein aryl group is defined herein. Preferred arylsulfonylcarbamoyl groups are those wherein the aryl group is a substituted phenyl.

"Benzyl" means a phenyl-$CH_2$— group. Substituted benzyl means a benzyl group in which the phenyl ring is substituted with one or more ring system substituents. Representative benzyl include 4-bromobenzyl, 4-methoxybenzyl, 2,4-dimethoxybenzyl, and the like.

"Carbamoyl" means a group of formula $Y_1Y_2$ NCO— wherein $Y_1$ and $Y_2$ are independently hydrogen; acyl; or alkyl, or $Y_1$ and $Y_2$ taken together with the N through which $Y_1$ and $Y_2$ are linked form a 4 to 7 membered azaheterocyclyl. Representative carbamoyl groups include carbamyl ($H_2$NCO—), dimethylaminocarbamoyl ($Me_2$ NCO—), and the like.

"Carboxy" and "carboxyl" mean a HO(O)C— group (i.e. a carboxylic acid).

"Carboxyalkyl" means a HO(O)C-alkylene- group wherein alkylene is defined herein. Representative carboxyalkyls include carboxymethyl and carboxyethyl.

"Cycloalkyl" means a non-aromatic mono- or multicyclic ring system of about 3 to about 10 carbon atoms, preferably of about 5 to about 10 carbon atoms. Preferred cycloalkyl rings contain about 5 to about 6 ring atoms. The cycloalkyl is optionally substituted with one or more "ring system substituents" which may be the same or different, and are as defined herein. Representative monocyclic cycloalkyl include cyclopentyl, cyclohexyl, cycloheptyl, and the like. Representative multicyclic cycloalkyl include 1-decalin, norbornyl, adamantyl, and the like. The prefix spiro before cycloalkyl means that geminal substituents on a carbon atom are replaced to form 1,1-cycloalkyl. "Cycloalkylene" means a bivalent cycloalkyl having about 4 to about 8 carbon atoms. Preferred cycloalkylenyl groups include 1,2-, 1,3-, or 1,4- cis or trans-cyclohexylene.

"Cycloalkenyl" means a non-aromatic mono- or multicyclic ring system of about 3 to about 10 carbon atoms, preferably of about 5 to about 10 carbon atoms which contains at least one carbon—carbon double bond. Preferred cycloalkylene rings contain about 5 to about 6 ring atoms. The cycloalkenyl is optionally substituted with one or more "ring system substituents" which may be the same or different, and are as defined herein. Representative monocyclic cycloalkenyl include cyclopentenyl, cyclohexenyl, cycloheptenyl, and the like. A representative multicyclic cycloalkenyl is norbornylenyl.

"Halo" or "halogen" mean fluoro, chloro, bromo, or iodo.

"Heteroaralkenyl" means a heteroaryl-alkenylene- group wherein heteroaryl and alkenylene are as defined herein. Preferred heteroaralkenyls contain a lower alkenylene moiety. Representative heteroaralkenyl groups include 4-pyridylvinyl, thienylethenyl, pyridylethenyl, imidazolylethenyl, pyrazinylethenyl, and the like.

"Heteroaralkyl" means a heteroaryl-alkylene- group wherein heteroaryl and alkylene are as defined herein. Preferred heteroaralkyls contain a lower alkylene group. Representative heteroaralkyl groups include thienylmethyl, pyridylmethyl, imidazolylmethyl, pyrazinylmethyl, and the like.

"Heteroaralkyloxy" means an heteroaralkyl-O— group wherein heteroaralkyl is as defined herein. A representative heteroaralkyloxy group is 4-pyridylmethyloxy.

"Heteroaralkynyl" means an heteroaryl-alkynylene- group wherein heteroaryl and alkynylene are as defined herein. Preferred heteroaralkynyls contain a lower alkynylene moiety. Representative heteroaralkynyl groups include pyrid-3-ylacetylenyl, quinolin-3-ylacetylenyl, 4-pyridylethynyl, and the like.

"Heteroaroyl" means an means a heteroaryl-CO— group wherein heteroaryl is as defined herein. Representative heteroaroyl groups include thiophenoyl, nicotinoyl, pyrrol-2-ylcarbonyl, pyridinoyl, and the like.

"Heterocyclyl" means a non-aromatic saturated monocyclic or multicyclic ring system of about 3 to about 10 ring atoms, preferably about 5 to about 10 ring atoms, in which one or more of the atoms in the ring system is/are element(s) other than carbon, for example nitrogen, oxygen or sulfur. Preferred heterocyclyls contain about 5 to about 6 ring atoms. The prefix aza, oxa or thia before heterocyclyl means that at least a nitrogen, oxygen or sulfur atom respectively is present as a ring atom. The heterocyclyl is optionally substituted by one or more "ring system substituents" which may be the same or different, and are as defined herein. The nitrogen or sulphur atom of the heterocyclyl is optionally oxidized to the corresponding N-oxide, S-oxide or S,S-dioxide. Representative monocyclic heterocyclyl rings include piperidyl, pyrrolidinyl, piperazinyl, morpholinyl, thiomorpholinyl, thiazolidinyl, 1,3-dioxolanyl, 1,4-dioxanyl, tetrahydrofuranyl, tetrahydrothiophenyl, tetrahydrothiopyranyl, and the like.

"Heteroaryl" means an aromatic monocyclic or multicyclic ring system of about 5 to about 14 ring atoms, preferably about 5 to about 10 ring atoms, in which one or more of the atoms in the ring system is/are element(s) other than carbon, for example nitrogen, oxygen or sulfur. Preferred heteroaryls contain about 5 to about 6 ring atoms. The "heteroaryl" is optionally substituted by one or more "ring system substituents" which may be the same or different, and are as defined herein. The prefix aza, oxa or thia before heteroaryl means that at least a nitrogen, oxygen or sulfur atom respectively is present as a ring atom. A nitrogen atom of a heteroaryl is optionally oxidized to the corresponding N-oxide. Representative heteroaryls include pyrazinyl, furanyl, thienyl, pyridyl, pyrimidinyl, isoxazolyl, isothiazolyl, oxazolyl, thiazolyl, pyrazolyl, furazanyl, pyrrolyl, pyrazolyl, triazolyl, 1,2,4-thiadiazolyl, pyrazinyl, pyridazinyl, quinoxalinyl, phthalazinyl, imidazo[1,2-a]pyridine, imidazo[2,1-b]thiazolyl, benzofurazanyl, indolyl, azaindolyl, benzimidazolyl, benzothienyl, quinolinyl, imidazolyl, thienopyridyl, quinazolinyl, thienopyrimidyl, pyrrolopyridyl, imidazopyridyl, isoquinolinyl, benzoazaindolyl, 1,2,4-triazinyl, benzothiazolyl and the like.

"Heteroarylene" means an bivalent aromatic monocyclic or multicyclic ring system radical of about 5 to about 14 ring atoms, preferably about 5 to about 10 ring atoms, in which one or more of the atoms in the ring system is/are element(s) other than carbon, for example nitrogen, oxygen or sulfur. Preferred heteroarylenes contain about 5 to about 6 ring atoms. The "heteroarylene" is optionally substituted by one or more "ring system substituents" which may be the same or different, and are as defined herein.

"Heteroaryleneoxycarbonyl" means a heteroarylene-O—CO— group wherein heteroarylene is as defined herein.

"Heteroarylenecarbamoyl" means a heteroarylene-NH—CO— group wherein heteroarylene group is defined herein.

"Heteroarylenesufonylcarbamoyl" means a heteroarylene-$SO_2$—NH—CO— group wherein heteroarylene group is defined herein.

"Hydroxyalkyl" means an alkyl group as defined herein substituted with one or more hydroxy groups. Preferred hydroxyalkyls contain lower alkyl. Representative hydroxyalkyl groups include hydroxymethyl and 2-hydroxyethyl.

"Oxo" means a group of formula >C═O (i.e., a carbonyl group).

"Phosphoramidityl" means a trivalent phosphorous atom bonded to two —OR groups and a nitrogen atom wherein the nitrogen is optionally substituted.

"Ring system substituents" mean substituents attached to aromatic or non-aromatic ring systems inclusive of hydrogen, alkyl, aryl, heteroaryl, aralkyl, aralkenyl, aralkynyl, heteroaralkyl, heteroaralkenyl, heteroaralkynyl, hydroxy, hydroxyalkyl, alkoxy, aryloxy, aralkoxy, acyl, aroyl, halo, nitro, cyano, carboxy, alkoxycarbonyl, aryloxycarbonyl, aralkoxycarbonyl, alkylsulfonyl, arylsulfonyl, heteroarylsulfonyl, alkylsulfinyl, arylsulfinyl, carboxyalkyl, heteroarylsulfinyl, alkylthio, arylthio, nitrile, $NO_2$ heteroarylthio, aralkylthio, heteroaralkylthio, cycloalkyl, cycloalkenyl, heterocyclyl, heterocyclenyl, aryidiazo, heteroaryldiazo, amidino, and the like.

II. Compounds

In one embodiment, the present invention provides phthalocyanine dyes (e.g., silicon) that are preferably water soluble and which are useful for labeling biomolecules. The phthalocyanine dye comprises a luminescent fluorophore moiety having at least one silicon containing aqueous-solubilizing moiety such as tris-sulfoalkyl quaternary ammoniums or bis-sulfoalkyl amines. The phthalocyanine dye has a core atom such as Si, Ge, Sn, or Al. The phthalocyanine dye exists as a single core isomer, essentially free of other isomers and has a reactive or activatible group.

In one embodiment, the present invention provides a compound having Formula I:

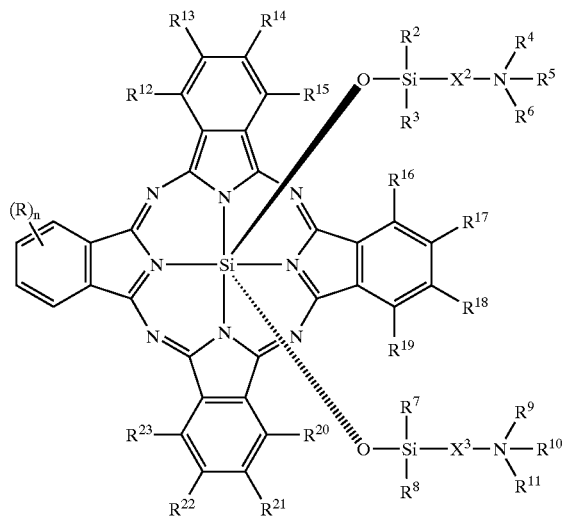

I wherein: R, $R^2$, $R^3$, $R^4$ $R^5$ $R^6$, $R^7$, $R^8$, $R^9$, $R^{10}$, $R^{11}$ $R^{12}$, $R^{13}$, $R^{14}$, $R^{15}$, $R^{16}$ $R^{17}$, $R^{18}$, $R^{19}$, $R^{20}$, $R^{21}$, $R^{22}$, $R^{23}$, $X^2$, $X^3$ and n and have previously been described. R represents -L-Q or -L-$Z^1$.

The compounds of Formula I preferably have an overall electronic charge of zero. This charge neutrality can in certain instances, be obtained with one or more optional counterions, or quatemized nitrogens. For example, the nitrogen atom(s) can be trivalent or tetravalent. When one of $R^4$, $R^5$, and $R^6$ is an optionally substituted alkanoyl, an optionally substituted alkoxycarbonyl, or optionally substituted alkylcarbamoyl, one of the remaining variables is absent. Similarly, when one of $R^9$, $R^{10}$, and $R^{11}$ is an optionally substituted alkanoyl, an optionally substituted alkoxycarbonyl, or optionally substituted alkylcarbamoyl, one of the remaining variables is absent.

In one preferred embodiment, the compound of Formula I has Formula Ia

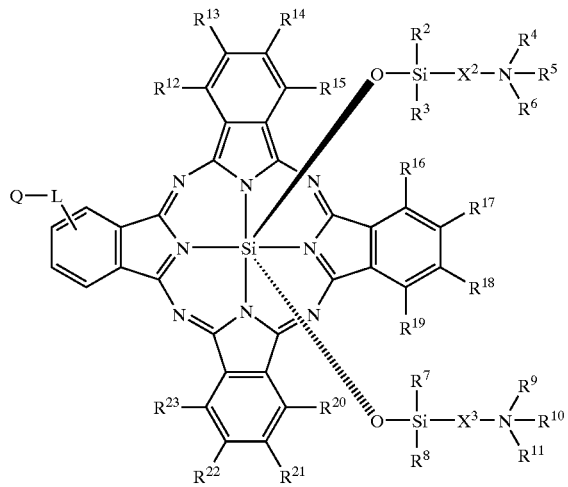

Ia

L is a direct link, or a covalent linkage. The covalent linkage is linear or branched, cyclic or heterocyclic, saturated or unsaturated, having 1–60 atoms, preferably 1–45 atoms, and more preferably 1–25 atoms. This can be for example, C, N, P, O, and S. L can have additional hydrogen atoms to fill valences (in addition to the 1–60 atoms). The linkage contains any combination of ether, thioether, amine, ester, carbamate, urea, thiourea, oxy or amide bonds; or single, double, triple or aromatic carbon-carbon bonds; or phosphorus-oxygen, phosphorus-sulfur, nitrogen-nitrogen, nitrogen-oxygen, or nitrogen-platinum bonds; or aromatic or heteroaromatic bonds.

Q is a reactive or an activatible group. As used herein, the term "reactive group" means a moiety on the compound that is capable of chemically reacting with a functional group on a different material (e.g., biomolecule) to form a linkage, such as a covalent linkage. Typically, the reactive group is an electrophile or nucleophile that can form a covalent linkage through exposure to the corresponding functional group that is a nucleophile or electrophile, respectively. Alternatively, the reactive group is a photoactivatable group, and becomes chemically reactive only after illumination with light of an appropriate wavelength. Typically, the conjugation reaction between the reactive dye and the material to be conjugated results in one or more atoms of the reactive group Q incorporated into a new linkage attaching the dye to the conjugated material.

Suitable reactive groups include, but are not limited to, an activated ester, an acyl halide, an alkyl halide, an anhydride, a carboxylic acid, a carbodiimide, a carbonate, a carbamate, a haloacetamide (e.g., iodoacetamide), an isocyanate, an isothiocyanate, a maleimide, an NHS ester, a phosphoramidite, a platinum complex, a sulfonate ester and a thiocyanate for optional attachment to a biomolecule. Reactive groups which are reactive with a carboxyl group, an amine, or a thiol group on a biomolecule are preferred. Table 1 below sets forth additional reactive groups suitable for use in the present invention.

In one preferred aspect, L has the formula $R^1$—Y—$X^1$—$Y^1$—, wherein $R^1$ is a bivalent radical or a direct link. In this formula, Y and $Y^1$ are each independently selected from a direct link, oxygen, an optionally substituted nitrogen and sulfur. $X^1$ is selected from a direct link or $C_1$–$C_{10}$ alkylene optionally interrupted by a heteroatom.

Certain of $R^1$ substituents are preferred. These preferred $R^1$ include, but are not limited to, optionally substituted alkylene, optionally substituted alkyleneoxycarbonyl, optionally substituted alkylenecarbamoyl, optionally substituted alkylenesulfonyl, optionally substituted alkylenesulfonylcarbamoyl, optionally substituted arylene, optionally substituted arylenesulfonyl, optionally substituted aryleneoxycarbonyl, optionally substituted arylenecarbamoyl, optionally substituted arylenesulfonylcarbamoyl, optionally substituted carboxyalkyl, optionally substituted carbamoyl, optionally substituted carbonyl, optionally substituted heteroarylene, optionally substituted heteroaryleneoxycarbonyl, optionally substituted heteroarylenecarbamoyl, optionally substituted heteroarylenesulfonylcarbamoyl, optionally substituted sulfonylcarbamoyl, optionally substituted thiocarbonyl, a optionally substituted sulfonyl, and optionally substituted sulfinyl.

In certain preferred embodiments, $R^2$, $R^3$, $R^7$, and $R^8$ are each optionally substituted alkyl such as optionally substituted methyl, ethyl, or isopropyl groups.

In other embodiments, $R^4$, $R^5$, $R^6$, $R^9$, $R^{10}$, and $R^{11}$, if present, are each independently selected from an optionally substituted alkyl, wherein at least two members of the group of $R^4$, $R^5$, $R^6$, $R^7$, $R^8$, and $R^9$ comprise a water soluble substituent including, but not limited to, a carboxylate (—$CO_2^-$) group, a sulfonate (—$SO_3^-$) group, a sulfonyl (—$SO_2^-$) group, a sulfate (—$SO_4^{-2}$) group, a hydroxyl (—OH) group, a phosphate (—$OPO_3^{-2}$) group, a phosphonate (—$PO_3^{-2}$) group, an amine (—$NH_2$) group and an optionally substituted quaternized nitrogen with each having an optional counter ion. For example, the alkyl portion of $R^4$, $R^5$, $R^6$, $R^7$, $R^8$, and $R^9$ is substituted with a water soluble substituent.

Suitable counter ions include, but are not limited to, sodium, potassium, calcium, ammonium, organic amino salt, or magnesium salt, or a similar salt. Preferably, the counter ion is a biologically acceptable counter ion. In other preferred embodiments, $R^{12}$, $R^{13}$, $R^{14}$, $R^{15}$, $R^{16}$ R17, $R^{18}$, $R^{19}$, $R^{20}$, $R^{21}$, $R^{22}$ and $R^{23}$ are each hydrogen.

$X^1$, $X^2$ and $X^3$ are each members independently selected from the group of a direct link or $C_1$–$C_{10}$ alkylene optionally interrupted by a heteroatom. In an especially preferred embodiment, Y is oxygen. In certain embodiments, the nitrogens appended to $X^2$ and or $X^3$ can be optionally quaternized.

Those of skill in the art, will appreciate that the compounds of the present invention exist as a single regioisomer, i.e., a single regiomeric alkoxyl substituent. In this manner, purification of the conjugated dye-biomolecule is facile, and exists for example, as a single band on gel-electrophoresis. It will also be noted, for example, that all the dye molecules will have the same fluorescence properties, allowing quantitative detection of these reporter groups. Although the single isomeric configuration is preferred, it is possible to introduce chiral centers on the appended groups during synthesis. However, the core molecule remains as a single regioisomer. As the compounds of the present invention include substituted groups, including chiral substituted groups, the compounds can exist as various enantiomers and diastereomers, because of the possibility of chiral centers throughout the molecule.

In another preferred embodiment, the compound of Formula I has Formula Ib:

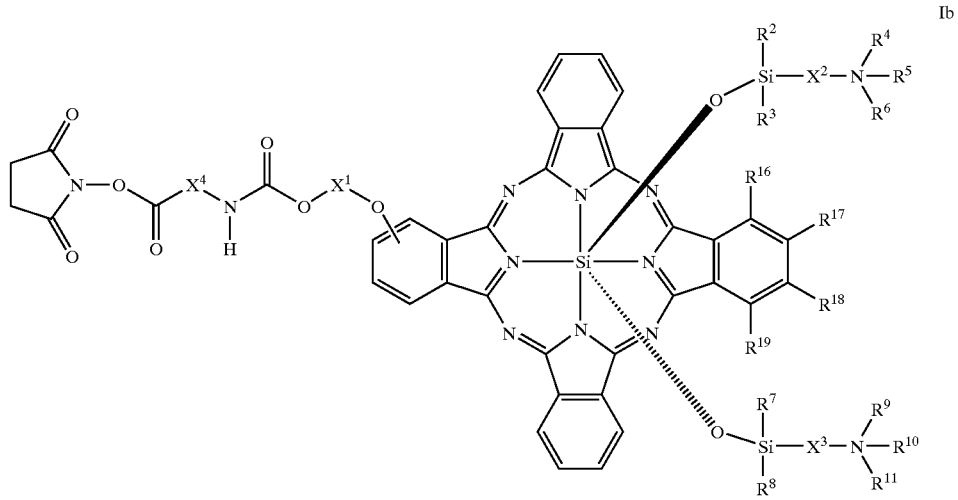

Ib wherein $X^4$ is a $C_1$–$C_{10}$ alkylene optionally interrupted by a heteroatom.

In an especially preferred embodiment, the compound of Formula I has Formula Ic:

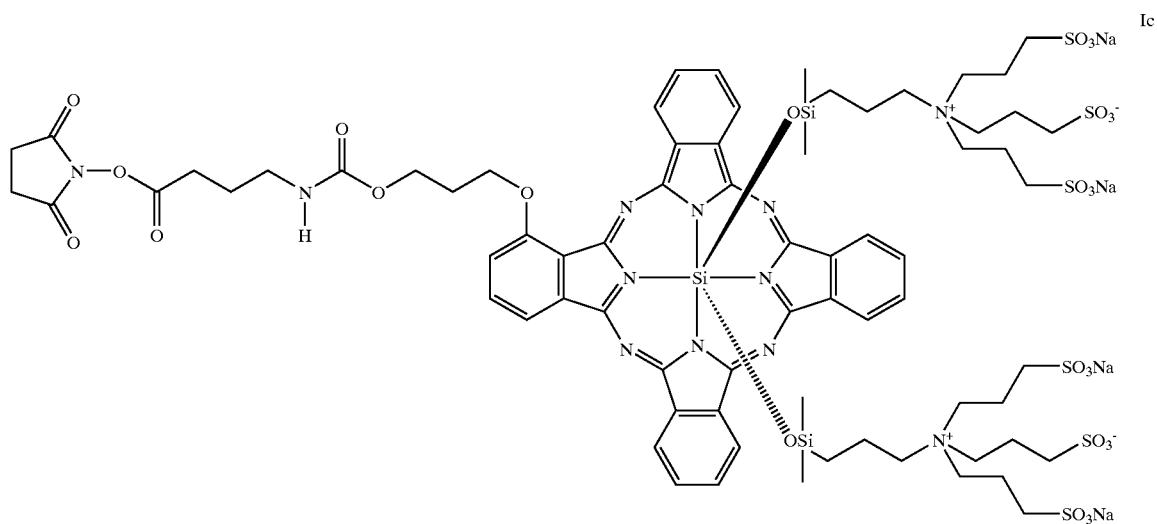

In another preferred aspect, in the compounds of Formula I, L is an alkylthio linkage and further, $R^{12}$, $R^{15}$, $R^{16}$, R19, $R^{20}$, and $R^{23}$ are each independently an optional substituted alkoxy.

Advantageously, the silicon phthalocyanine dyes of the present invention can be tailored to fluoresce at predictable wavelengths. For example, in certain embodiments, the substitution patterns can be manipulated to generate compounds of predictable fluorescent wavelengths, such as the compounds of Formulae Id and Ie.

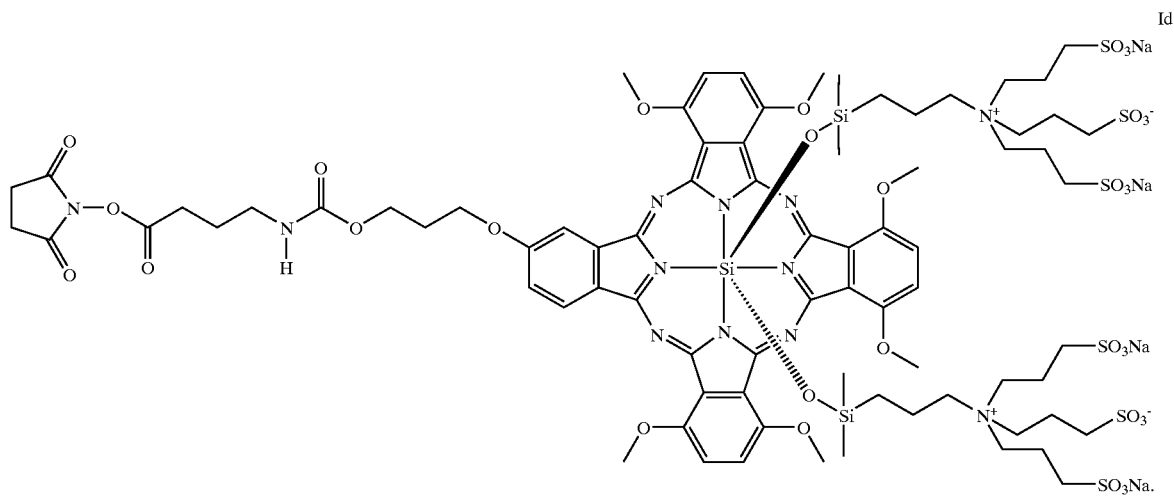

-continued

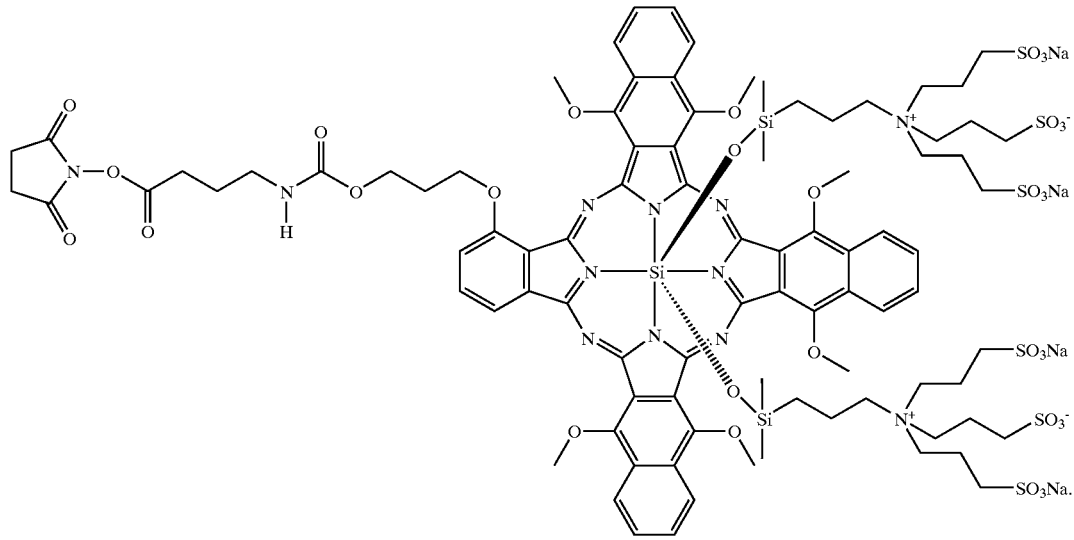

Ie

In addition, it is believed that the reactivity of the NHS ester can be adjusted by varying the number of methylene groups between the NHS ester and the carbamate functionality. In certain embodiments, the number of methylene groups between the NHS ester and the carbamate functionality is inversely proportional to the NHS ester reactivity.

For example, in Formula Id-1 and Id-2 there are 5 methylene groups between the NHS ester and the carbamate functionality, and the NHS ester is less reactive compared to the compound of Formula Id. In certain applications, having less reactivity can be advantageous.

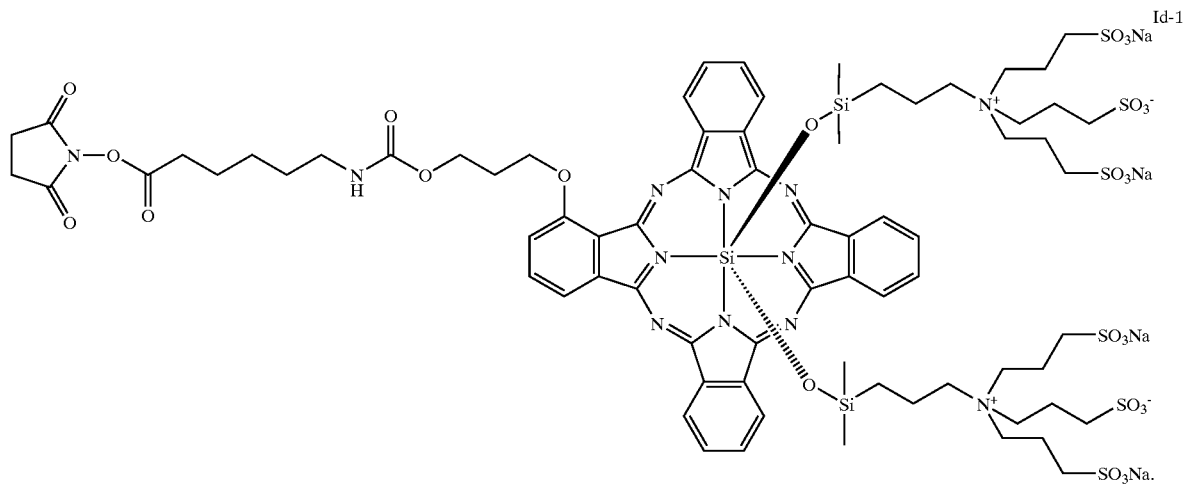

Id-1

-continued

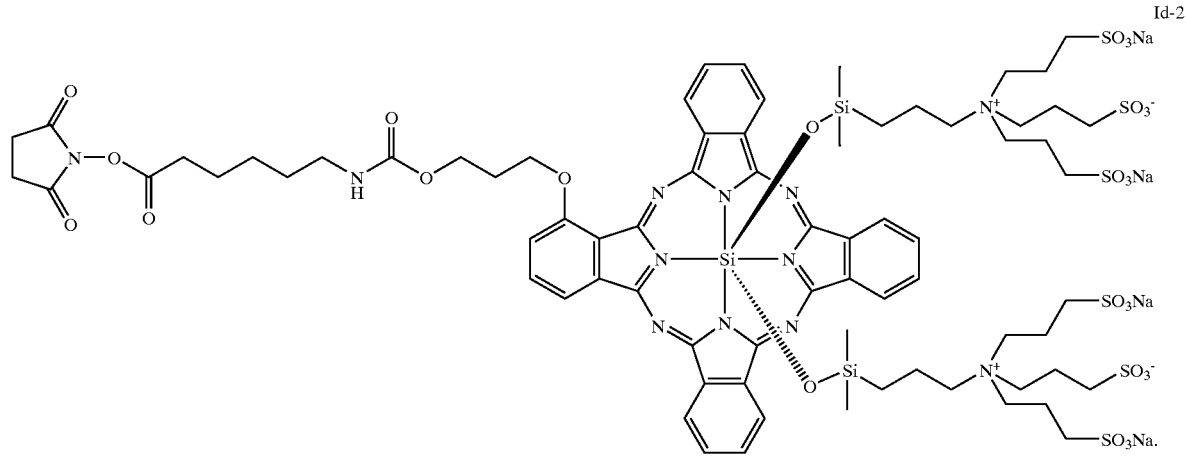

Id-2

Likewise, in Formula Ie-1, there are 5 methylene groups between the NHS ester and the carbamate functionality, and the NHS ester is less reactive compared to the compound of Ie.

are advantageous in that the background fluorescence in this region normally is low in biological systems and high sensitivity can be achieved.

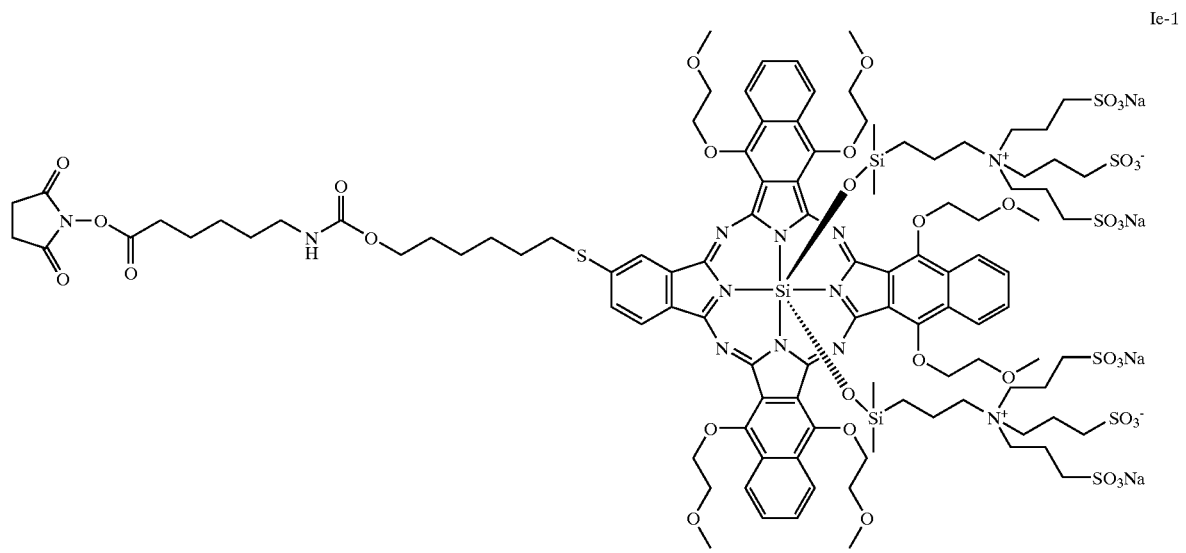

Ie-1

In one embodiment, the dye compounds of the present invention have a maximum light absorption wavelengths between 680 nm and 850 nm, for example at approximately 680 nm, 740 nm, and 830 nm. Such dye compounds can be excited efficiently by commercially available laser diodes that are compact, reliable and inexpensive and emit light at these wavelengths. Near infrared/far red wavelengths also In yet another embodiment, n in Formula I is 2, wherein each R and $R_2$ may be the same or different, or alternatively, they may join to form a 5- or 6-membered ring. For example, in Formula II set forth below, R and $R_2$ are different, giving rise to a L-Q and $L_2$-$Q_2$ having for example, an amino functionality and a carboxylic acid functionality, respectively.

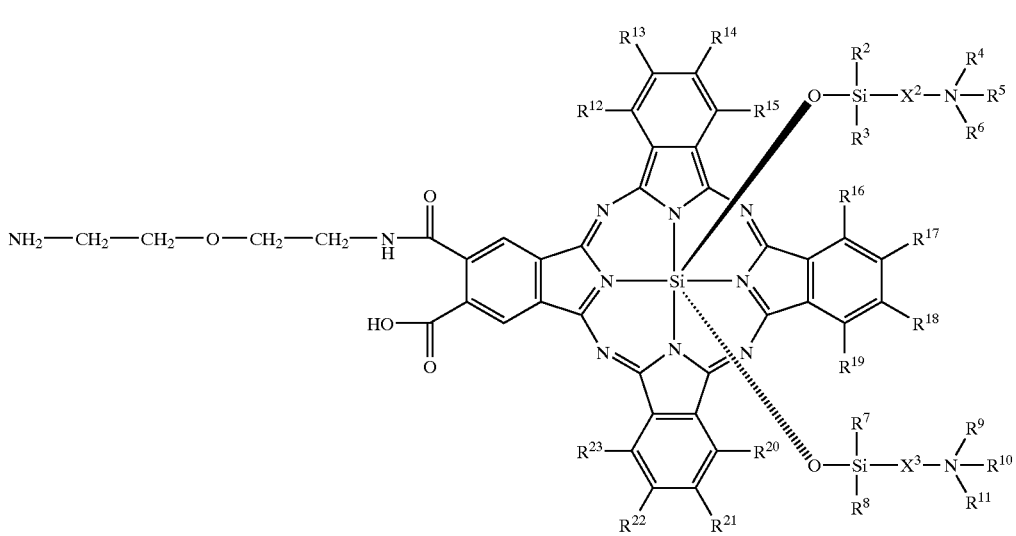

II

In an alternative embodiment, the two R groups (R and $R_2$) may join together to form for example, a 5-membered ring as set forth below in Formula IIa:

not limit the scope of the claims herein. One of ordinary skill in the art will recognize other variations, modifications, and alternatives.

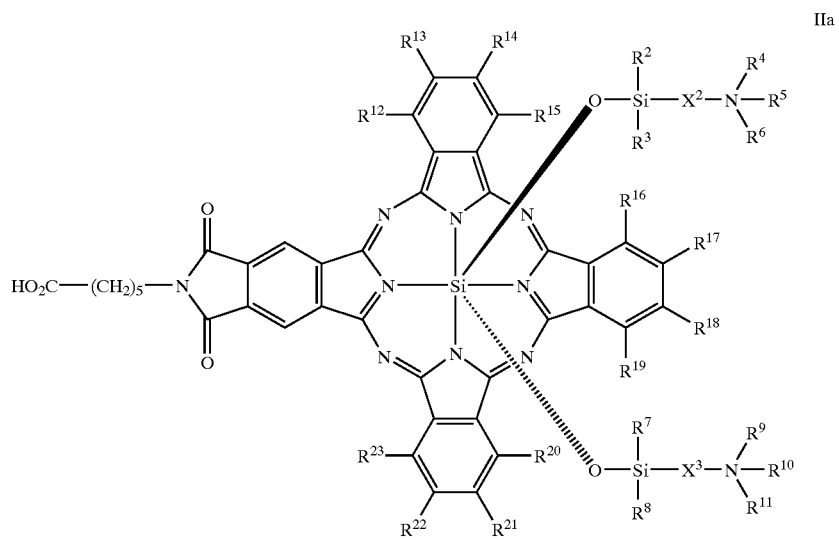

IIa

III. Methods of Making

In other embodiments, the present invention provides methods of making mono-substituted silicon phthalocyanine dyes. Synthetic strategies for mono- or di-substituted phthalocyanines include, for example, mixed condensation of two different dinitriles or diiminoisoindolines, which lead to various degrees of substitution and/or a distribution of regioisomers, or by a selective synthetic strategy to expand a sub-phthalocyanine with substituted diiminoisoindolines.

FIG. 1 sets forth one illustrative embodiment of a synthetic scheme for generating compounds of the present invention. This scheme is merely an illustration and should As shown therein, and as described in detail in Example 1, compounds of the present invention can be made with commercially available starting material and condensing two different diiminoisoindoline. For example, the synthesis leading to the mono-alkoxyl substituted silicon phthalocyanine 4 is via a condensation. Reacting two diiminoisoindoline, substituted diiminoisoindoline 3 and a commercially available unsubstituted diiminoisoindoline, with silicon tetrachloride, a mixture of silicon phthalocyanine chlorides with various numbers of substituents is formed.

In certain instances, the primary amine groups and alcohol functionalities can be used to make the reactive group or a water-soluble dye. For example, the primary amines on 6 can be reacted with 1,3-propane sultone to introduce the water-soluble sulfonate groups into the dye 7. In certain aspects, the presence of an alcohol group as set forth in 7, can be used to attach a variety of reactive groups, which can be used for bio-conjugation. For example, the activated PCD680E 8 is a preferred compound. As shown in FIG. 1, the chain length can be extended as shown in the synthetic scheme of 9 to 10.

IV. Labeling Biomolecules

In other embodiments, the compounds of the present invention can be attached to other materials, including, but not limited to, a nanoparticle, a quantum dot, a solid surface, a textile, a small molecule, a cell, a drug (e.g., small molecule), a liposome, a protein, a peptide, an enzyme substrate, a hormone, an antibody, an antigen, a hapten, an avidin, a streptavidin, biotin, a carbohydrate, an oligosaccharide, a polysaccharide, a nucleic acid, a deoxy nucleic acid, a fragment of DNA, a fragment of RNA, nucleotide triphosphates, acyclo terminator triphosphates, peptide nucleic acid (PNA) biomolecules, and combinations thereof. Compounds of Formula I can be linked to a material, such as a biomolecule, for example, by using phosphoramidite chemistry, ultimately forming a phosphate linkage between the dye and the biomolecule. For examples of such labeling methods, see U.S. Pat. No. 6,027,709, which discloses many preferred linking groups, linking methods, and biomolecules that can be readily labeled. It is generally preferred to prepare a phosphoramidite of a compound of Formula I to label DNA molecules in a DNA synthesizer. It is preferred to attach a compound of Formula I to the 5' end of a protected, support-bonded oligonucleotide through standard phosphoramidite chemistry. Synthesis at the 200 nmole scale produces typical crude yields of dye labeled oligonucleotides of 50–60 nmole.

Many methods of linking dyes to various types of biomolecules are well known in the art. For a through review of oligonucleotide labeling procedures, see R. Haugland in *Excited States of Biopolymers*, Steiner ed., Plenum Press (1983), *Fluorogenic Probe Design and Synthesis: A Technical Guide*, PE Applied Biosystems (1996), and G. T. Herman, *Bioconjugate Techniques*, Academic Press (1996).

In certain aspects, the material to be labeled is an antibody, such as for example, a monoclonal or polyclonal antibody or an antibody fragment. It is preferred that antibody labeling be carried out in a buffer optional co-solvent with an organic solvent, under basic pH conditions, and at 4° C. It is also preferred that the labeled antibody be purified by gel permeation chromatography using equipment such as a SEPHADEX G-50 column, or by dialysis to remove unconjugated dye.

In a preferred method of labeling a biomolecule, a reactive group of Q reacts with for example, a thiol, a hydroxyl, a carboxyl, or an amino group on a material such as biomolecule, forming an attachment between the compound of Formula I and the biomolecule. Typically, this reaction is carried out in aqueous buffer having an optional co-solvent, such as DMSO or DMF at pH 8 to 9.

Once labeled, in certain aspects, a compound of Formula If is generated by conjugating the material and a compound of Formula Ia, to produce a dye-labeled biomolecule having Formula If:

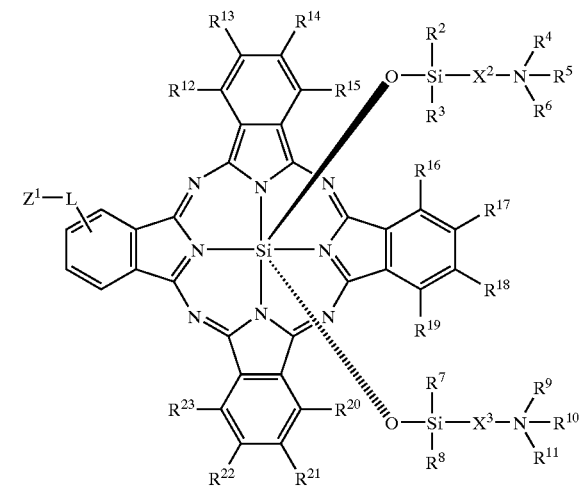

If wherein: $Z^1$, L, $R^3$, $R^4$ $R^5$ $R^6$, $R^7$, $R^8$, $R^9$, $R^{10}$, $R^{11}$ $R^{12}$, $R^{13}$, $R^{14}$, $R^{15}$, $R^{16}$ $R^{17}$, $R^{18}$, $R^{19}$, $R^{20}$, $R^{21}$, $R^{22}$, $R^{23}$, $X^2$ and $X^3$ and Y have previously been described.

Particularly useful dye-conjugates include, among others, conjugates where $Z^1$ is an antigen, steroid, vitamin, drug, hapten, metabolite, toxin, environmental pollutant, amino acid, peptide, protein, nucleic acid, nucleic acid polymer, carbohydrate, lipid, ion-complexing moiety, or glass, plastic or other non-biological polymer. Alternatively, $Z^1$ is a cell, cellular system, cellular fragment, or subcellular particle, e.g. inter alia, a virus particle, bacterial particle, virus component, biological cell (such as animal cell, plant cell, bacteria, yeast, or protist), or cellular component. Reactive dyes typically label functional groups at the cell surface, in cell membranes, organelles, or cytoplasm.

In yet further aspects, $Z^1$ is an amino acid, peptide, protein, tyramine, polysaccharide, ion-complexing moiety, nucleoside, nucleotide, oligonucleotide, nucleic acid, hapten, psoralen, drug, hormone, lipid, lipid assembly, polymer, polymeric microparticle, a marker, (e.g., pamidronate, see, Zaheer et al., *Nature Biotechnology*, 19, 1148–1154 (2001)) biological cell, or virus.

In certain preferred aspects, $Z^1$ is a protein, a peptide, an enzyme substrate, a hormone, an antibody, an antigen, a hapten, an avidin, a streptavidin, a carbohydrate, an oligosaccharide, a polysaccharide, a nucleic acid, a deoxy nucleic acid, a fragment of DNA, a fragment of RNA, nucleotide triphosphates, acyclo terminator triphosphates, or PNA. For a list of preferred labeled terminators for use in DNA sequencing, see for example, U.S. Pat. No. 5,332,666, herein incorporated by reference.

In a preferred aspect, a compound of Formula Ia is reacted with a biomolecule to form a covalent bond between the dye and the biomolecule. The bond is for example, an amide, a secondary or tertiary amine, a carbamate, an ester, an ether, an oxime, a phosphate ester, a sulfonamide, a thioether, a thiourea, or a urea. Preferably, the bond is covalent, such as an amide or carbamate bond. In one aspect, the covalent bond is a phosphate or other linkage group, some of which are exemplified in U.S. Pat. No. 6,027,709. In one preferred embodiment, the bond is a phosphate diester. (e.g., for DNA, RNA).

Selected examples of reactive functionalities useful for the attaching the dye to the biomolecule are shown in Table 1, wherein the bond results from the reaction of a selected Q with a material. Those of skill in the art will know of other bonds suitable for use in the present invention.

TABLE 1

| Reactive functionality of Q | Complementary group | The resulting bond |
|---|---|---|
| activated esters* | amines/anilines | carboxamides |
| acrylamides | thiols | thioethers |
| acyl azides** | amines/anilines | carboxamides |
| acyl halides | amines/anilines | carboxamides |
| acyl halides | alcohols/phenols | esters |
| acyl nitriles | alcohols/phenols | esters |
| acyl nitriles | amines/anilines | carboxamides |
| aldehydes | amines/anilines | imines |
| aldehydes or ketones | hydrazines | hydrazones |
| aldehydes or ketones | hydroxylamines | oximes |
| alkyl halides | amines/anilines | alkyl amines |
| alkyl halides | carboxylic acids | esters |
| alkyl halides | thiols | thioethers |
| alkyl halides | alcohols/phenols | ethers |
| alkyl sulfonates | thiols | thioethers |
| alkyl sulfonates | carboxylic acids | esters |
| alkyl sulfonates | alcohols/phenols | ethers |
| anhydrides | alcohols/phenols | esters |
| anhydrides | amines/anilines | carboxamides/imides |
| aryl halides | thiols | thiophenols |
| aryl halides | amines | aryl amines |
| aziridines | thiols | thioethers |
| boronates | glycols | boronate esters |
| carboxylic acids | amines/anilines | carboxamides |
| carboxylic acids | alcohols | esters |
| carboxylic acids | hydrazines | hydrazides |
| carbodiimides | carboxylic acids | N-acylureas or anhydrides |
| diazoalkanes | carboxylic acids | esters |
| epoxides | thiols (amines) | thioethers (alkyl amines) |
| epoxides | carboxylic acids | esters |
| haloacetamides | thiols | thioethers |
| haloplatinate | amino | platinum complex |
| haloplatinate | heterocycle | platinum complex |
| halotriazines | amines/anilines | aminotriazines |
| halotriazines | alcohols/phenols | triazinyl ethers |
| imido esters | amines/anilines | amidines |
| isocyanates | amines/anilines | ureas |
| isocyanates | alcohols/phenols | urethanes |
| isothiocyanates | amines/anilines | thioureas |
| maleimides | thiols | thioethers |
| phosphoramidites | alcohols | phosphite esters |
| silyl halides | alcohols | silyl ethers |
| sulfonate esters | amines/anilines | alkyl amines |
| sulfonyl halides | amines/anilines | sulfonamides |

*Activated esters, as understood in the art, generally have the formula —COM, where M is a good leaving group (e.g. succinimidyloxy (—$OC_4H_4O_2$) sulfosuccinimidyloxy (—$OC_4H_3O_2SO_3H$), -1-oxybenzotriazolyl (—$OC_6H_4N_3$); 4-sulfo-2,3,5,6-tetrafluorophenyl; or anaryloxy group or aryloxy substituted one or more times by electron withdrawing substituents such as nitro, fluoro, chloro, cyano, or trifluoromethyl, or combinations thereof, used to form activated aryl esters; or a carboxylic acid activated by a carbodiimide to form an anhydride or mixed anhydride —$OCOR^a$ or $OCNR^aNHR^b$, where $R^a$ and $R^b$, which may be the same or different, are $C_1$–$C_6$ alkyl, $C_1$–$C_6$ perfluoroalkyl, or $C_1$–$C_6$ alkoxy; or cyclohexyl, 3-dimethylaminopropyl, or N-morpholinoethyl).
**Acyl azides can also rearrange to isocyanates.

When linking a dye having a carboxylic acid, with an amine-containing biomolecule, the dye carboxylic acid can first be converted to a more reactive form using an activating reagent, to form for example, a N-hydroxy succinimide (NHS) ester or a mixed anhydride. The amine-containing biomolecule is treated with the resulting activated acid to form an amide linkage. Typically, this reaction is carried out in aqueous buffer optional co-solvent with DMSO or DMF at pH 8 to 9.

Similarly, the attachment of an isothiocyanate containing dye is analogous to the procedure for the carboxy dye, but no activation step is required. The amine-containing biomolecule is treated directly with the NCS dye to form a thiourea linkage. Typically, the reaction is carried out in aqueous buffer optional co-solvent with DMSO or DMF at pH 9 to 10.

If the dye compound has a reactive hydroxyl group, it can be linked to a biomolecule, such as DNA or RNA, through phosphoramidite chemistry. Use of the phosphoramidite allows labeling of the DNA or RNA during the synthesis process. The protected nucleotide is labeled while attached to a solid phase support. The free 5'-OH group is reacted with the phosphoramidite and a tetrazole activator to form a phosphite linkage which subsequently is oxidized to phosphate. The labeled DNA or RNA then is cleaved from the solid phase using ammonia or other standardized procedure.

In one aspect, the dyes of this invention have sufficient solubility in aqueous solutions that once they are attached to a soluble biomolecule, the biomolecule retains its solubility. They also have good solubility in organic media (e.g., DMSO or DMF), which provides considerable versatility in synthetic approaches to the labeling of desired materials.

In one embodiment, the present invention provides a method or process for making a dye-labeled biomolecule, the method comprising: contacting a biomolecule with a compound having Formula Ia to generate the compound of Formula If.

Biomolecules can be labeled according to the present invention using a kit. In one embodiment, the kit comprises a compound of Formula I and instructions for use. In a preferred embodiment, the kit further comprises a buffer. Preferably, the kit contains a coupling buffer such as 0.2 M $NaHCO_3/Na_2CO_3$. Preferably, the buffer has a qualified low fluorescence background.

In certain aspects, the kits of the present invention comprise a colored or fluorescent dye of the invention, either present as a chemically reactive label useful for preparing dye-conjugates, or present as a dye-conjugate where the conjugated substance is a specific binding pair member, or a nucleoside, nucleotide, oligonucleotide, nucleic acid polymer, peptide, or protein. The kit optionally further comprises one or more buffering agents, typically present as an aqueous solution. The kits of the invention optionally further comprise additional detection reagents, a purification medium for purifying the resulting labeled substance, luminescence standards, enzymes, enzyme inhibitors, organic solvent, or instructions for carrying out an assay of the invention.

Optionally, the kit can contain a purification sub-kit. After labeling a biomolecule with one of the preferred dyes, the labeled biomolecule may be separated from any side reaction products and any free hydrolyzed product resulting from normal hydrolysis. For biomolecules containing 13 or fewer amino acids, preparative thin layer chromatography (TLC) can remove impurities. PANVERA supplies a TLC Peptide Purification Kit, which is specially designed to purify dye-labeled peptides or proteins. For larger biomolecules such as larger peptides or proteins, a SEPHADEX G-15 or G-25 resin may remove unwanted derivatives; alternatively, a dialysis cassette may also remove the unwanted derivatives. PANVERA supplies a Gel Filtration of Proteins Kit, which is designed to separate dye-labeled peptides and proteins from free dye. The dye-labeled biomolecules that remain after desalting can often be used successfully without further purification. In some cases, it may be necessary to resolve and assess the activity of the different dyed products using HPLC or conventional chromatography.

V. DNA Sequencing

In certain other embodiments, the dye-labeled biomolecules of the present invention can be used in biological applications such as DNA sequencing. The labeled biomolecule such as an oligonucleotide can be used, for example, as a primer in the Sanger method of DNA sequencing, as a tailed primer for genotyping or as a hybridization probe. Well-known methods of DNA sequencing include the Maxam-Gilbert chemical degradation method, described in Maxam et al., *Meth. in Enzym.*, 65: 499 (1980), and the Sanger dideoxy chain termination technique, described in Sanger et al., *P. N. A. S. USA* 74: 5463 (1977). In each method, DNA fragments labeled with $^{32}P$ are generated, which are analyzed by gel electrophoresis. Radiolabeled phosphorus can still be used in these methods for short sequences, but dyes have taken its place in longer sequences. DNA sequencing is also summarized in review articles. See, e.g., Middendorf, L. R., Humphrey, P. G., Narayanan, N., and Roemer, R. C. *Sequencing Technology* in: *Biotechnology*, Rehm, H.-J. and Reed, G.(Editors), Wiley-VCH Publishers, Germany- (Chapter-submitted); B. Barrel, The *FASEB Journal*, 5,40 (1991); and G. L. Trainor, *Anal. Chem.* 62,418 (1990), and references cited therein.

The most widely used DNA sequencing chemistry is the enzymatic chain termination method of Sanger, mentioned above, which has been adapted for several different sequencing strategies. The sequencing reactions are either performed in solution with the use of different DNA polymerases, such as the thermophilic Taq DNA polymerase (see, M. A. Innes, *Proc. Natl. Acad. Sci. USA*, 85: 9436 (1988)) or specially modified T7 DNA polymerase ("SEQUENASE") (see, S. Tabor and C. C. Richardson, *Proc. Natl. Acad. Sci. USA*, 84,4767 (1987)), or in conjunction with the use of polymer supports. See, for example S. Stahl et al., *Nucleic Acids Res.*, 16,3025 (1988); M. Uhlen, PCT Application WO 89/09282; Cocuzza et al., PCT Application WO 91/11533 ; and Jones et al., PCT Application WO 92/03575, incorporated by reference herein.

VI. Additional Applications

In certain aspects, the dye compounds of the present invention are used to directly stain or label a sample so that the sample can be identified or quantitated. For instance, such dyes can be added as part of an assay for a biological target analyte, as a detectable tracer element in a biological or non-biological fluid; or for such purposes as photodynamic therapy of tumors, in which a dyed sample is irradiated to selectively destroy tumor cells and tissues; or to photoablate arterial plaque or cells, usually through the photosensitized production of singlet oxygen. In one preferred embodiment, the dye conjugates of the present invention can be used to stain a sample that comprises a ligand for which the conjugated substance is a complementary member of a specific binding pair.

Typically, the sample is obtained directly from a liquid source or as a wash from a solid material (organic or inorganic) or a growth medium in which cells have been introduced for culturing, or a buffer solution in which cells have been placed for evaluation. Where the sample comprises cells, the cells are optionally single cells, including microorganisms, or multiple cells associated with other cells in two or three dimensional layers, including multicellular organisms, embryos, tissues, biopsies, filaments, biofilms, and the like.

Alternatively, the sample is a solid, optionally a smear or scrape or a retentate removed from a liquid or vapor by filtration. In one aspect of the invention, the sample is obtained from a biological fluid, including separated or unfiltered biological fluids such as urine, cerebrospinal fluid, blood, lymph fluids, tissue homogenate, interstitial fluid, cell extracts, mucus, saliva, sputum, stool, physiological secretions or other similar fluids. Alternatively, the sample is obtained from an environmental source such as soil, water, or air; or from an industrial source such as taken from a waste stream, a water source, a supply line, or a production lot.

In yet another embodiment, the sample is present on or in solid or semi-solid matrix. In one aspect of the invention, the matrix is a membrane. In another aspect, the matrix is an electrophoretic gel, such as is used for separating and characterizing nucleic acids or proteins, or is a blot prepared by transfer from an electrophoretic gel to a membrane. In another aspect, the matrix is a silicon chip or glass slide, and the analyte of interest (e.g., tissue sample) has been immobilized on the chip or slide in an array (e.g. the sample comprises proteins or nucleic acid polymers in a microarray). In yet another aspect, the matrix is a microwell plate or microfluidic chip, and the sample is analyzed by automated methods, typically by various methods of high-throughput screening, such as drug screening.

In yet another aspect, the dye compounds of the invention are utilized by combining a dye compound of the invention as described above with the sample of interest under conditions selected to yield a detectable optical response. The term "dye compound" is used herein to refer to all aspects of the claimed dyes, including both reactive dyes, activatible dyes and dye conjugates. The dye compound typically forms a covalent or non-covalent association or complex with an element of the sample, or is simply present within the bounds of the sample or portion of the sample. The sample is then illuminated at a wavelength selected to elicit the optical response. Typically, staining the sample is used to determine a specified characteristic of the sample by further comparing the optical response with a standard or expected response.

A detectable optical response means a change in, or occurrence of, an optical signal that is detectable either by observation or instrumentally. Typically the detectable response is a change in fluorescence, such as a change in the intensity, excitation or emission wavelength distribution of fluorescence, fluorescence lifetime, fluorescence polarization, or a combination thereof. The degree and/or location of staining, compared with a standard or expected response, indicates whether and to what degree the sample possesses a given characteristic. Some dyes of the invention may exhibit little fluorescence emission, but are still useful as chromophoric dyes. Such chromophores are useful as energy acceptors in FRET applications, or to simply impart the desired color to a sample or portion of a sample.

For biological applications, the dye compounds of the invention are typically used in an aqueous, mostly aqueous or aqueous-miscible solution prepared according to methods generally known in the art. The exact concentration of dye compound is dependent upon the experimental conditions and the desired results, but ranges of below 0.1 mM down to 0.01 mM are possible. The optimal concentration is determined by systematic variation until satisfactory results with minimal background fluorescence is accomplished.

The dye compounds are most advantageously used to stain samples with biological components. The sample can comprise heterogeneous mixtures of components (e.g., including intact cells, fixed cells, cell extracts, bacteria, viruses, organelles, and mixtures thereof), or a single component or homogeneous group of components (e.g. natural or synthetic amino acid, nucleic acid or carbohydrate polymers, or lipid membrane complexes). These dyes are generally non-toxic to living cells and other biological components, within the concentrations of use.

The dye compound is combined with the sample in any way that facilitates contact between the dye compound and the sample components of interest. Typically, the dye compound or a solution containing the dye compound is simply added to the sample. Certain dyes of the invention, particularly those that are substituted by one or more sulfonic acid moieties, tend to be impermeant to membranes of biological cells, and once inside viable cells are typically well retained. Treatments that permeabilize the plasma membrane, such as electroporation, shock treatments or high extracellular ATP can be used to introduce selected dye compounds into cells. Alternatively, selected dye compounds can be physically inserted into cells, e.g. by pressure microinjection, scrape loading, patch clamp methods, or phagocytosis.

The compounds of the invention that are dye conjugates are used according to methods extensively known in the art; e.g. use of antibody conjugates in microscopy and immunofluorescent assays; and nucleotide or oligonucleotide conjugates for nucleic acid hybridization assays and nucleic acid sequencing (e.g., U.S. Pat. No. 5,332,666 to Prober, et al. (1994); U.S. Pat. No. 5,171,534 to Smith, et al. (1992); U.S. Pat. No.4,997,928 to Hobbs (1991); and WO Appl. 94/05688 to Menchen, et al.; all incorporated by reference). Dye-conjugates of multiple independent dyes of the invention possess utility for multi-color applications.

At any time after or during staining, the sample is illuminated with a wavelength of light selected to give a detectable optical response, and observed with a means for detecting the optical response. Equipment that is useful for illuminating the dye compounds of the invention includes, but is not limited to, hand-held ultraviolet lamps, mercury arc lamps, xenon lamps, lasers and laser diodes. These illumination sources are optionally integrated into laser scanners, fluorescence microplate readers, standard or minifluorometers, or chromatographic detectors. Preferred embodiments of the invention are dyes that are be excitable at or near the wavelengths 633–636 nm, 647 nm, 660 nm, 680 nm and beyond 700 nm, such as 780 nm, 810 nm and 850 nm as these regions closely match the output of relatively inexpensive excitation sources.

The optical response is optionally detected by visual inspection, or by use of any of the following devices: CCD cameras, video cameras, photographic film, laser-scanning devices, fluorometers, photodiodes, quantum counters, epifluorescence microscopes, scanning microscopes, flow cytometers, fluorescence microplate readers, or by means for amplifying the signal such as photomultiplier tubes. Where the sample is examined using a flow cytometer, examination of the sample optionally includes sorting portions of the sample according to their fluorescence response.

In certain other aspects, the dye compounds of the present invention are used as in vivo optical imaging agents of tissues and organs in various biomedical applications including, but not limited to, tomographic imaging of organs, monitoring of organ functions, coronary angiography, fluorescence endoscopy, imaging of tumors, laser guided surgery, photoacoustic and sonofluorescence methods, and the like. In one embodiment, the dye compounds of the invention are useful for the detection of the presence of tumors and other abnormalities by monitoring the blood clearance profile of the dyes. In another embodiment of the invention, the dye compounds are useful for laser assisted guided surgery for the detection of micro-metastases of tumors upon laparoscopy. In yet another embodiment, the dye compounds are useful in the diagnosis of atherosclerotic plaques and blood clots.

In further embodiments, the dye compounds of the present invention are used in the imaging of: (1) ocular diseases in ophthalmology, for example, to enhance visualization of chorioretinal diseases, such as vascular disorders, retinopathies, neovascularization, and tumors via direct microscopic imaging; (2) skin diseases such as skin tumors via direct microscopic imaging; (3) gastrointestinal, oral, bronchial, cervical, and urinary diseases and tumors via endoscopy; (4) atherosclerotic plaques and other vascular abnormalities via flexible endocsopic catheters; (5) breast tumors via 2D- or 3D-image reconstruction; and (6) brain tumors, perfusion, and stroke via 2D- or 3D-image reconstruction.

The compounds of the invention that are dye conjugates are particularly useful for imaging tumors, tissues, and organs in a subject. For example, the existence of cancer cells or cancer tissues can be verified by labeling an anti-tumor antibody with a dye compound of the present invention and then administering the dye-conjugated antibody to the subject for detection and imaging of the tumor. Conjugates between the dye compound and other antibodies, peptides, polypeptides, proteins, ligands for cell surface receptors, small molecules, and the like are also useful agents for the in vivo imaging of tumors, tissues, and organs in a subject.

The compounds of the invention may be administered either systemically or locally to the organ or tissue to be imaged, prior to the imaging procedure. In one embodiment, the compounds are administered intravenously. In another embodiment, the compounds are administered parenterally. In yet another embodiment, the compounds are administered enterally. The compositions used for administration of the compound typically contain an effective amount of the dye compound or conjugate along with conventional pharmaceutical carriers and excipients appropriate for the type of administration contemplated. For example, parenteral formulations advantageously contain a sterile aqueous solution or suspension of the dye compound or conjugate according to the invention. Compositions for enteral administration typically contain an effective amount of the dye in aqueous solution or suspension that may optionally include buffers, surfactants, thixotropic agents, flavoring agents, and the like.

The compositions are administered in doses effective to achieve the desired optical image of a tumor, tissue, or organ. Such doses may vary widely, depending upon the particular dye compound or conjugate employed, the tumor, tissue, or organ subjected to the imaging procedure, the imaging equipment being used, and the like.

In yet other aspects, the present invention provides methods and compounds for photodynamic therapy (PDT) of target tumors, tissues, and organs in a subject. PDT is a two-step treatment process, which has received increasing interest as a mode of treatment for a wide variety of different cancers and diseased tissue and organs. The first step in this therapy is carried out by administering a photosensitizing agent systemically by ingestion or injection, or topically applying the compound to a specific treatment site on a subject, followed by illumination of the treatment site with light having a wavelength or waveband corresponding to a characteristic absorption waveband of the photosensitizing agent. The light activates the photosensitizing agent, causing singlet oxygen radicals and other reactive species to be generated, leading to a number of biological effects that destroy the abnormal or diseased tissue, which has absorbed the photosensitizing agent. The depth and volume of the cytotoxic effect on the abnormal tissue, such as a cancerous tumor, depend in part on the depth of the light penetration into the tissue, the photosensitizing agent concentration and its cellular distribution, and the availability of molecular oxygen, which will depend upon the vasculature system supplying the tumor, tissue, or organ.

The method of the present invention provides for administering to the subject a therapeutically effective amount of a photosensitizing agent, such as a dye compound; a targeted photosensitizing agent, such as a dye conjugate; or mixtures thereof. In one embodiment, the targeted photosensitizing agent selectively binds to the target tissue. Light at a wavelength or waveband corresponding to that which is absorbed by the photosensitizing agent is then administered. In another embodiment, the compounds of the present invention act as photosensitizing agents capable of binding to one or more types of target cells or tissues, when exposed to light of an appropriate waveband, absorb the light, causing substances to be produced that impair or destroy the target cells or tissues. Preferably, the compound is nontoxic to the subject to which it is administered or is capable of being formulated in a nontoxic composition that can be administered to the subject. In addition, following exposure to light, the compound in any resulting photodegraded form is also preferably nontoxic.

In yet another embodiment, the compounds of the present invention are administered by any means known in the art for PDT, including, but not limited to, ingestion, injection, transcutaneous administration, transdermal administration, and transillumination. Preferably, the compounds are administered transcutaneously to a subject. For example, "transcutaneous" as used herein refers to the passage of light through unbroken tissue. Where the tissue layer is skin or dermis, transcutaneous includes "transdermal" and it will be understood that the light source is external to the outer skin layer. However, the term "transillumination" as used herein refers to the passage of light through a tissue layer, such as the outer surface layer of an organ, e.g., the liver, and it will be apparent that the light source is external to the organ, but internal or implanted within the subject or patient.

In further embodiments of the invention, the target tumor, tissue, or organ for treatment with PDT is selected from the group consisting of vascular endothelial tissue, an abnormal vascular wall of a tumor, a solid tumor, a tumor of the head, a tumor of the neck, a tumor of a the gastrointestinal tract, a tumor of the liver, a tumor of the breast, a tumor of the prostate, a tumor of the ovary, a tumor of the uterus, a tumor of the testicle, a tumor of the lung, a nonsolid tumor, malignant cells of one of a hematopoietic tissue and a lymphoid tissue, lesions in the vascular system, a diseased bone marrow, and diseased cells in which the disease is one of an autoimmune and an inflammatory disease. In yet a further embodiment, the target tissue is a lesion in the vascular system of a type selected from the group consisting of atherosclerotic lesions, arteriovenous malformations, aneurysms, and venous lesions.

In still further embodiments, the forms of energy used for administering PDT include, but are not limited to, light (i.e., radiation), thermal, sonic, ultrasonic, chemical, light, microwave, ionizing (such as x-ray and gamma ray), mechanical, and electrical. The term "radiation" as used herein includes all wavelengths and wavebands. Preferably, the radiation wavelength or waveband is selected to correspond with or at least overlap the wavelengths or wavebands that excite the photosensitizing agent. Photosensitive agents typically have one or more absorption wavebands that excite them to produce the substances which damage or destroy target cells, tissues, organs, or tumors. Preferably, the radiation wavelength or waveband matches the excitation wavelength or waveband of the photosensitizing agent and has low absorption by the non-target cells and the rest of the subject, including blood proteins.

VII. EXAMPLES

This example illustrates the synthesis of a compound of the present invention.

The first step of this synthesis is to make 1-hydroxypropoxyl-phthalonitrile (1) with an alcohol group. In one aspect, the alcohol group is important to attach a reactive group for later conjugation to a biomolecule. The synthetic conditions of phthalonitrile 1 are adapted from the literature by using a weak base, $K_2CO_3$, to assist in the nucleophilic aromatic substitution reaction. Phthalonitrile 1 was obtained with 70% yield and good purity (see, Scheme 2).

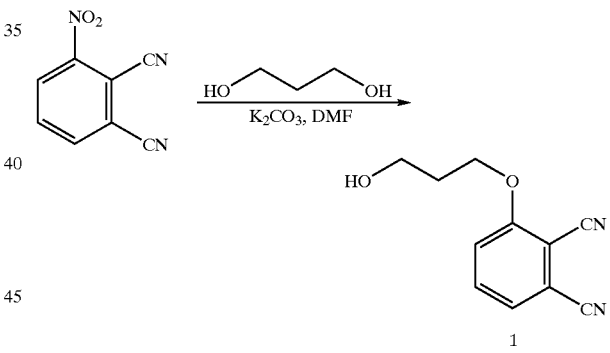

The second step is to protect the alcohol group in phthalonitrile 1 with a methoxybenzyloxyl (MPM) group. Benzyl iodide can be used readily and can be made from benzyl chloride by reacting with sodium iodide (see, Scheme 3).

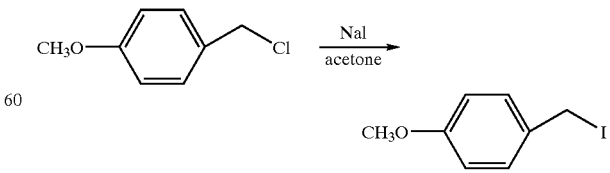

The protection by benzyl iodide works very well (see, Scheme 4). Methoxybenzyloxy-propoxylphthalonitrile (2) was synthesized with good purity and high yield (82%).

Scheme 4

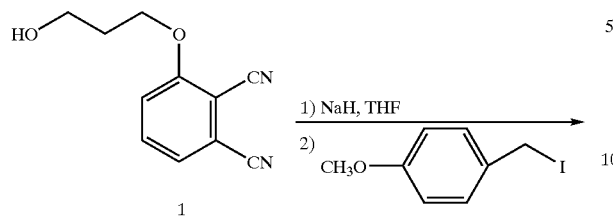

1

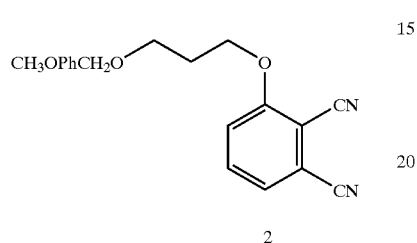

2

As shown in Scheme 5, treating phthalonitrile 2 with bubbling ammonia gas in methanol in the presence of sodium methoxide affords substituted diiminoisoindoline 3 with an 86% yield. Diiminoisoindoline 3 is used as a crude intermediate for the following dye formation reaction.

Scheme 5

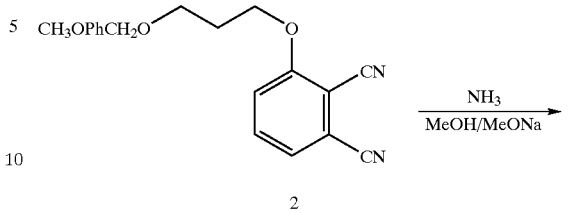

2

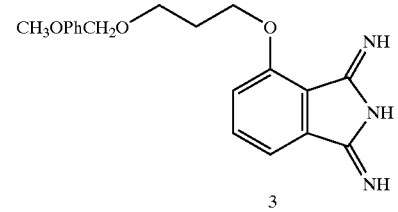

3

The synthesis leading to the mono-alkoxyl substituted silicon phthalocyanine 4 is via a mixed condensation. Reacting two types of diiminoisoindoline, substituted diimonisoindole 3 and a commercially available unsubstituted diiminoisoindoline, with silicon tetrachloride, forms a mixture of silicon phthalocyanine chlorides with various degrees of substituents, (see, Scheme 6). The main components in this mixture are phthalocyanine A and B.

Scheme 6

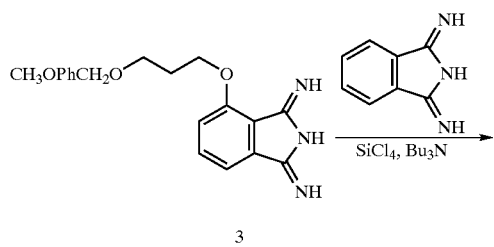

3

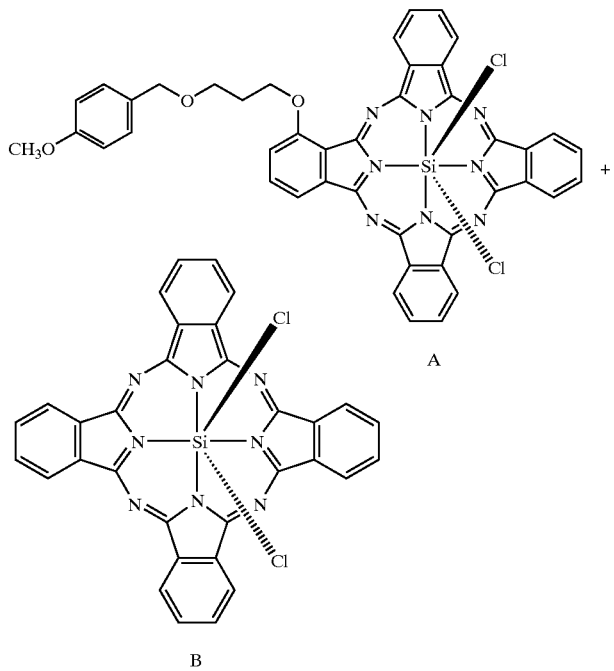

A

B

However, phthalocyanine A and B do not have the required solubility in most organic solvents. Treating the reaction mixture directly (instead of isolating them out) with NaHCO$_3$ aqueous solution, afforded a mixture of silicon phthalocyanine hydroxides C and D, (see, Scheme 7).

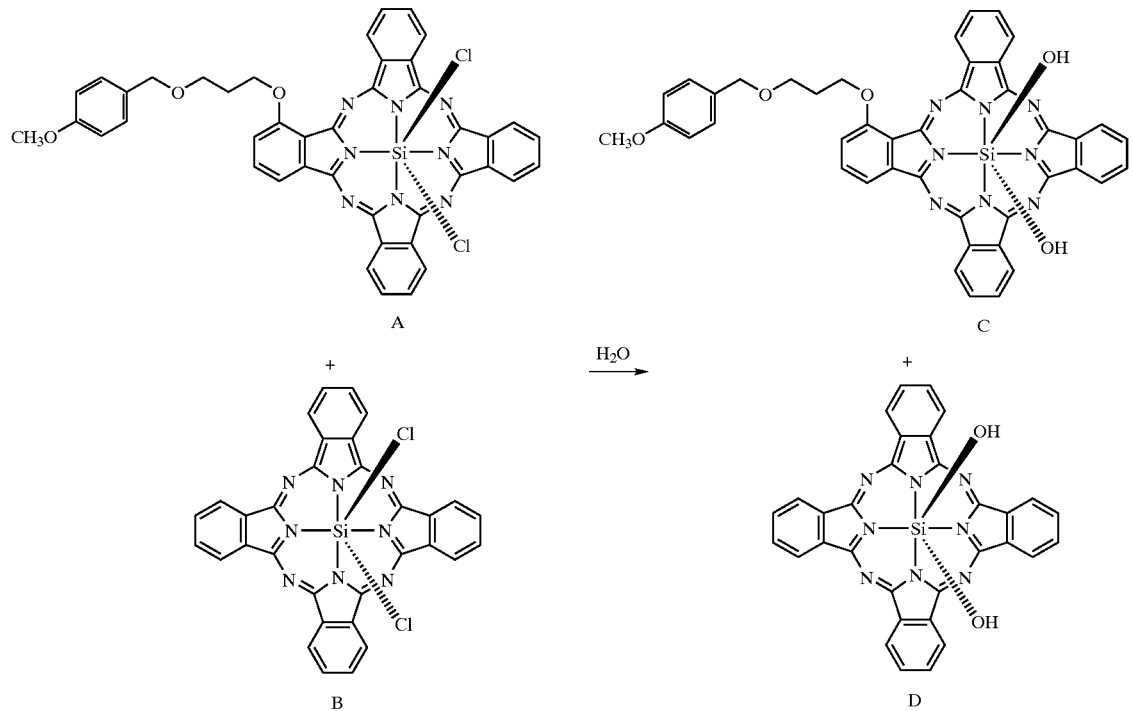

Phthalocyanine C and D are mixed together and are not easily isolated due to solubility. Treating the mixture of compound C and D with aminopropyldimethylethoxylsilane can make phthalocyanines E and F soluble, (see, Scheme 8).

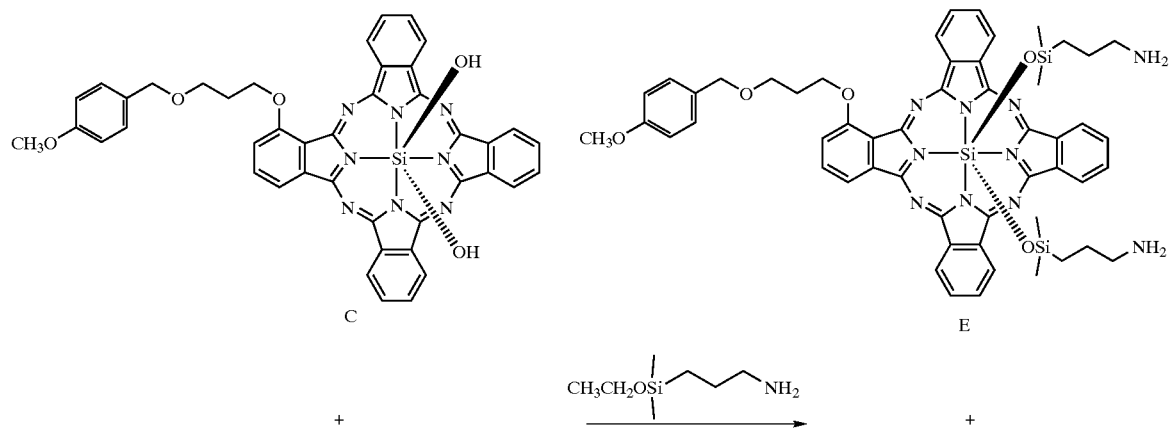

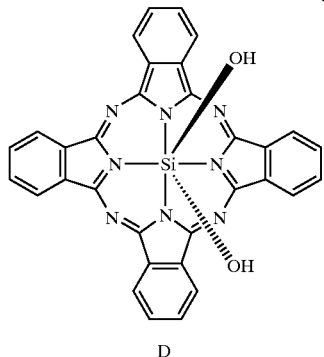

D

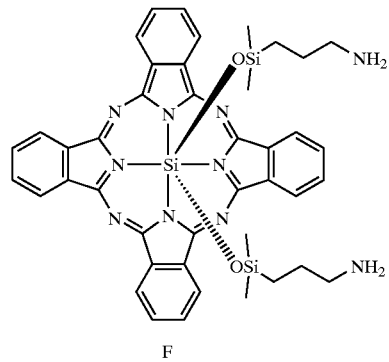

F

Alternatively, treating the dye formation mixture directly (without isolation) with 1-butanol at the presence of pyridine made silicon phthalocyanines 4 and G, which are readily separated by normal phase silica gel column chromatography, (see, Scheme 9). Mono-substituted silicon phthalocyanine 4 has been synthesized and isolated with good purity and good yield (27% based on the substituted diimonindoline 3).

Removing the methoxyphenylmethoxyl (MPM) protection group in phthalocyanine 4 will release the alcohol functionality. However, experiments found that the de-protection conditions described in the literature not only releases the alcohol but also generate a byproduct having the butoxyl ligands cleaved (Scheme 10).

Scheme 9

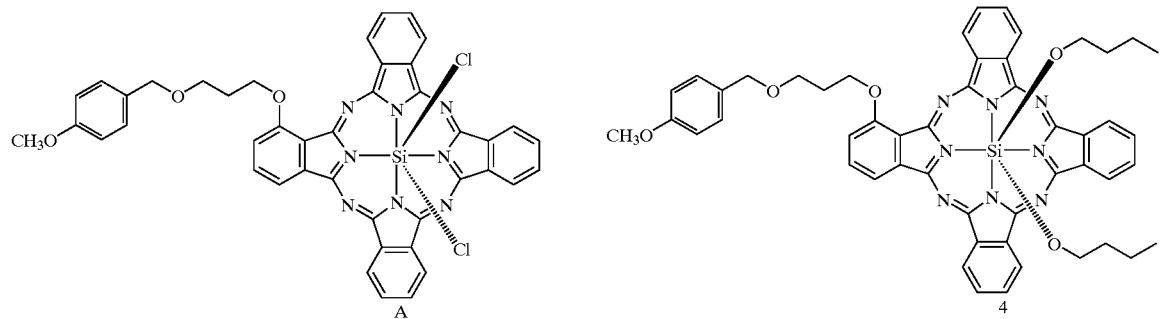

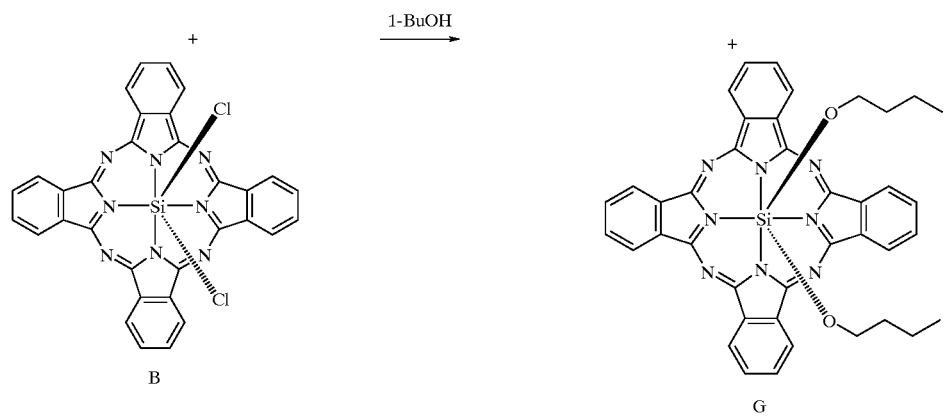

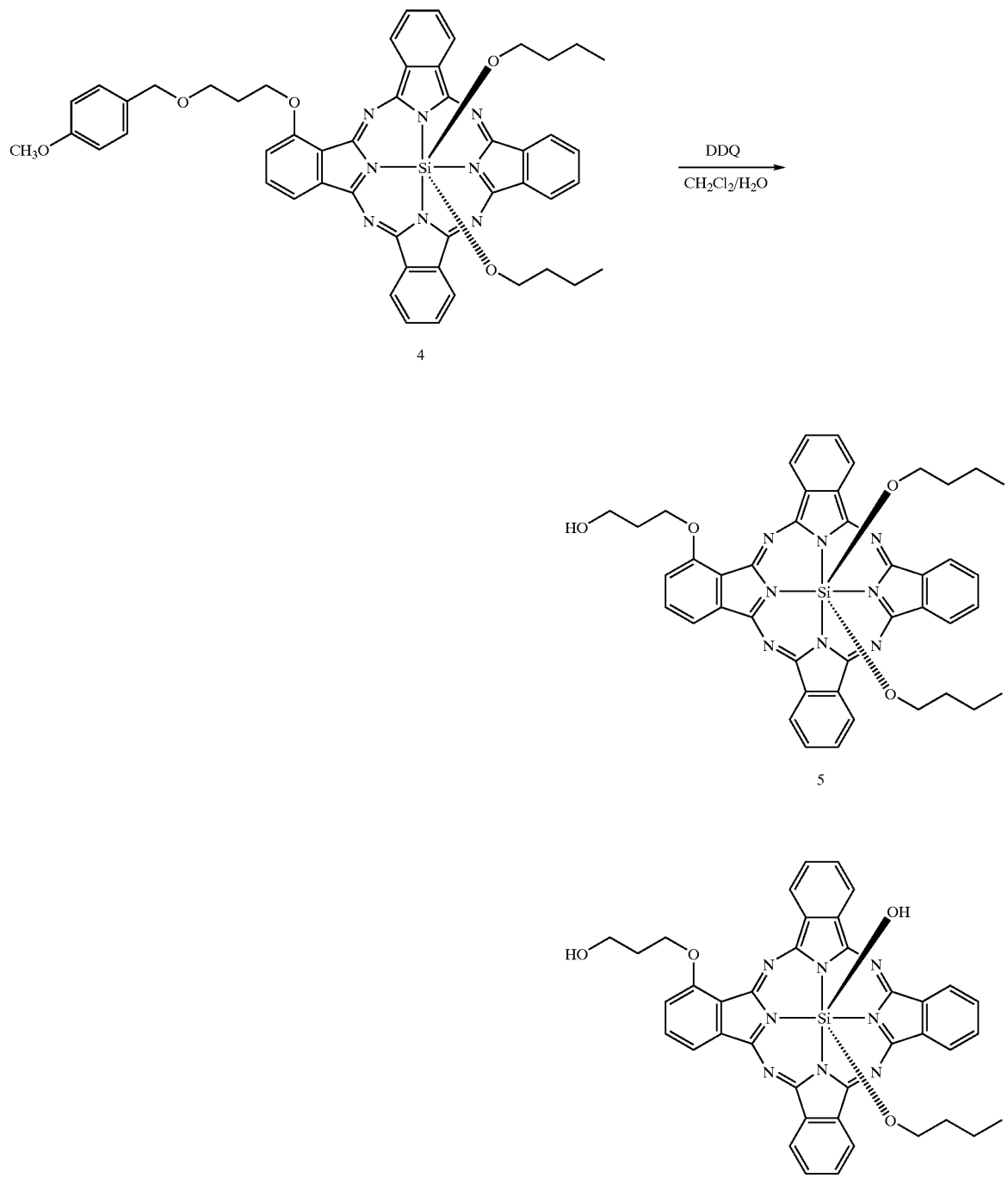
Treating this mixture further with butanol in pyridine and restores the cleaved butoxyl group, (see, Scheme 11). Alcohol substituted phthalocyanine 5 was obtained with good purity and yield (63%).

Scheme 11
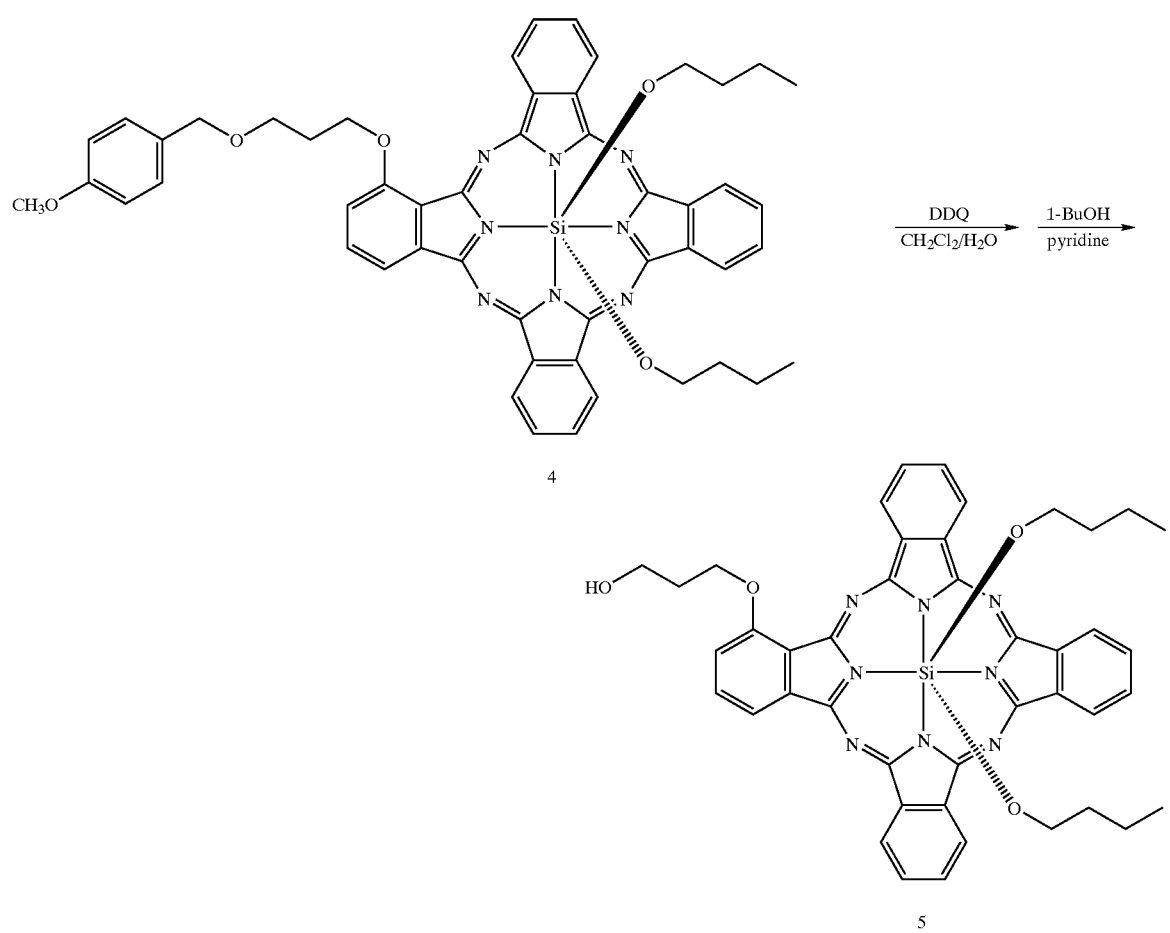
Dye 6 was made from the butane-alcohol dye 5 with 79% yield, Scheme 12.
Scheme 12
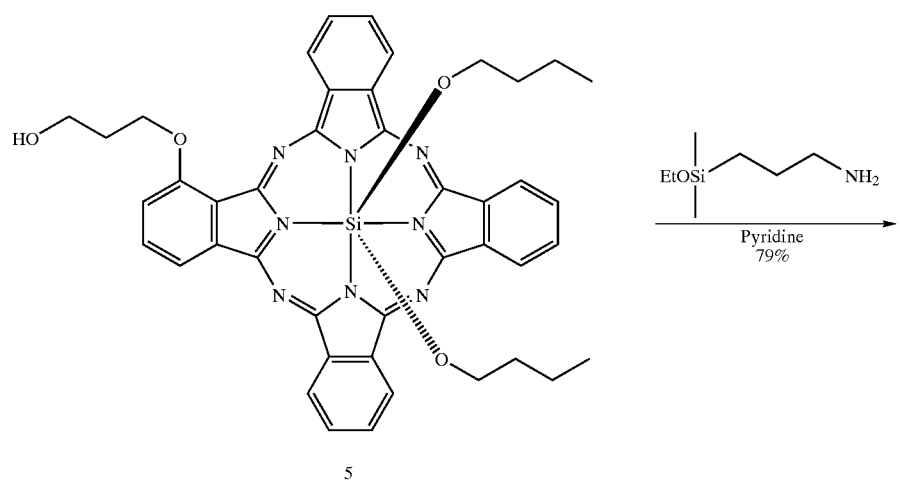

-continued

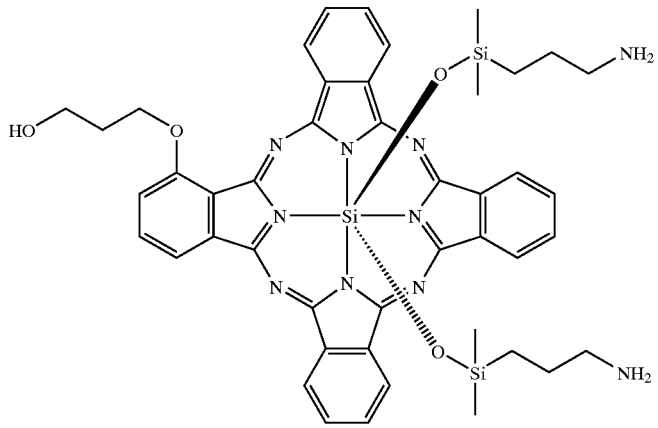

6

Phthalocyanine dye 6 has both the alcohol group and two primary amine groups that are elements to make the final reactive/activated water-soluble dye. The primary amines on dye 6 react with 1,3-propane sultone to introduce water-soluble sulfonate groups into the dye structure (7) (see, Scheme 13). Since the alcohol is inert to sultone, the hydroxyl group survives the reaction and is available for later reactions. The water-soluble dye with alcohol functionality (PCD680E OH, 7) was obtained with 46% yield.

Scheme 13

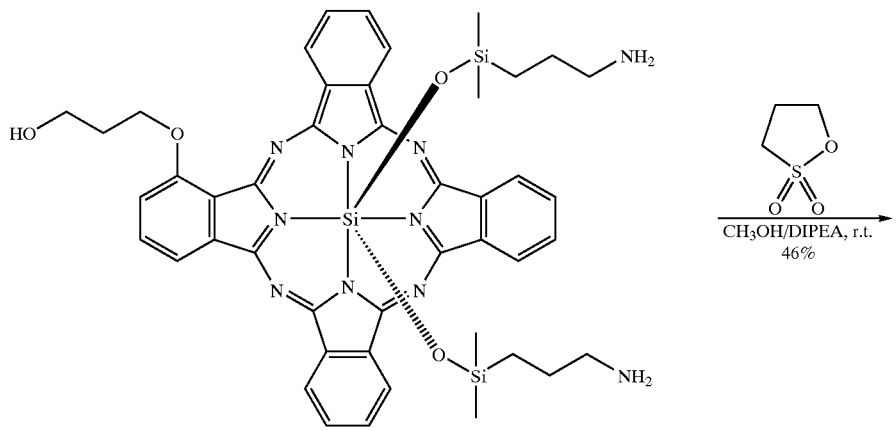

6

$CH_3OH/DIPEA$, r.t.
46%

-continued
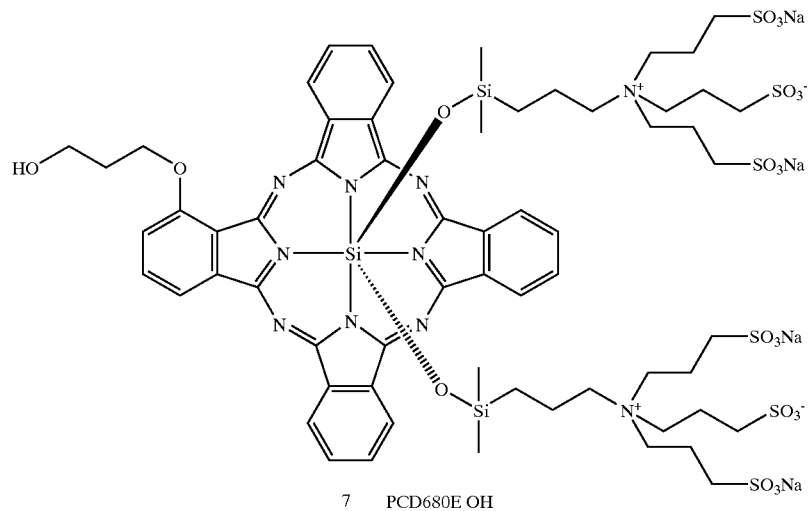
7  PCD680E OH
PCD680E OH (7) dye has excellent water solubility. Because of the presence of the alcohol group in 7, it can be activated and can attach a variety of reactive groups for bio-conjugation. The activated PCD680E Imc (8) has also been synthesized with 88% yield, Scheme 14.
Scheme 14
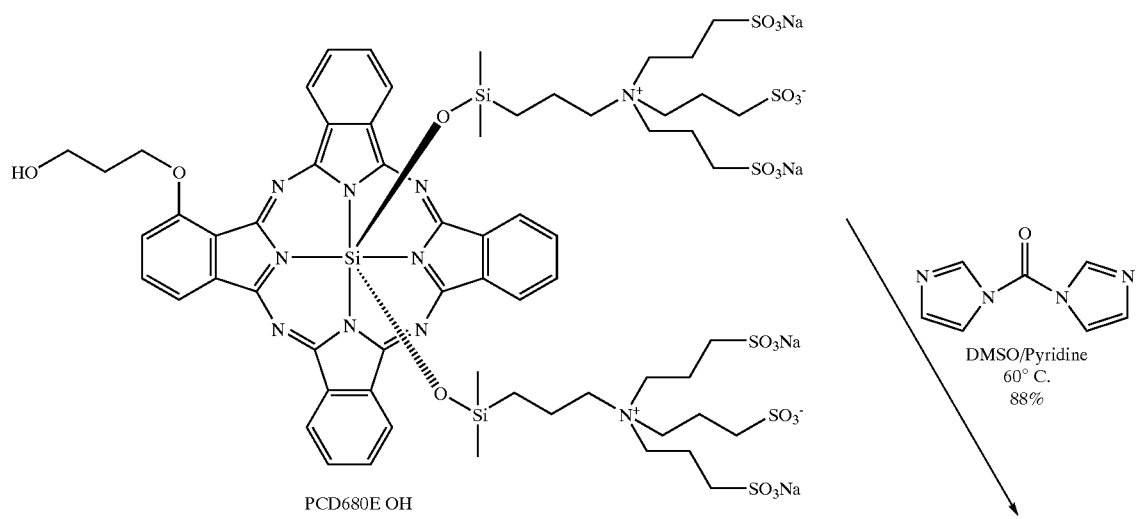
PCD680E OH
7
DMSO/Pyridine
60° C.
88%

-continued

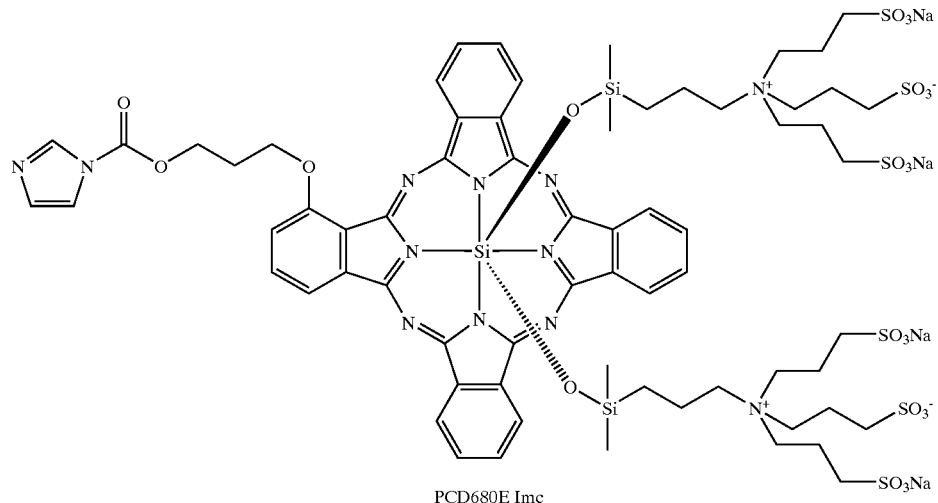

PCD680E Imc

8

The acid group can be attached by reacting the appropriate amino acid salt with the imidazolyl carbamate in PCD680E Imc (8). One of these dyes has one carbon linker between the urethane group and the acid group. Its acid form(PCD680G COONa dye) has been made by reacting PCD680E Imc (8) with dried glycine sodium salt in DMSO at room temperature, scheme 15. A very pure (HPLC 100%) PCD680G COONa-(H) was obtained after preparation TLC purification with 88% yield (Scheme 15).

Scheme 15

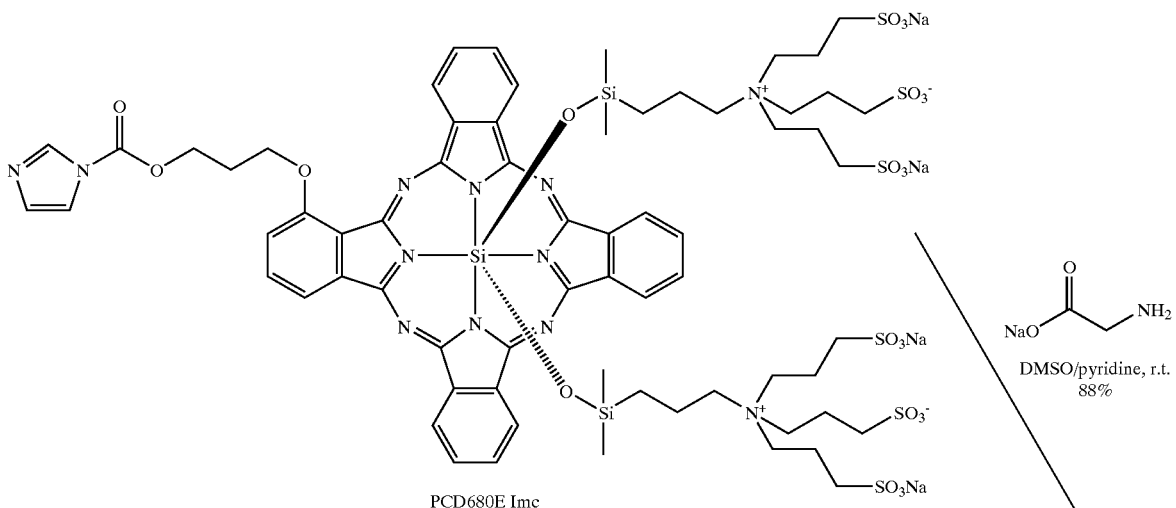

PCD680E Imc

8

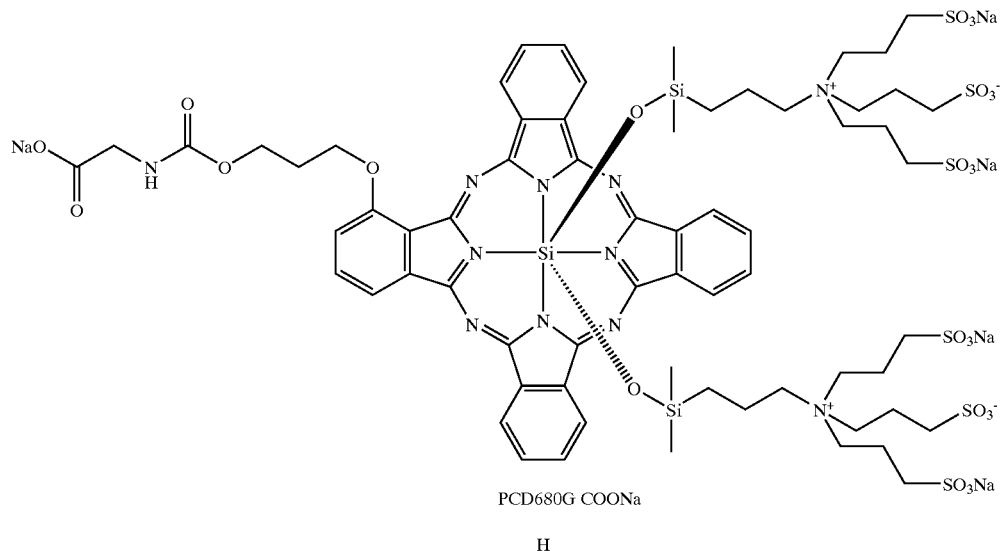
PCD680G COONa
H
The synthesis of the three carbon linker dye, PCD680H, is similar to that of the one carbon linkage shown previously, Scheme 16.
Scheme 16
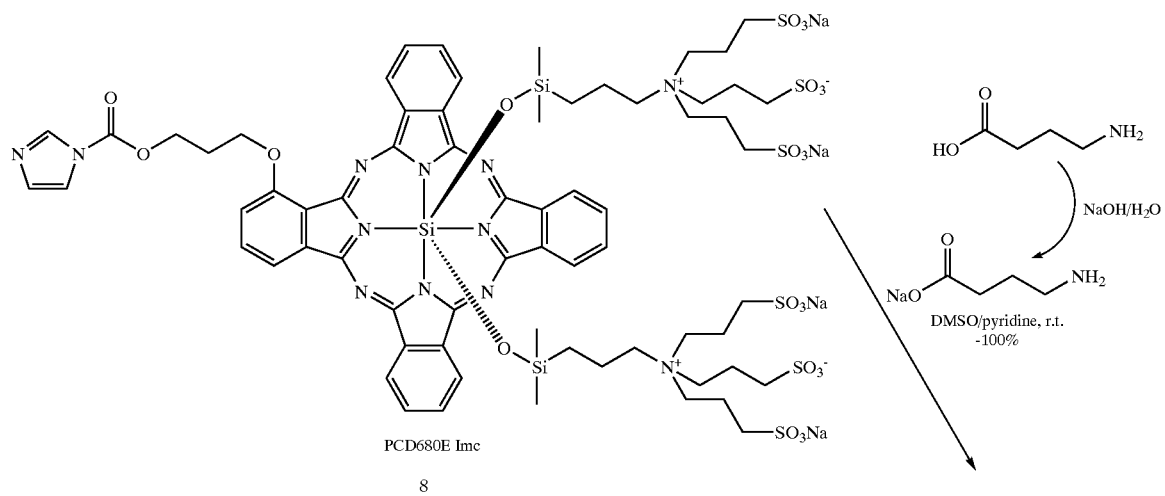
PCD680E Imc
8

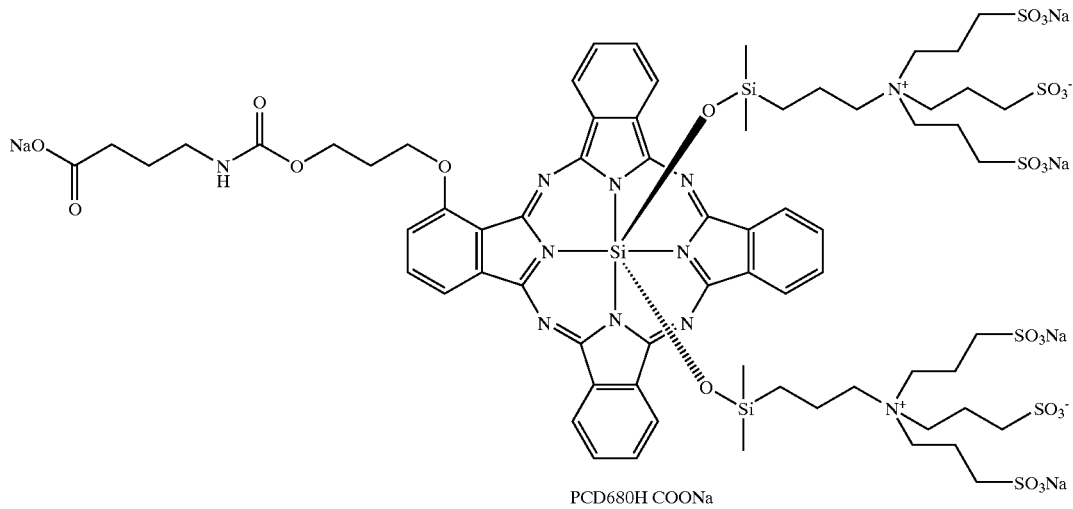
PCD680H COONa
9
The PCD680H NHS ester dye was made from PCD680H acid conveniently with disuccinimidyl carbonate (DSC) in nearly quantitative yield, Scheme 17. HPLC shows the product is mainly the PCD680H NHS dye with about 10% of the parent acid form remaining after ether precipitation.
Scheme 17
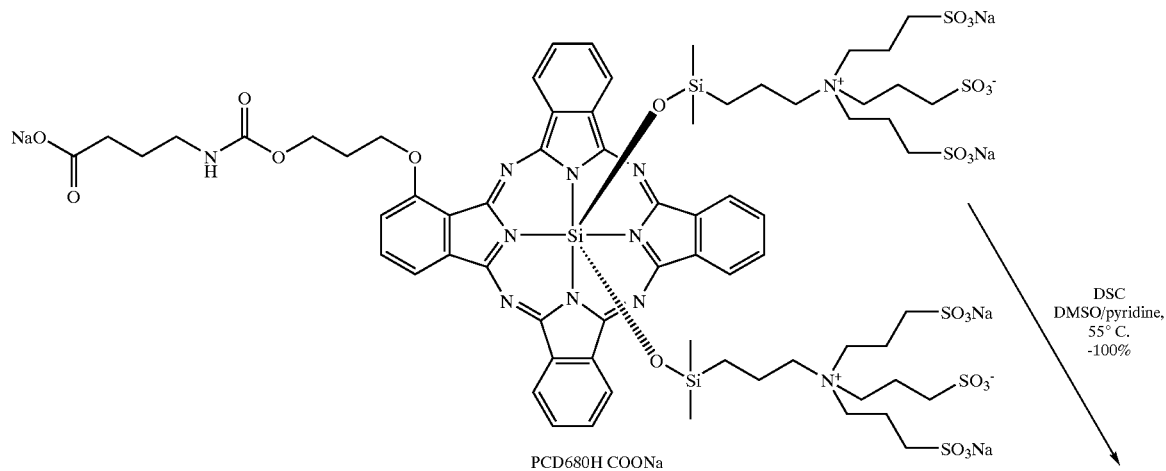
PCD680H COONa
10

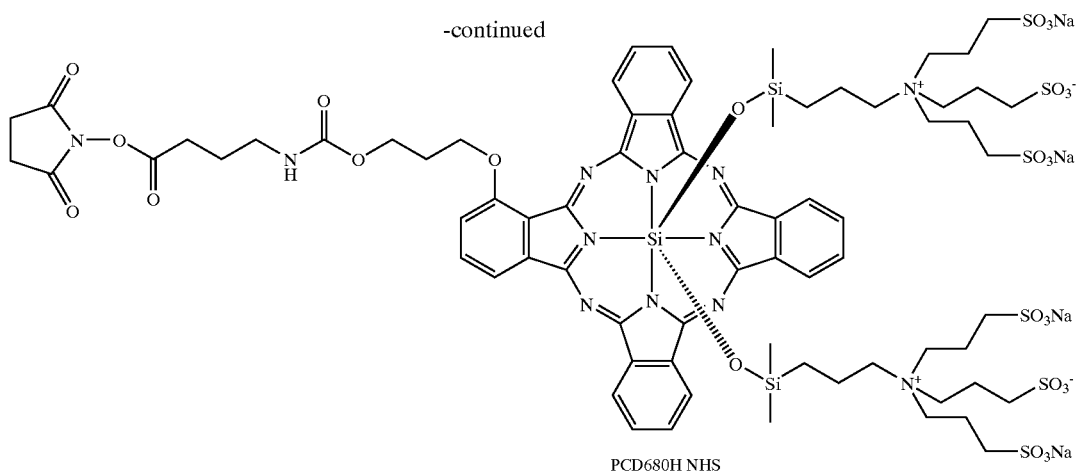

PCD680H NHS

11

Example 2

This example illustrates an antibody labeling protocol with PCD680H NHS ester dye.

The antibody to be labeled is dialyzed in phosphate-buffer saline (1×PBS) buffer to remove any low molecular weight impurities in the antibody solution. The antibody is adjusted to a concentration of 5 mg/mL to 10 mg/mL.

PCD680H NHS ester dye is dissolved in high-quality, anhydrous dimethylsulfoxide (DMSO) and stored at −20 °C in a freezer. The concentration of the dye in DMSO is 50 mg/mL to 100 mg/mL.

A. Labeling Procedure:
  Mix the antibody solution with approximate the same volume of 0.2 M NaHCO$_3$/Na$_2$CO$_3$ buffer (pH 8.4) and let stand about 5 min at 4° C. The protein has a concentration of >2 mg/mL to 5 mg/mL in the solution.
  Add the calculated volume (based on the desired normal dye to protein ratio) of the solution of PCD680H NHS ester dye in DMSO to the antibody solution and mix the dye and protein by pipetting the mixture briefly.
  Incubate the labeling reaction at 4° C. in a refrigerator for 2 hours.

B. Purification:
  Prepare the Sephadex G50 gel filtration column and equilibrate with 1×PBS buffer.
  Allow the excess 1×PBS buffer to drain into the column bed before loading the incubated dye and protein solution onto the column. Allow the solution to drain into the column bed.
  Add 1×PBS buffer to the column and elute the dye and antibody conjugation. Two very well separated blue bands can be observed in the column.
  Collect the faster-moving blue band into a clean tube and store at 4° C.
  Further purification of the dye labeled antibody can be made by dialyzing the conjugation in 1×PBS buffer at 4° C. overnight.

C. Determining the Dye to Protein (D/P) Ratio and the Protein Concentration:
  Take some of the protein conjugate solution and dilute in 1×PBS for the absorbance measurement.
  Measure the absorbance of the dye labeled antibody at 280 nm and $\lambda_{max}$ of the dye (~689 nm). Calculate the dye to protein (D/P) ratio and the protein concentration:

D/P=Molar concentration of dye/Molar concentration of protein $=(A_{689}/\epsilon_{dye})$*dilution factor/$[(A_{280}-CF*A_{689})/\epsilon_{protein}]$
  *dilution factor $CF$ (correction factor)=$A_{280}$ of free dye/$A_{689}$ of free dye Protein concentration of the conjugate Conc. $(M)=[(A_{280}-CF*A_{689})/\epsilon_{protein}]$*dilution factor Conc. (mg/mL)=$[(A_{280}-CF*A_{689})/\epsilon_{protein}]$*dilution factor*MW$_{protein}$

Example 3

This example illustrates a proposed synthesis route of a compound of the present invention.

2-(6'-hydroxylhexylthio)phthalonitrile (I) was made by treating a commercially available 4-nitrophthalonitrile with 6-mercapto-1-hexanol at the presence of potassium carbonate in N,N-dimethylformamide solution (Scheme 18).

Scheme 18

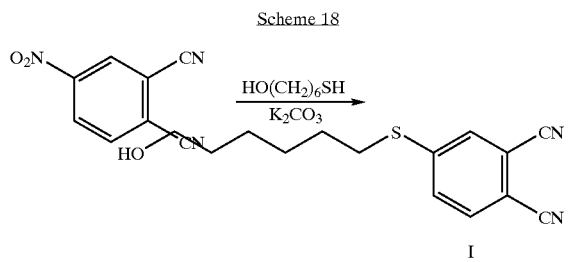

I

The alcohol group in phthalonitrile (I) was then masked with a tetrahydropyranyl group by reacting phthalonitrile (I) with dihydropyran together with p-toluenesulfonic acid monohydrate, Scheme 19.

Scheme 19

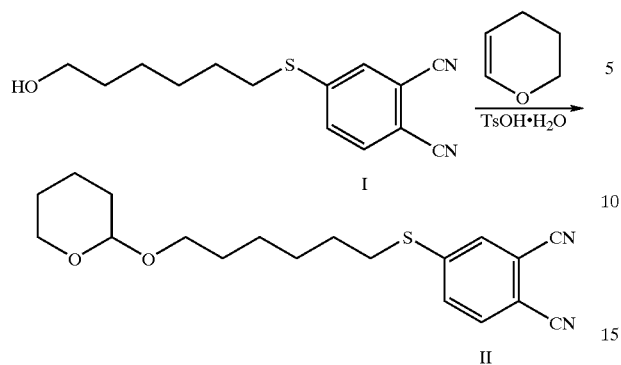

1,4-di(methoxylethoxyl)phthalonitrile (IIA) was made from a commercially available 2,3-dicyanohydroquinone. As shown in Scheme 20, 2,3-dicyanohydroquinone was first treated with sodium hydride in N,N-dimethylformamide at 0° C. then reacted with methoxylethoxyl mesylate, which was made from its corresponding alcohol and methanesulfonyl chloride.

Scheme 20

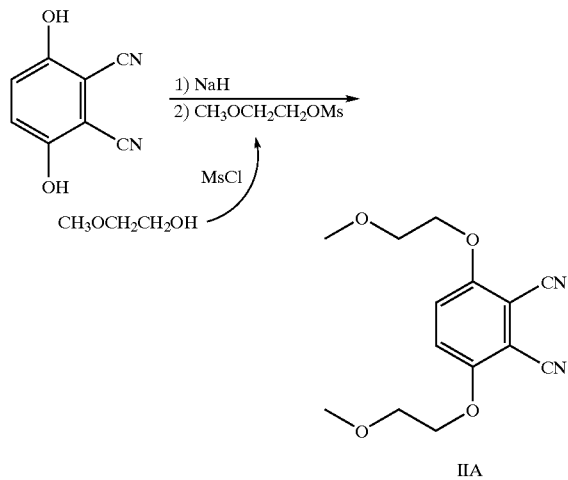

Another dialkoxy phthalonitrile, 1,4-di(methoxyl)phthalonitrile (2) was also prepared using this method as shown in Scheme 21.

Scheme 21

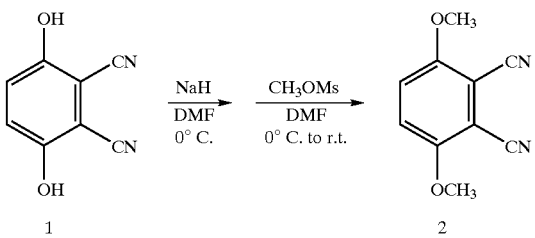

Phthalonitrile 2 can be further transformed to 4,7-dimethoxy-1,3-diiminoisoindoline (3), as shown in Scheme 22. 4,7-dimethoxy-1,3-diiminoisoindoline (3) was synthesized by treating the hot solution (110° C.) of phthalonitrile 2 in methoxyethanol by ammonia gas with the presence of sodium methoxide.

Scheme 22

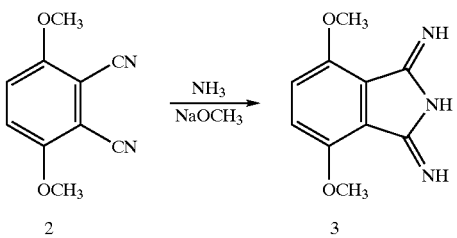

As shown in Scheme 23, phthalocyanine III was made by mixed cyclization of two kinds of phthalonitriles, phthalonitrile Ia, and phthalonitrile II with the masked alcohol functionality. The masked alcohol functional group can be used as activated group of the dye. In certain aspects, the thioether linkage is important to maintain the integrity of the dye structure.

The phthalocyanine dyes being made in this reaction is a mixture of several phthalocyanine structures. By using a ratio of 8 for phthalonitrile Ia to one phthalonitrile II, phthalocyanine III and IIIA became the dominantly formed dyes in this reaction.

Scheme 23

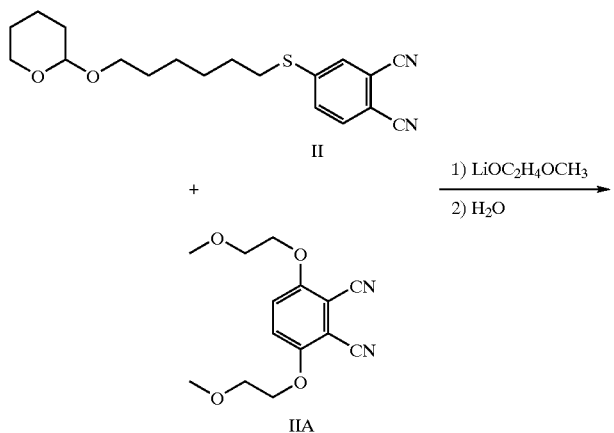

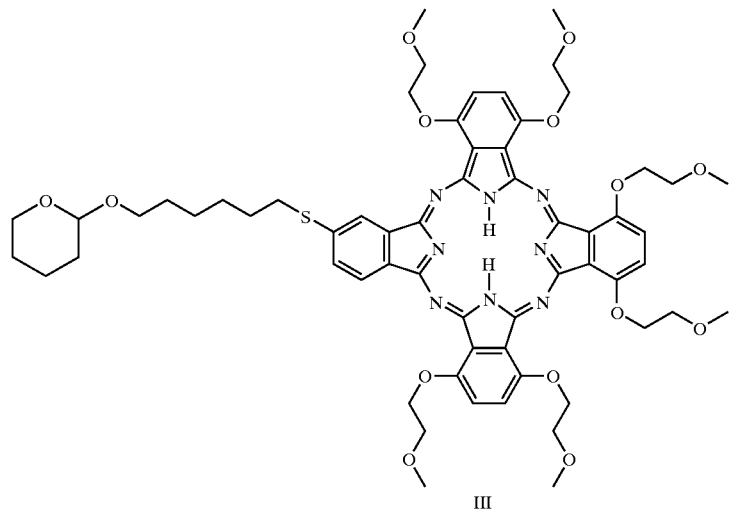

III

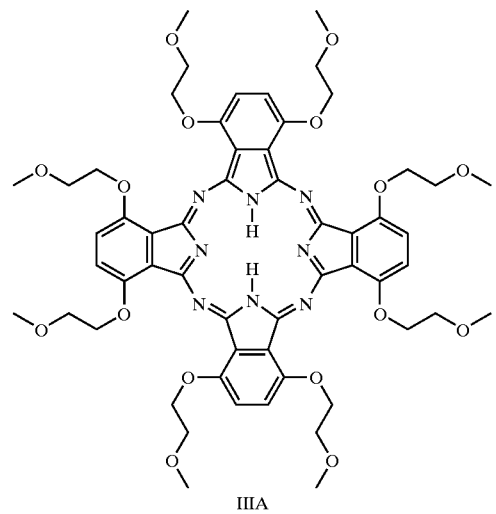

IIIA

The silicon insertion of the metal-free dye will be accomplish following the Kenney et al. method (U.S. Pat. No. 5,872,248) or an alternative method know to those of skill in the art. Silicon phthalocyanine IV and IVA can be made by treating the dye mixture, which is mainly composed by metal-free phthalocyanines III and IIIA, with trichlorosilane in methylene chloride followed by quench of water, Scheme 24.

Scheme 24
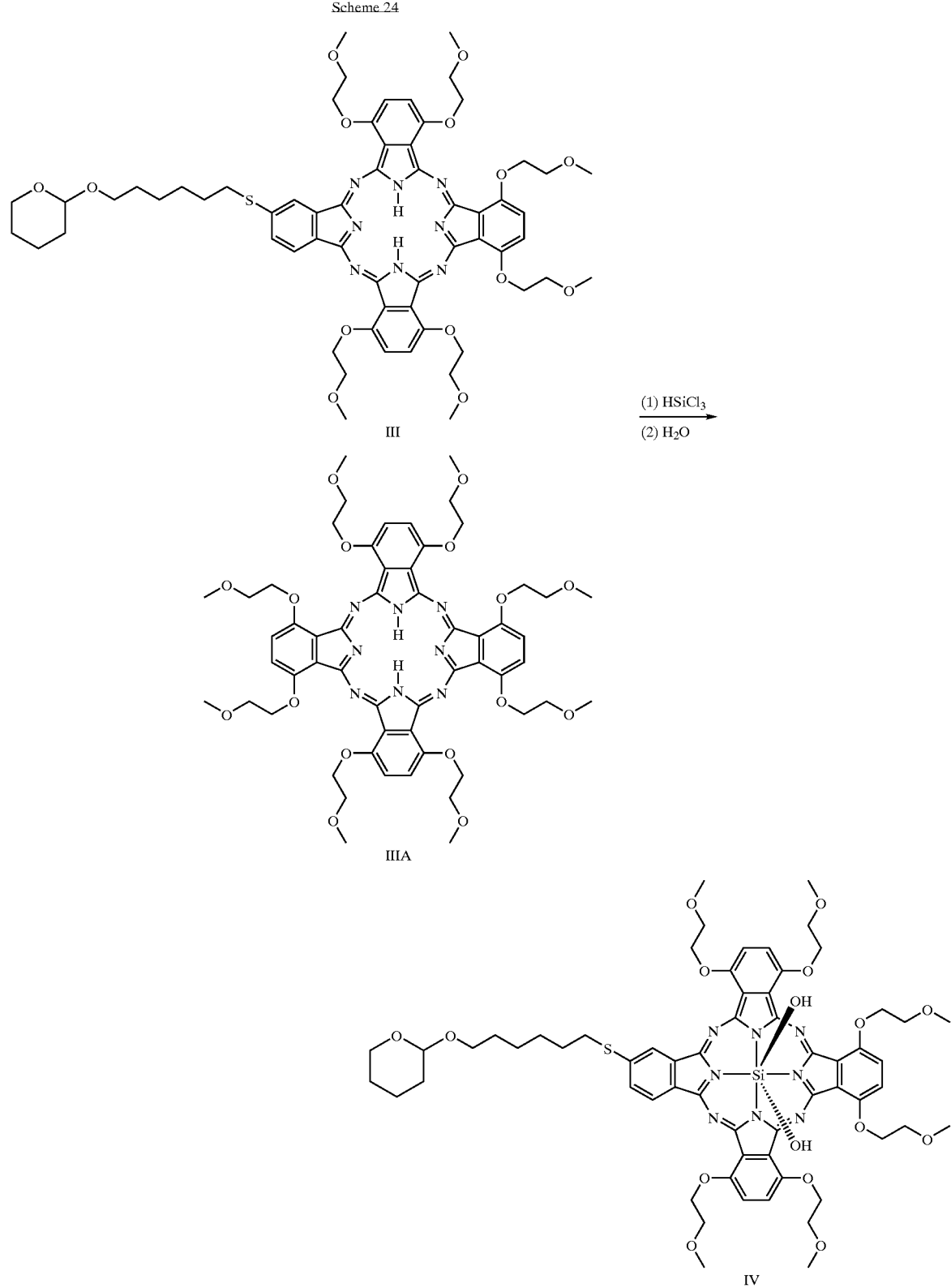

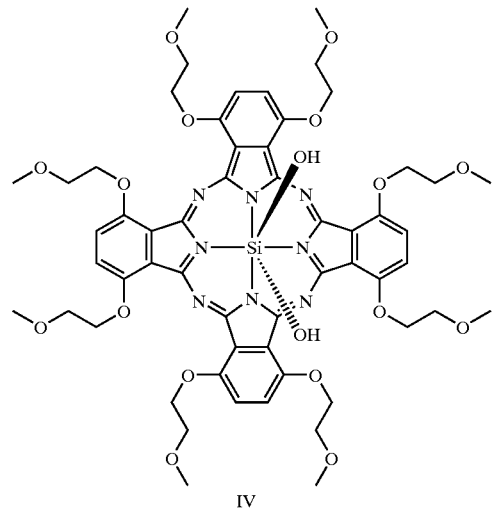

IV

Deprotecting reaction of phthalocyanine IV will release its alcohol functionality by using toluenesulfonic acid monohydrate to remove the tetrahydropyran. A further reaction with 1-butanol in pyridine will effectuate the phthalocyanine V capable of being isolated by chromatography from the rest of phthalocyanines, particularly the symmetrical phthalocyanine VA, Scheme 25.

Scheme 25

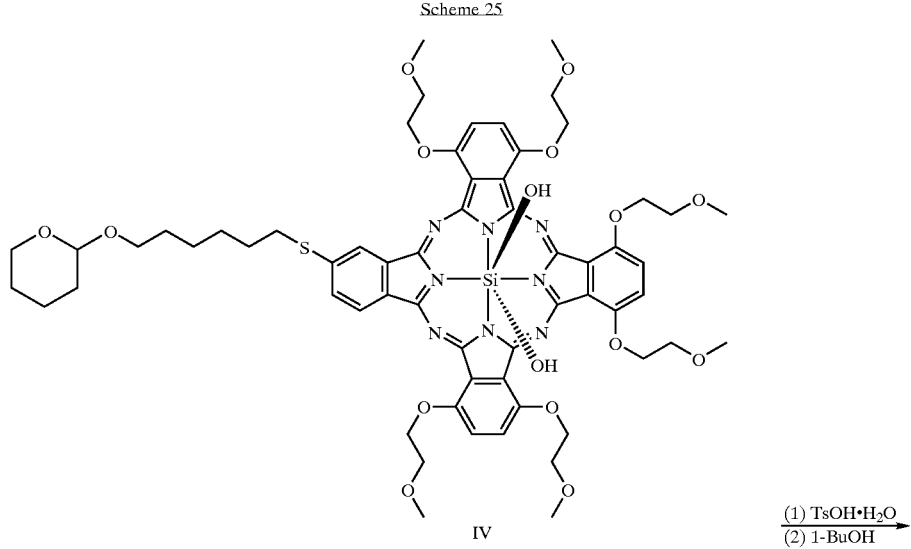

IV (1) TsOH·H₂O
(2) 1-BuOH

-continued
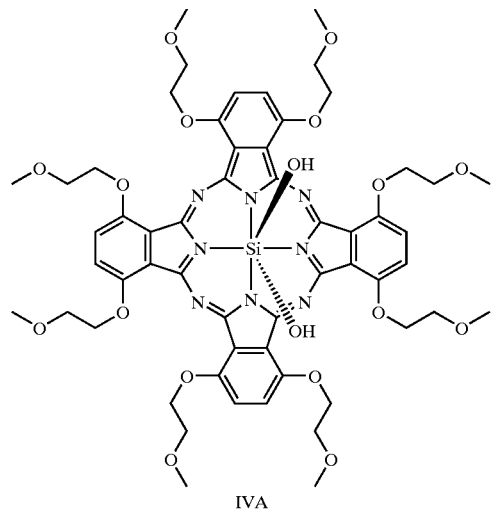
IVA
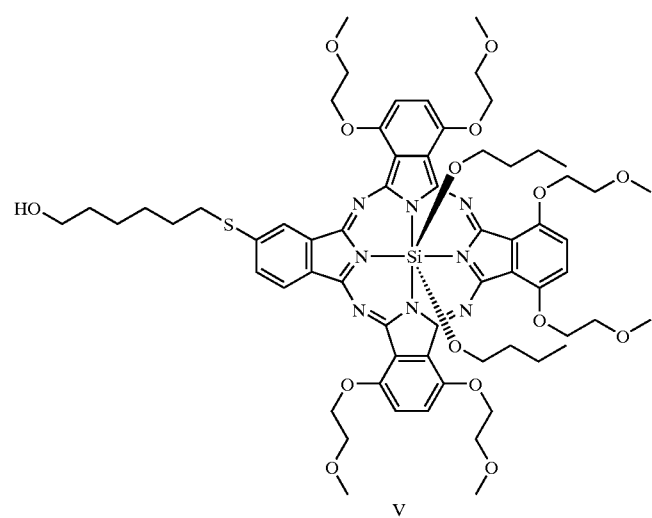
V
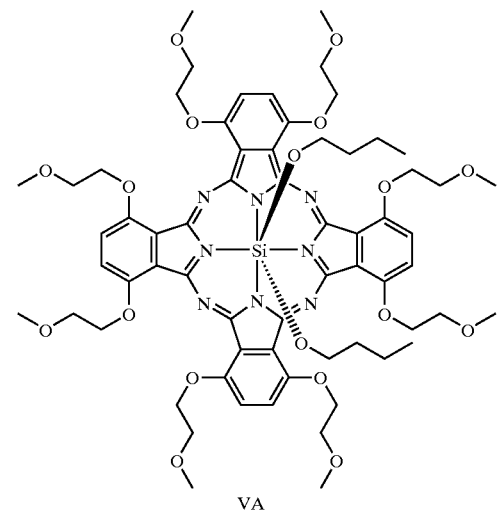
VA

Phthalocyanine VI can be made from phthalocyanine V by treating with ethoxysilane containing primary amine group, Scheme 26.

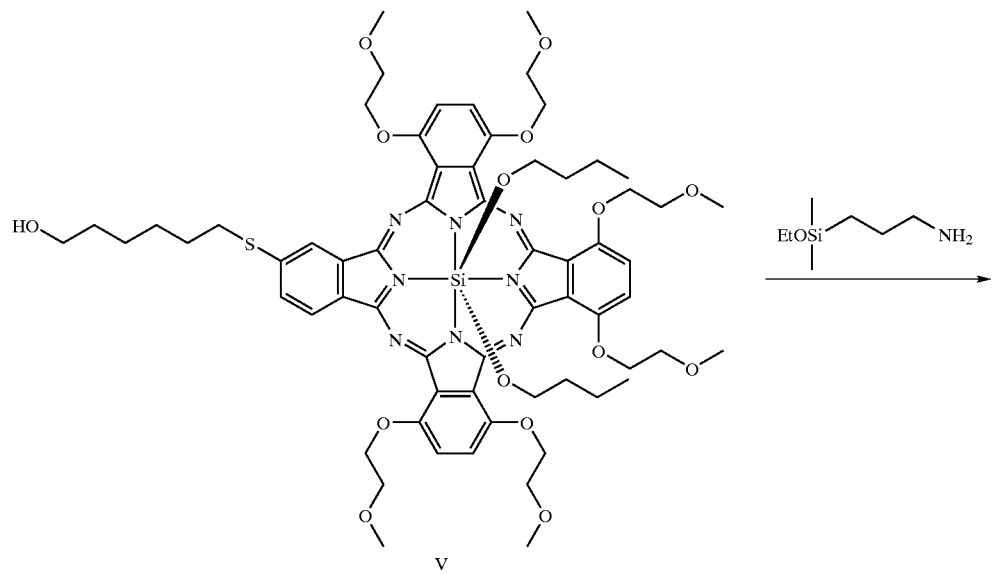

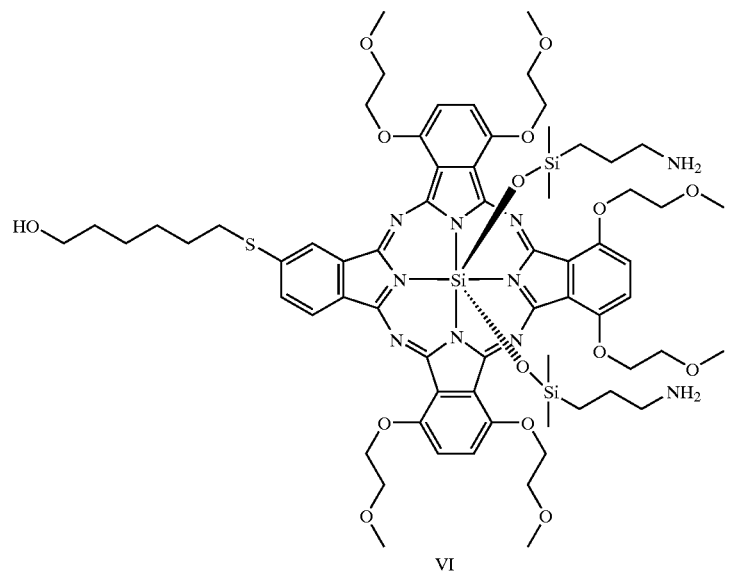

Phthalocyanine dye VI has both the alcohol group and two primary amine groups that are elements to make the final reactive/activated water-soluble dye. The primary amines on dye VI react with 1,3-propane sultone to introduce water-soluble sulfonate groups into the 10 dye structure (VII), Scheme 27. Since the alcohol is inerted in the sultone, the hydroxyl group can be preserved in this reaction. The water-soluble dye with alcohol functionality (VII) can thus be obtained.

Scheme 27
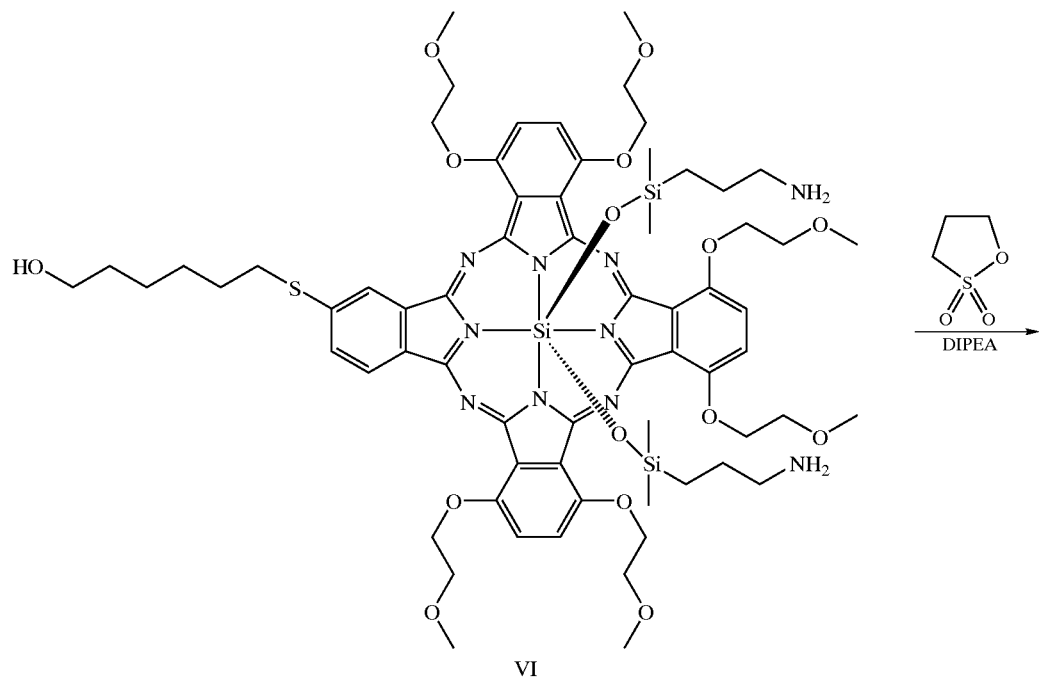
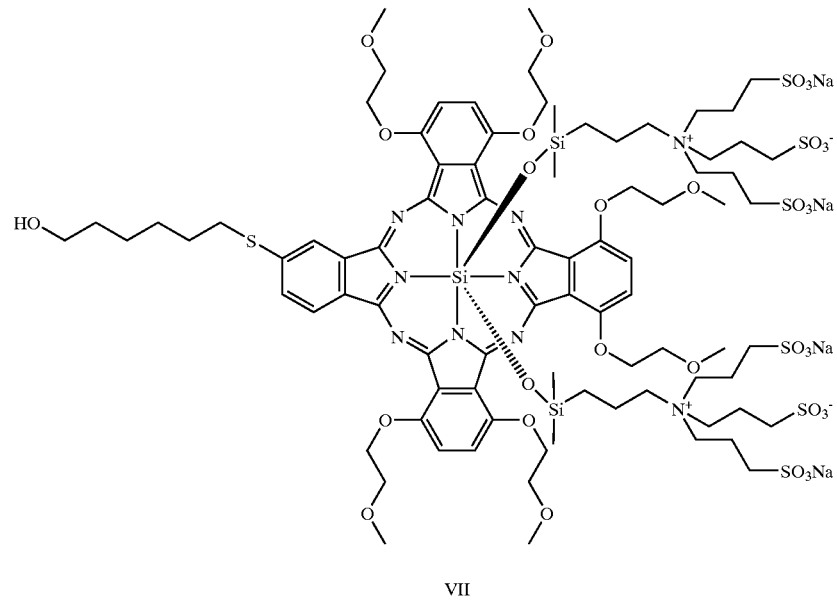
The water-soluble phthalocyanine dye VII has the alcohol group that can be activated to attach a variety of reactive groups for bio-conjugation. The alcohol activated phthalocyanine VIII can be synthesized, as shown in Scheme 28.

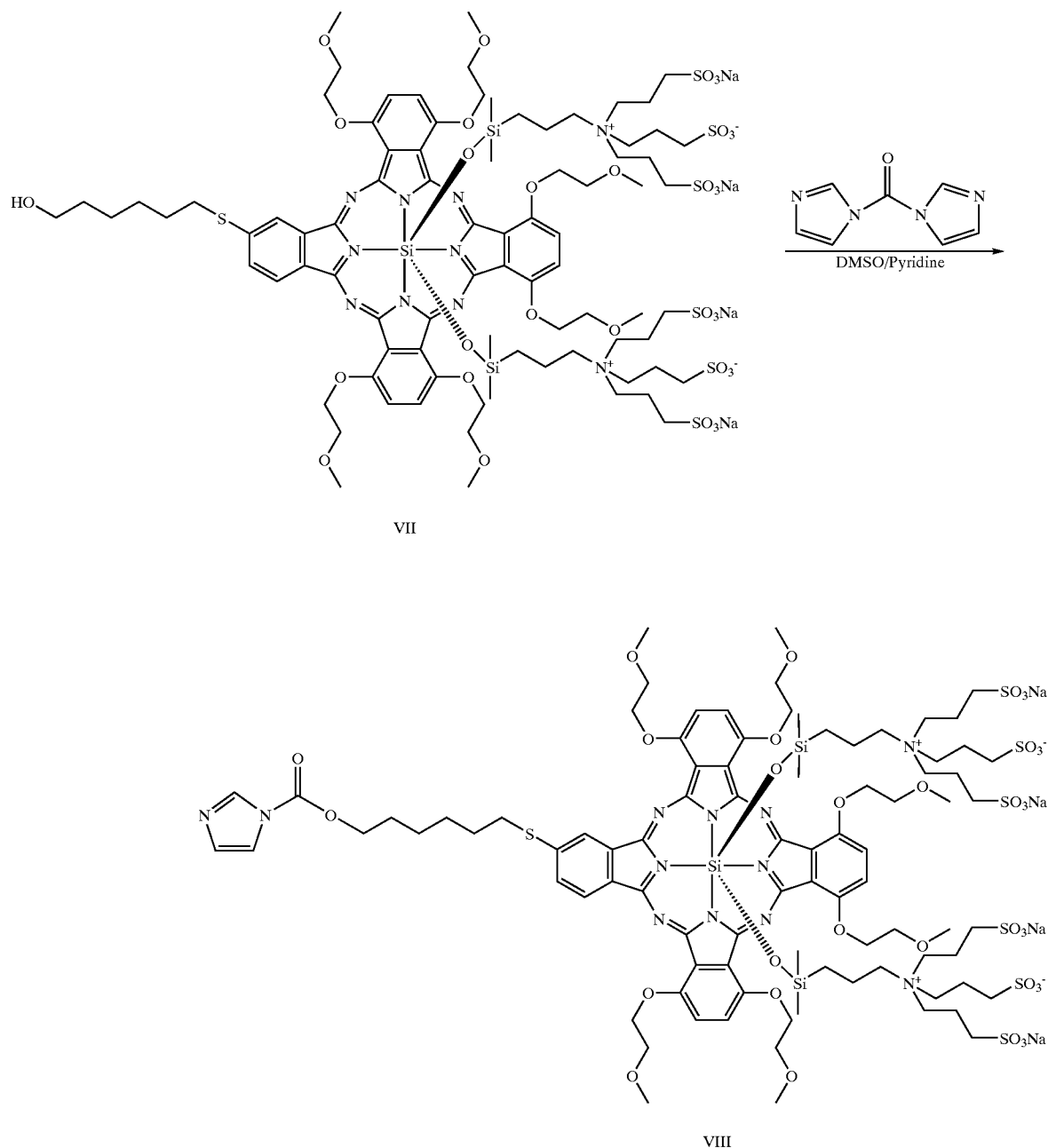

The carboxylate group, which is the precursor to make the useful NHS ester functionality for bioconjugation, can be attached to the phthalocyanine VIII by reacting aminocaproic acid salt with the imidazolyl carbamate group in phthalocyanine VIII, scheme 29.

The phthalocyanine NHS ester (X) can be made from phthalocyanine carboxylate (VIV) conveniently by reacting with disuccinimidyl carbonate (DSC), as shown in scheme 30.

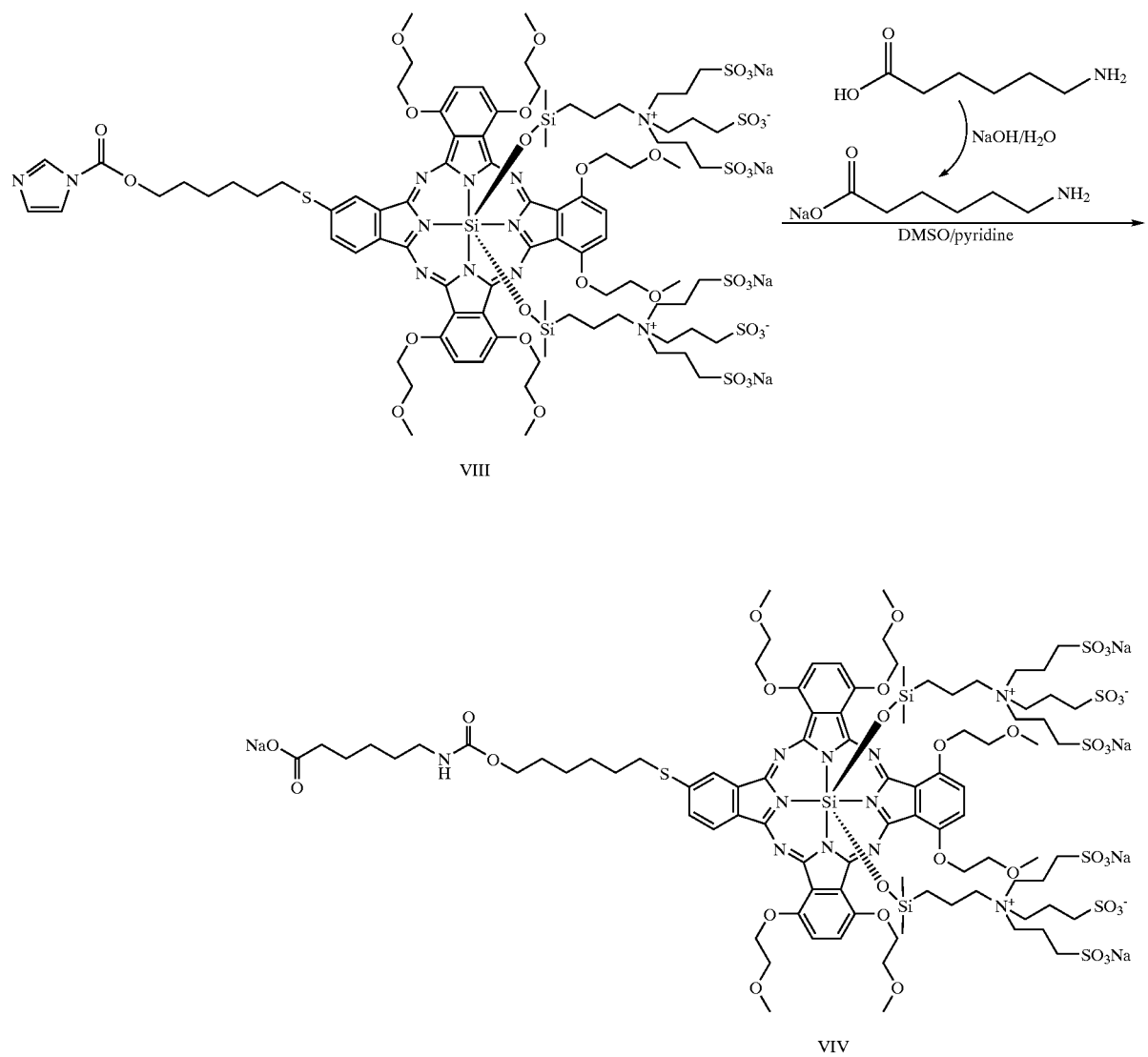

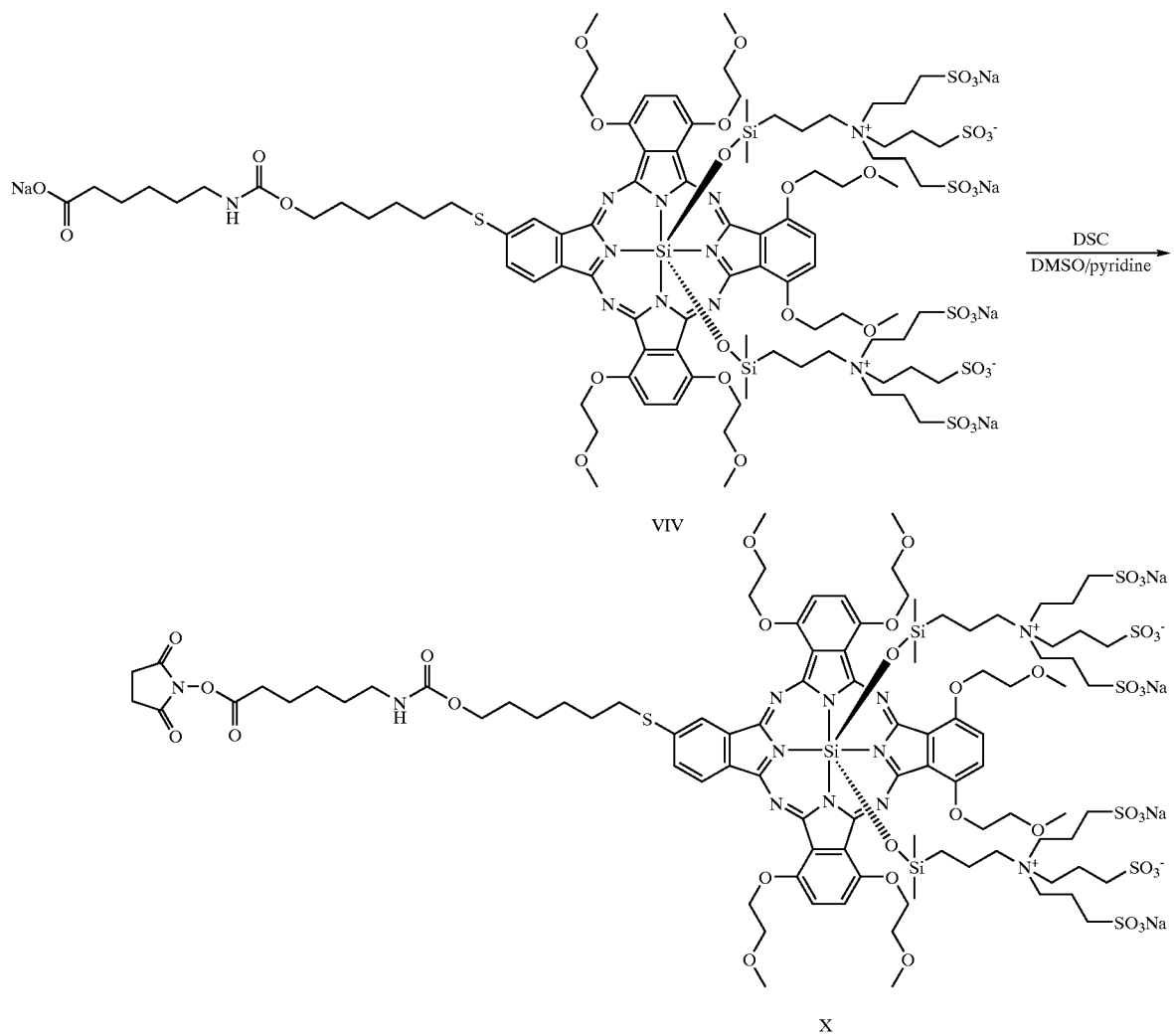

Example 4

This example illustrates a compound of the present invention wherein a dye is linked to a carbodiimide.

The PC680-CDI was prepared by reacting PCD680I NHS ester (I) with 10 equivalents of the 3-dimethylamino-1-propylamine in DMSO, and the product is precipitated in ether. The structure of the purified product (II) was confirmed by MS.

The final CDI product (below) can be prepared from II as described by Kimura et al. (EP 1 038 938) and used for labeling of DNA and RNA.

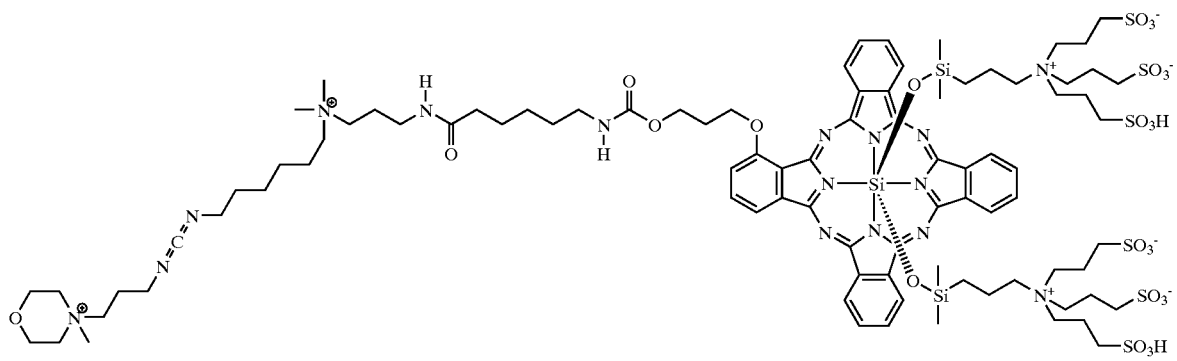

Example 5

This example illustrates a compound of the present invention wherein a dye is linked to biotin.

PC680-Biotin was synthesized via the route below. The amino-tethered biotin is purchased from Molecular Biosciences, and the NHS-ester activated PC680 is made as described herein. The identity of the product (PC680-Biotin) was confirmed by MS.

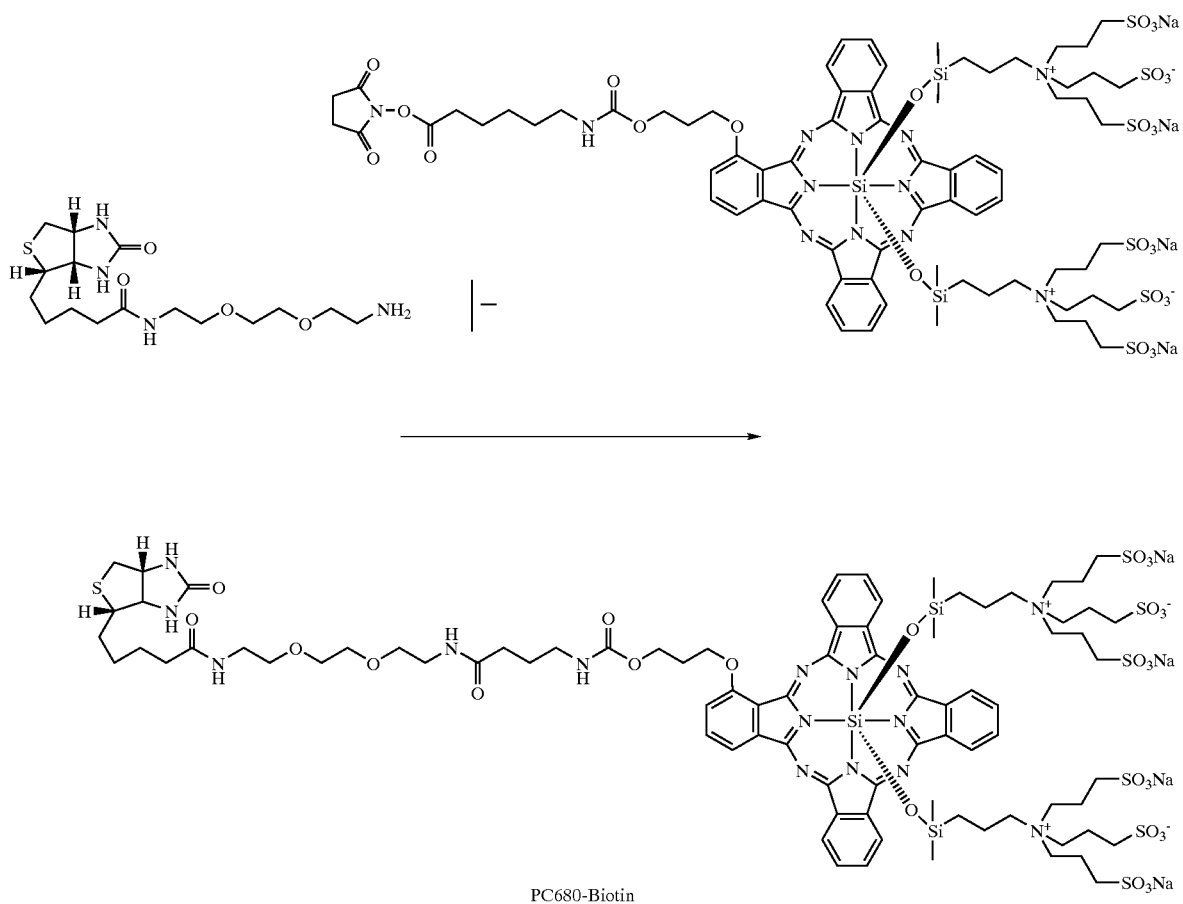

PC680-Biotin

Example 6

This example illustrates a convenient method for the preparation of a dye with a maleimide reactive group.

The amino maleimide (right, Molecular Biosciences, Inc. 4699 Nautilus Court, Boulder, Colo. 80301, catalog # 43911) is a convenient intermediate for the preparation of dyes with a maleimide reactive group. An imidazolyl carbamate, such as 8 (PCD680E Imc) can be directly converted to the maleimide carbamate with this reagent. In the same way, a dye NHS ester can be converted to a maleimide amide.

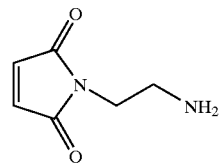
Using the above procedure, the following compounds are made:
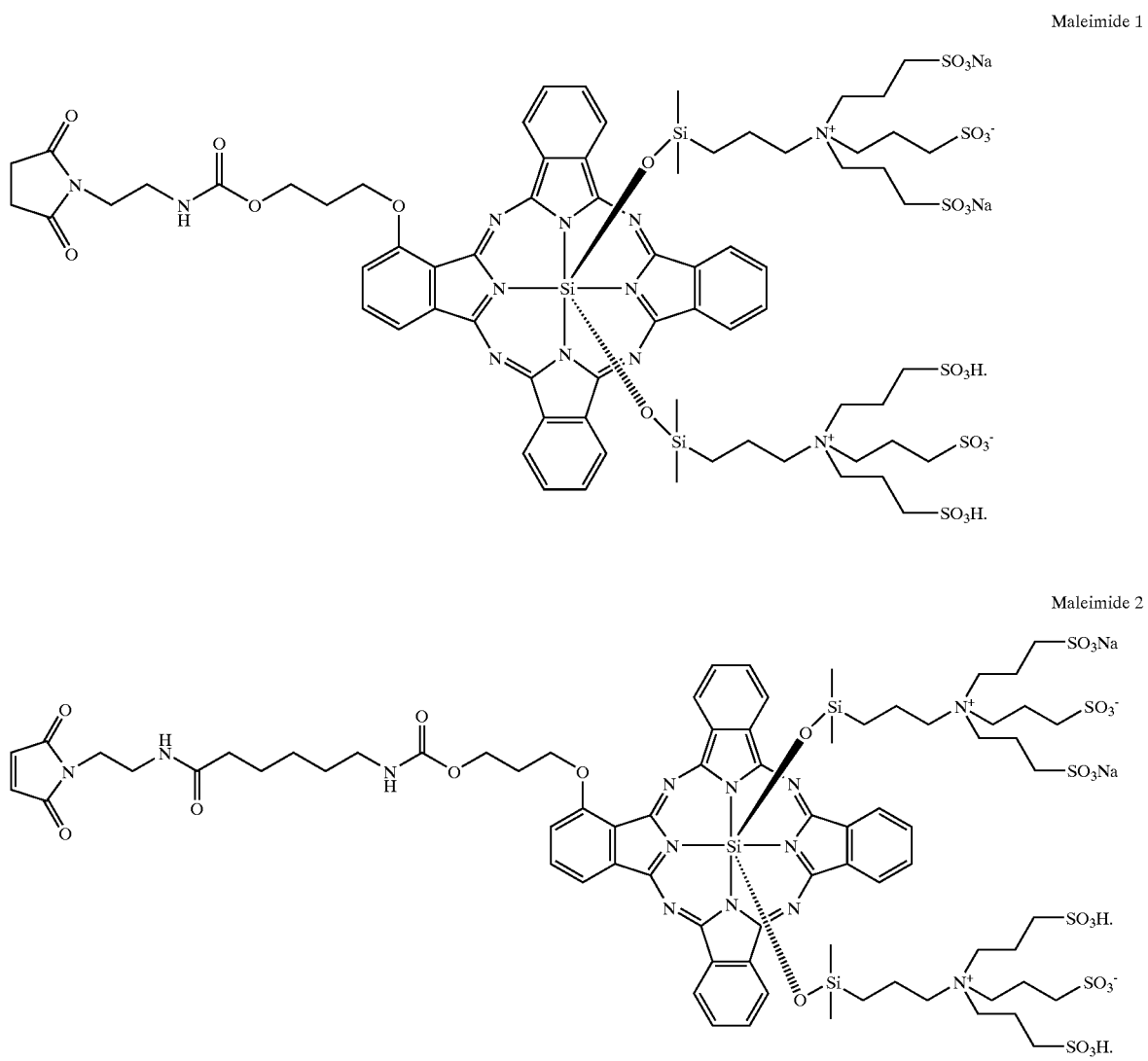

Example 7

This example illustrates a convenient method for the preparation of a dye with a biotin.

The scheme below is a convenient preparation of dyes with a biotin group. In this scheme, a dye NHS ester can be converted to a biotin amide.

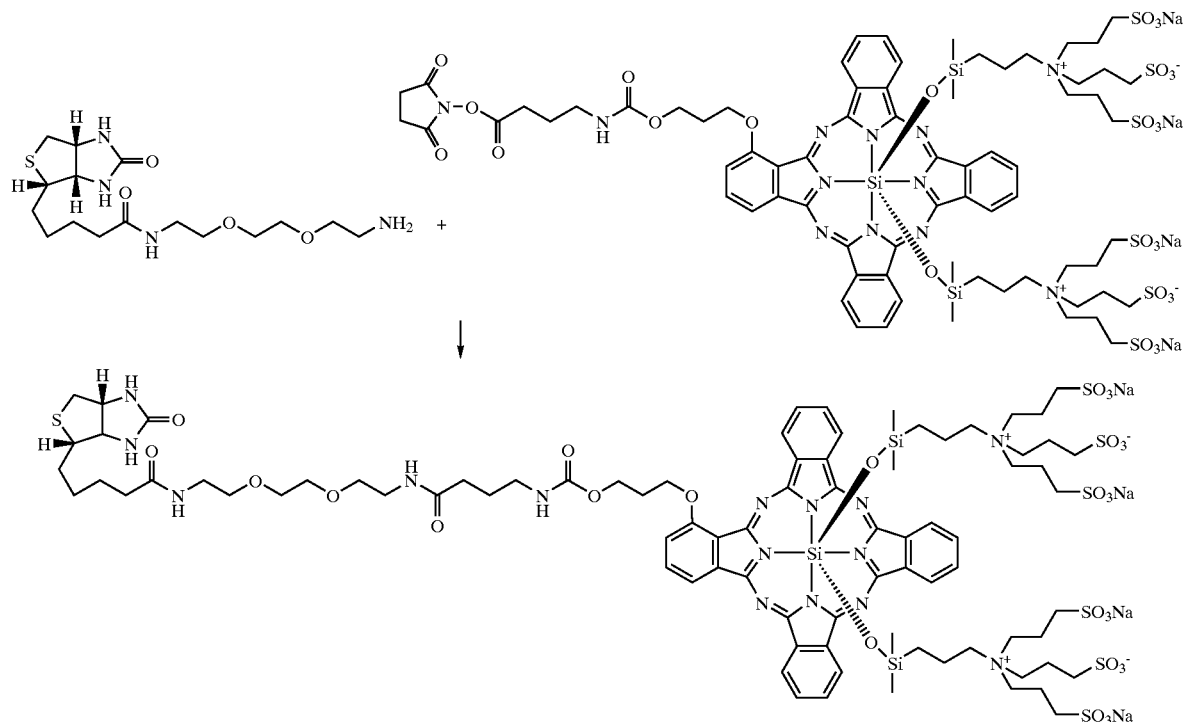

Example 8

This example illustrates the Evaluation of PC680 as an FP Probe.

Background. When a fluorophore is excited with polarized light, the resulting fluorescence is also polarized to a certain extent. The degree of polarization retained depends upon the properties of the fluorophore, and also the micro environment of the fluorophore in the system. In particular, molecular "tumbling" of the excited fluorophore (i.e. prior to emission) depolarizes the fluorescence. Consequently, fluorescence from a fluorophore attached to a large molecule or to a surface ("slow" or no tumbling) will be more polarized than that from "free dye" or from dye bound to a small probe molecule ("fast" tumbling).

Method. To evaluate the utility of Pc680 for FP assays a model system was devised as shown schematically below. If the PC680 is a good PF probe, then its FP reading should reflect the size of the protein to which it is conjugated. Here, a large protein, KLH, which has molecular weight in the range of 3MD to 7MD was selected.

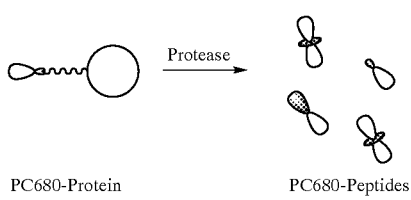

PC680-Protein      PC680-Peptides

The polarization will be at its maximum when dye is attached to the full-sized protein and should drop to something close to free dye polarization when the protease has done its work.

The KLH protein was conjugated with PC680-NHS ester, and the conjugate was purified through dialysis. The resulting D/P is just 0.45. Again, the D/P is intentionally made low to avoid the depolarization caused by the self-quenching by dyes on the same protein molecule.

The labeled protein was digested by a protease and this enzymatic reaction was stopped by addition of protease inhibitors at various reaction times. For each of these solutions, the FP value for the dye was determined.

Figure 5:
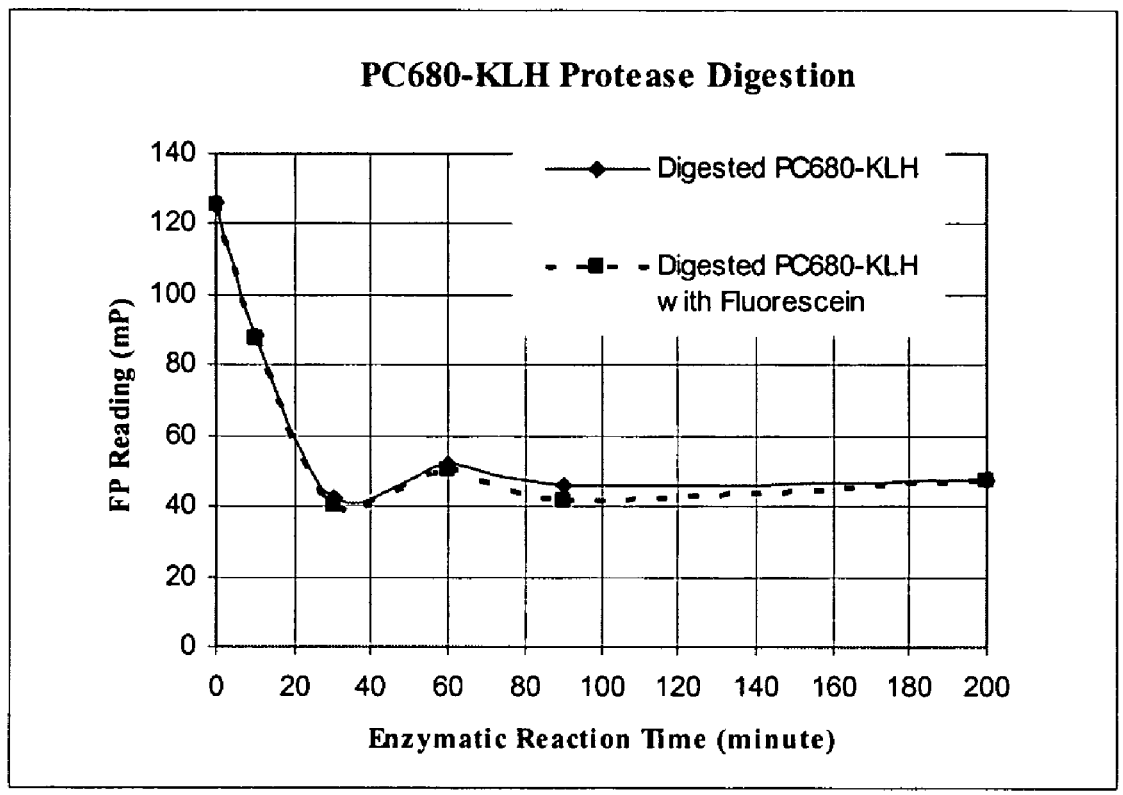
FIG. 5 shows the results of a compound of the present invention as a fluorescence polarization probe.

The dashed curve in FIG. 5 shows the results. Clearly PC680 shows a correlation between its FP and its host molecule's size. The dye has an "FP window" of at least 85 mP.

For FP assays based on visible fluorophores background fluorescence can be problematic. This should provide a "NIR advantage" for Pc680. To mimic the background problems for visible dyes in this system, free fluorescein was added to each of the solutions.

The close correspondence of the two curves demonstrates that Pc680 FP is practically unaffected by fluorescence background in the visible region. This result reveals the excellent attributes of PC680 as an IR-FP probe for assays/detection.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

36. The process of claim 25, wherein said compound has the formula:
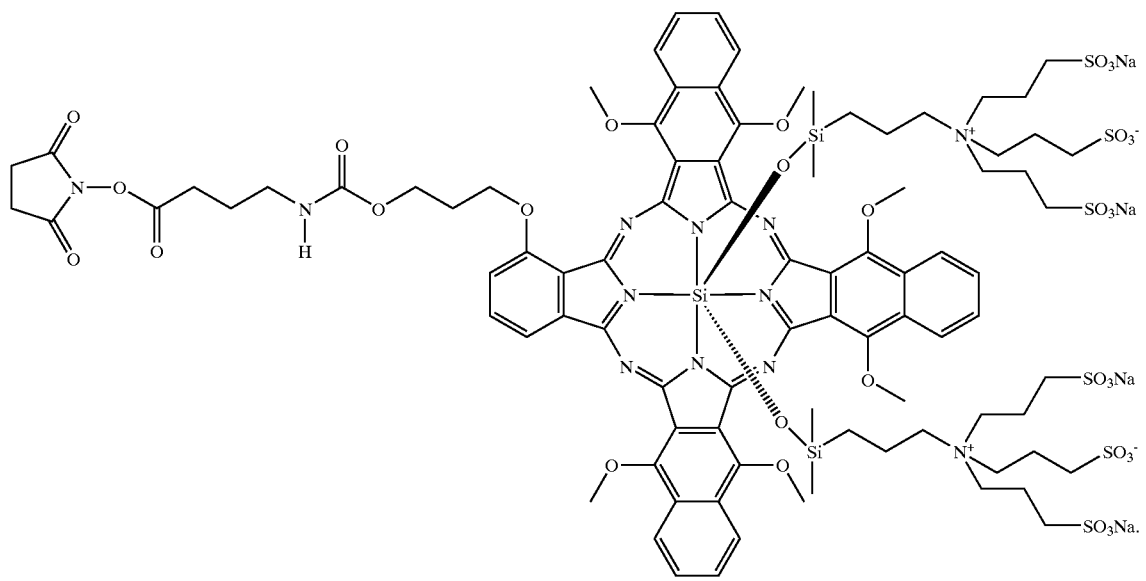

What is claimed is:

1. A phthalocyanine dye comprising a luminescent fluorophore moiety having at least one silicon containing aqueous-solubilizing moiety, wherein said phthalocyanine dye has a core atom selected from the group consisting of Si, Ge, Sn, and Al; wherein said phthalocyanine dye exists as a single core isomer, essentially free of other isomers; and has a reactive or activatible group.

2. The phthalocyanine dye of claim 1, wherein said core atom is Si.

3. The phthalocyanine dye of claim 2, wherein said dye has Formula I:

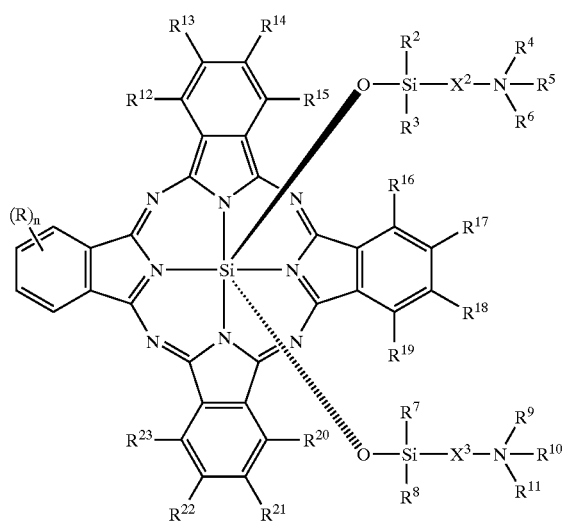

wherein:
R is a member selected from the group consisting of -L-Q and -L-$Z^1$;
L is a member selected from the group consisting of a direct link, or a covalent linkage, wherein said covalent linkage is linear or branched, cyclic or heterocyclic, saturated or unsaturated, having 1–60 atoms selected from the group consisting of C, N, P, O, and S, wherein L can have additional hydrogen atoms to fill valences, and wherein said linkage contains any combination of ether, thioether, amine, ester, carbamate, urea, thiourea, oxy or amide bonds; or single, double, triple or aromatic carbon-carbon bonds; or phosphorus-oxygen, phosphorus-sulfur, nitrogen-nitrogen, nitrogen-oxygen, or nitrogen-platinum bonds; or aromatic or heteroaromatic bonds;

Q is a reactive or an activatible group;

$Z^1$ is a material;

n is 1 or 2;

$R^2$, $R^3$, $R^7$, and $R^8$ are each independently selected from optionally substituted alkyl, and optionally substituted aryl;

$R^4$, $R^5$, $R^6$, $R^9$, $R^{10}$, and $R^{11}$, if present, are each members independently selected from the group consisting of hydrogen, optionally substituted alkyl, optionally substituted alkanoyl, optionally substituted alkoxycarbonyl, optionally substituted alkylcarbamoyl, and a chelating ligand, wherein at least one of $R^4$, $R^5$, $R^6$, $R^9$, $R^{10}$, and $R^{11}$ comprises a water soluble group;

$R^{12}$, $R^{13}$, $R^{14}$, $R^{15}$, $R^{16}$ $R^{17}$, $R^{18}$, $R^{19}$, $R^{20}$, $R^{21}$, $R^{22}$ and $R^{23}$ are each members independently selected from the group consisting of hydrogen, halogen, optionally substituted alkylthio, optionally substituted alkylamino and optionally substituted alkoxy, or in an alternative embodiment, at least one of i) $R^{13}$, $R^{14}$, and the carbons to which they are attached, or ii) $R^{17}$, $R^{18}$, and the carbons to which they are attached, or iii) $R^{21}$, $R^{22}$ and the carbons to which they are attached, join to form a fused benzene ring; and $X^2$ and $X^3$ are each members independently selected from the group consisting of $C_1$–$C_{10}$ alkylene optionally interrupted by a heteroatom, wherein if n is 1, the phthalocyanine may be substituted either at the 1 or 2 position and if n is 2, each R may be the same or different, or alternatively, they may join to form a 5- or 6-membered ring.

4. The phthalocyanine dye of claim 3, wherein said dye has

Formula Ia:

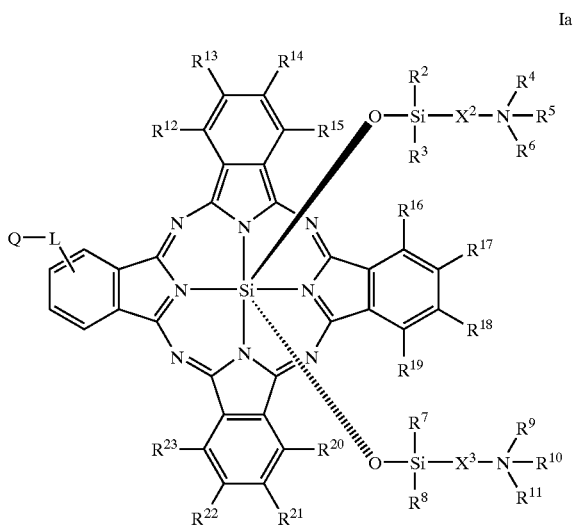

wherein: $R^2$, $R^3$, $R^7$, and $R^8$ are each independently selected from optionally substituted alkyl, and optionally substituted aryl;

$R^4$, $R^5$, $R^6$, $R^9$, $R^{10}$, and $R^{11}$, if present, are each members independently selected from the group consisting of hydrogen, optionally substituted alkyl, optionally substituted alkanoyl, optionally substituted alkoxycarbonyl, optionally substituted alkylcarbamoyl, wherein at least one of $R^4$, $R^5$, $R^6$, $R^9$, $R^{10}$, and $R^{11}$ comprises a water soluble group; and $R^{12}$, $R^{13}$, $R^{14}$, $R^{15}$, $R^{16}$ $R^{17}$, $R^{18}$, $R^{19}$, $R^{20}$, $R^{21}$, $R^{22}$ and $R^{23}$ are each members independently selected from the group consisting of hydrogen, halogen, optionally substituted alkylthio, optionally substituted alkylamino and optionally substituted alkoxy, or in an alternative embodiment, at least one of i) $R^{13}$, $R^{14}$, and the carbons to which they are attached, or ii) $R^{17}$, $R^{18}$, and the carbons to which they are attached, or iii) $R^{21}$, $R^{22}$ and the carbons to which they are attached, join to form a fused benzene ring.

5. The phthalocyanine dye of claim 4, wherein L is of the formula

—$R^1$—Y—$X^1$—$Y^1$— wherein $R^1$ is a bivalent radical or a direct link;

Y and $Y^1$ are each independently selected from the group consisting of a direct link, oxygen, an optionally substituted nitrogen and sulfur; and $X^1$ is a member selected from the group consisting of a direct link and $C_1$–$C_{10}$ alkylene optionally interrupted by a heteroatom.

6. The phthalocyanine dye of claim 5, wherein $R^1$ is a bivalent radical selected from the group consisting of optionally substituted alkylene, optionally substituted alkyleneoxycarbonyl, optionally substituted alkylenecarbamoyl, optionally substituted alkylenesulfonyl, optionally substituted alkylenesulfonylcarbamoyl, optionally substituted arylene, optionally substituted arylenesulfonyl, optionally substituted aryleneoxycarbonyl, optionally substituted arylenecarbamoyl, optionally substituted arylenesulfonylcarbamoyl, optionally substituted carboxyalkyl, optionally substituted carbamoyl, optionally substituted carbonyl, optionally substituted heteroarylene, optionally substituted heteroaryleneoxycarbonyl, optionally substituted heteroarylenecarbamoyl, optionally substituted heteroarylenesulfonylcarbamoyl, optionally substituted sulfonylcarbamoyl, optionally substituted thiocarbonyl, a optionally substituted sulfonyl, and optionally substituted sulfinyl.

7. The phthalocyanine dye of claim 5, wherein $R^2$, $R^3$, $R^7$, and $R^8$ are each independently selected from optionally substituted alkyl, and optionally substituted aryl, $R^4$, $R^5$, $R^6$, $R^9$, $R^{10}$, and $R^{11}$, if present, are each members independently selected from an optionally substituted alkyl, wherein at least two members of the group consisting of $R^4$, $R^5$, $R^6$, $R^7$, $R^8$, and $R^9$ comprise a water soluble functional group;

$R^{12}$, $R^{13}$, $R^{14}$, $R^{15}$, $R^{16}$ $R^{17}$, $R^{18}$, $R^{19}$, $R^{20}$, $R^{21}$, $R^{22}$ and $R^{23}$ are each hydrogen, halogen, optionally substituted alkylthio, optionally substituted alkylamino and optionally substituted alkoxy, or in an alternative embodiment, at least one of $R^{13}$, $R^{14}$, and the carbons to which they are attached, or $R^{17}$, $R^{18}$, and the carbons to which they are attached, or $R^{21}$, $R^{22}$ and the carbons to which they are attached, join to form a fused benzene ring;

$X^1$, $X^2$ and $X^3$ are each members independently selected from the group consisting of $C_1$–$C_{10}$ alkylene optionally interrupted by a heteroatom; and Y and $Y^1$ are each independently selected from the group consisting of a direct link, oxygen, an optionally substituted nitrogen and sulfur.

8. The phthalocyanine dye of claim 7, wherein $R^2$, $R^3$, $R^7$, and $R^8$ are each independently selected from optionally substituted methyl, ethyl, and isopropyl;

$R^4$, $R^5$, $R^6$, $R^9$, $R^{10}$, and $R^{11}$, if present, are each members independently selected from an optionally substituted alkyl, wherein at least two members of the group consisting of $R^4$, $R^5$, $R^6$, $R^7$, $R^8$, and $R^9$ comprise a substituent selected from the group consisting of a carboxylate (—$CO_2^-$) group, a sulfonate (—$SO_3^-$) group, a sulfonyl (—$SO_2^-$) group, a sulfate (—$SO_4^{-2}$) group, a hydroxyl (—OH) group, a phosphate (—$OPO_3^{-2}$) group, a phosphonate (—$PO_3^{-2}$) group, an amine (—$NH_2$) group and an optionally substituted quaternized nitrogen with each having an optional counter ion;

$R^{12}$, $R^{13}$, $R^{14}$, $R^{15}$, $R^{16}$ $R^{17}$, $R^{18}$, $R^{19}$, $R^{20}$, $R^{21}$, $R^{22}$ and $R^{23}$ are each hydrogen;

$X^1$, $X^2$ and $X^3$ are each members independently selected from the group consisting of $C_1$–$C_{10}$ alkylene optionally interrupted by a heteroatom; and Y and $Y^1$ are each independently selected from the group consisting of a direct link, oxygen, an optionally substituted nitrogen and sulfur.

9. The phthalocyanine dye of claim 4, wherein said dye has the formula:

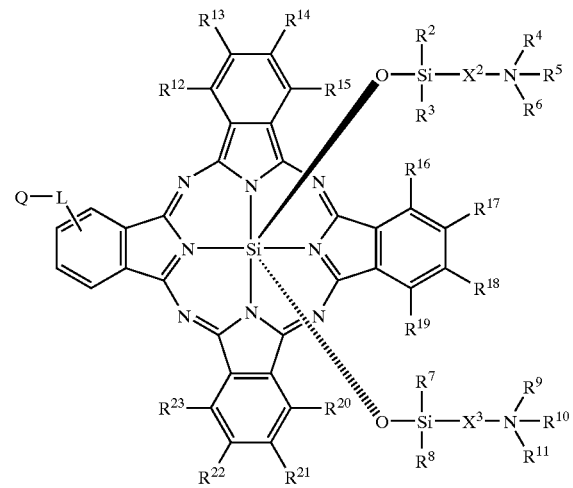

wherein Q is a reactive or an activatible group selected from the group consisting of an alcohol, an activated ester, an acyl halide, an alkyl halide, an optionally substituted amine, an anhydride, a carboxylic acid, a carbodiimide, hydroxyl, iodoacetamide, an isocyanate, an isothiocyanate, a maleimide, an NHS ester, a phosphoramidite, a platinum complex, a sulfonate ester, a thiol, and a thiocyanate.

10. The phthalocyanine dye of claim 9, wherein said compound has the formula:
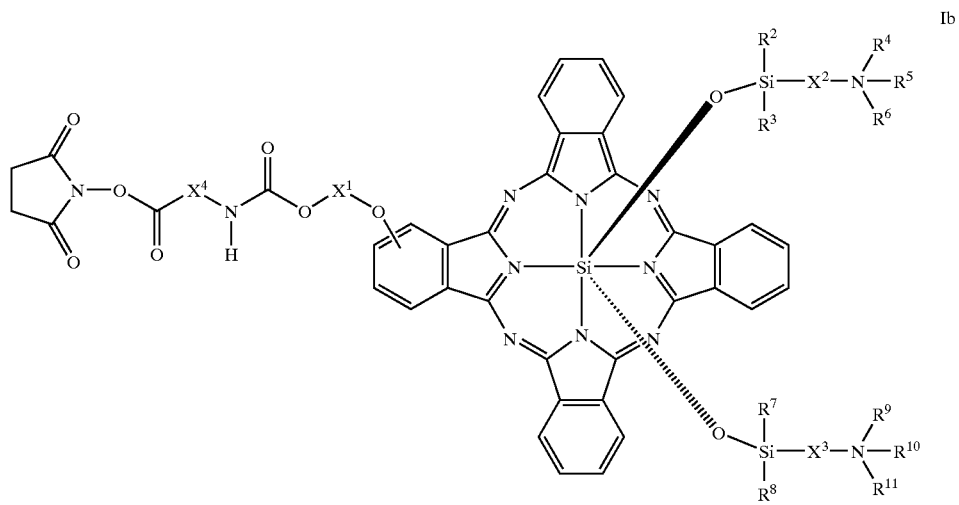
wherein $X^4$ is a $C_1$–$C_{10}$ alkylene optionally interrupted by a heteroatom.
11. The phthalocyanine dye of claim 10, wherein said compound has the formula:
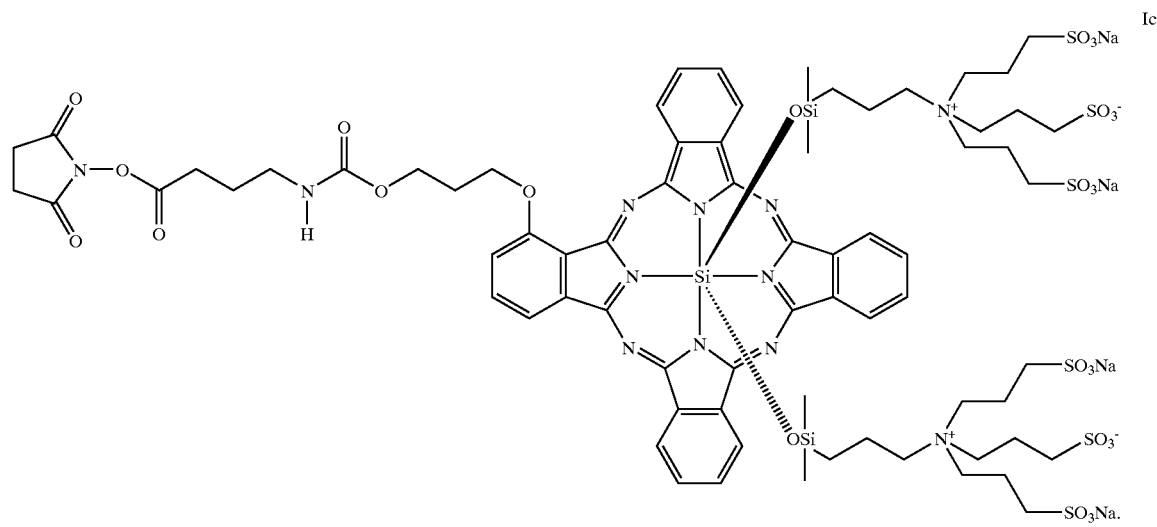

12. The phthalocyanine dye of claim 4, wherein said compound has the formula:
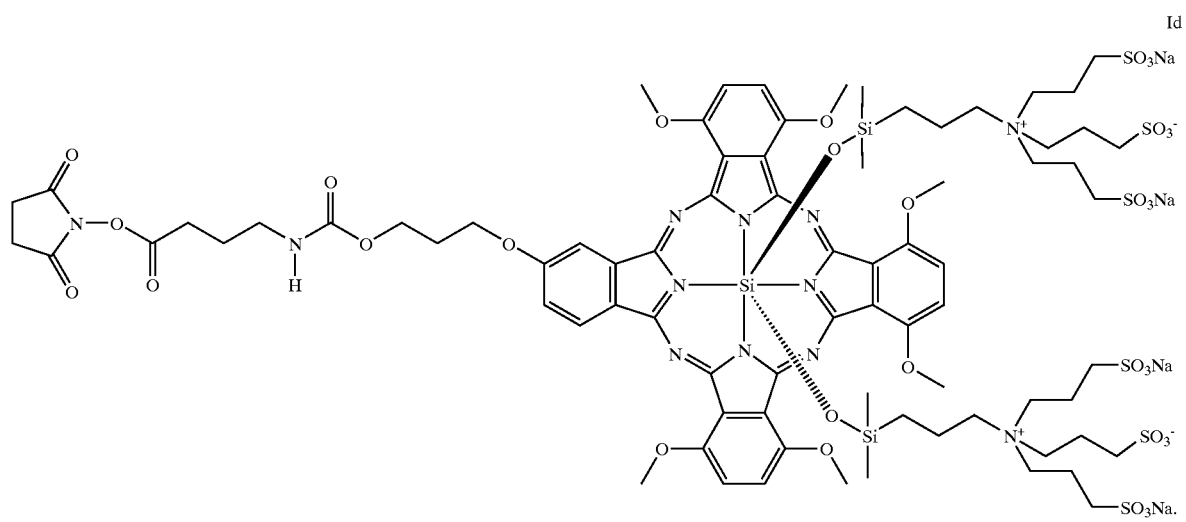
13. The phthalocyanine dye of claim 4, wherein said compound has the formula:
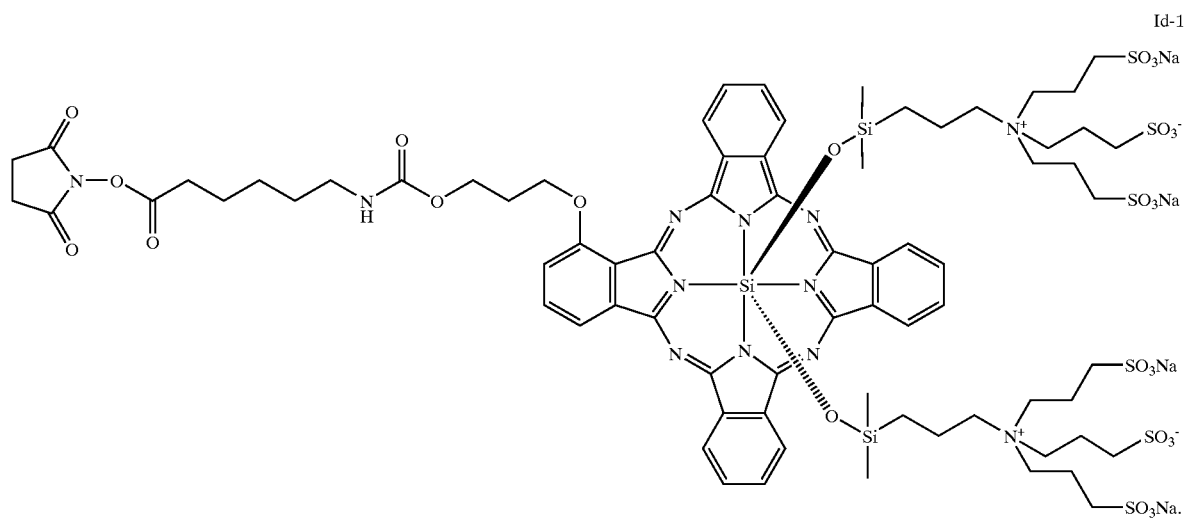

14. The phthalocyanine dye of claim 4, wherein said compound has the formula:
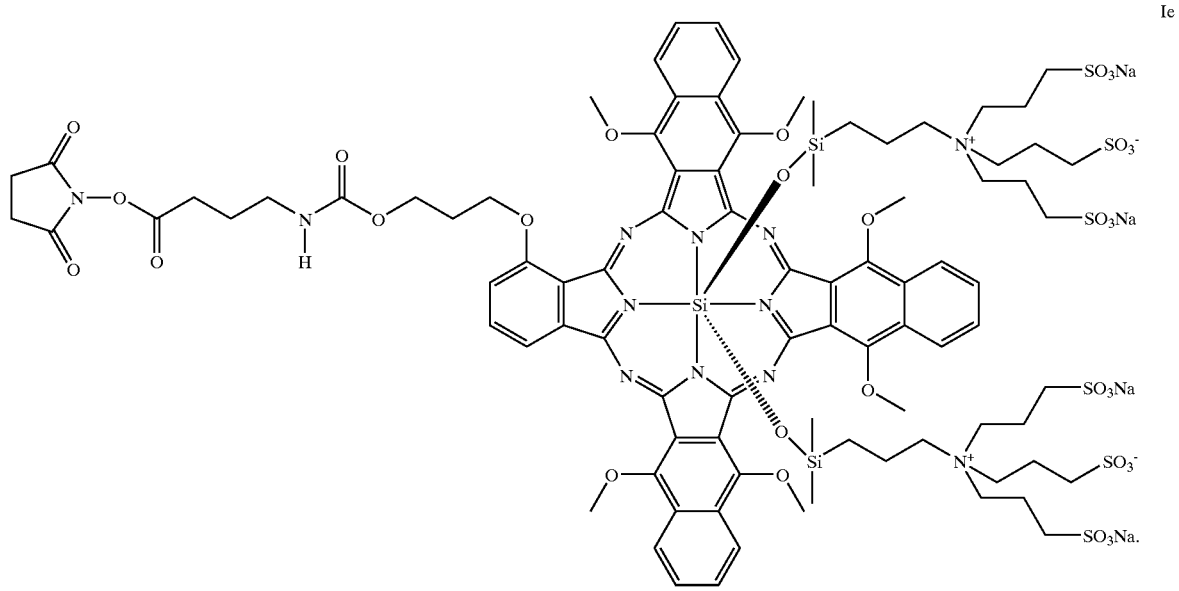
Ie
15. The phthalocyanine dye of claim 4, wherein said compound has the formula:
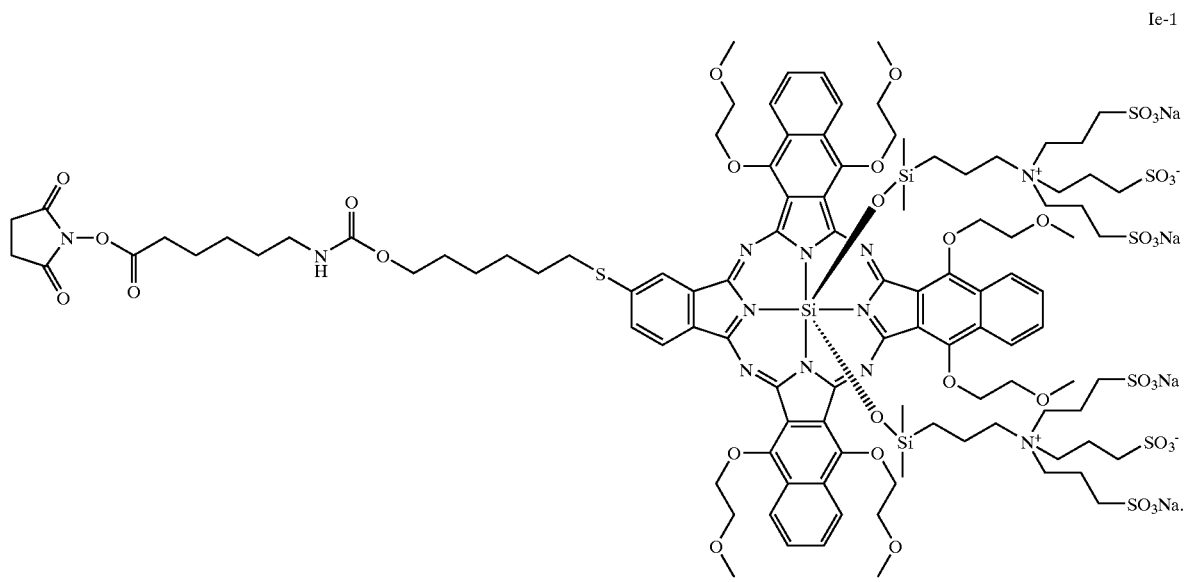
Ie-1

16. The phthalocyanine dye of claim 4, wherein said compound has the formula:

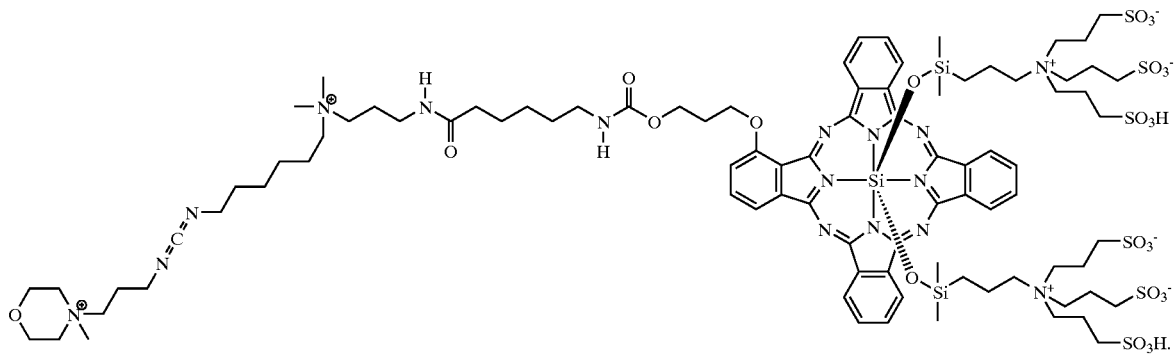

17. The phthalocyanine dye of claim 3, wherein said dye has the formula

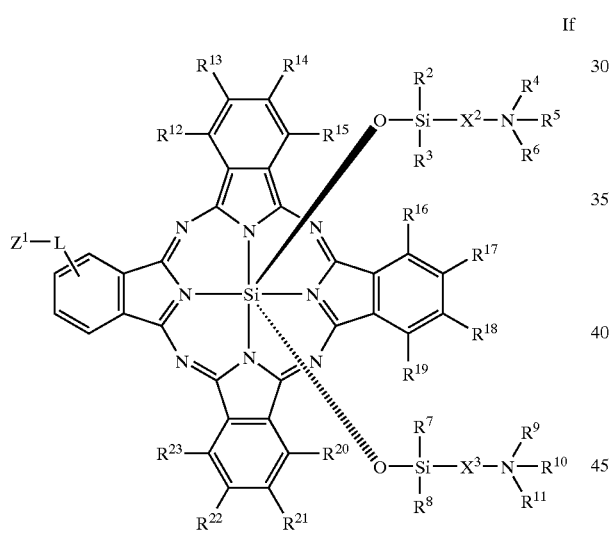

wherein:

$Z^1$ is a material;

L is a member selected from the group consisting of a direct link, or a covalent linkage, wherein said covalent linkage is linear or branched, cyclic or heterocyclic, saturated or unsaturated, having 1–60 atoms selected from the group consisting of C, N, P, O, and S, wherein L can have additional hydrogen atoms to fill valences, wherein said linkage contains any combination of ether, thiether, amine, ester, carbamate, urea, thiourea, oxy or amide bonds; or single, double, triple or aromatic carbon-carbon bonds; or phosphorus-oxygen, phosphorus-sulfur, nitrogen-nitrogen, nitrogen-oxygen, or nitrogen-platinum bonds; or aromatic or heteroaromatic bonds;

$R^2$, $R^3$, $R^7$, and $R^8$ are each independently selected from optionally substituted alkyl, and optionally substituted aryl;

$R^4$, $R^5$, $R^6$, $R^9$, $R^{10}$, and $R^{11}$, if present, are each members independently selected from the group consisting of hydrogen, optionally substituted alkyl, optionally substituted alkanoyl, optionally substituted alkoxycarbonyl, optionally substituted alkylcarbamoyl, and a chelating ligand, wherein at least one of $R^4$, $R^5$, $R^6$, $R^9$, $R^{10}$, and $R^{11}$ comprises a water soluble group;

$R^{12}$, $R^{13}$, $R^{14}$, $R^{15}$, $R^{16}$ $R^{17}$, $R^{18}$, $R^{19}$, $R^{20}$, $R^{21}$, $R^{22}$ and $R^{23}$ are each members independently selected from the group consisting of hydrogen, halogen, optionally substituted alkylthio, optionally substituted alkylamino and optionally substituted alkoxy, or in an alternative embodiment, at least one of i) $R^{13}$, $R^{14}$, and the carbons to which they are attached, or ii) $R^{17}$, $R^{18}$, and the carbons to which they are attached, or iii) $R^{21}$, $R^{22}$ and the carbons to which they are attached, join to form a fused benzene ring; and $X^2$ and $X^3$ are each members independently selected from the group consisting of $C_1$–$C_1$ alkylene optionally interrupted by a heteroatom.

18. The phthalocyanine dye of claim 17, wherein said material is a biomolecule;

L is of the formula:

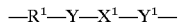

wherein $R^1$ is a bivalent radical or a direct link;

Y and $Y^1$ are each independently selected from the group consisting of a direct link, oxygen, an optionally substituted nitrogen and sulfur; p1 $X^1$ is a member selected from the group consisting of a direct link and $C_1$–$C_{10}$ alkylene optionally interrupted by a heteroatom;

$R^2$, $R^3$, $R^7$, and $R^8$ are each independently selected from optionally substituted alkyl, and optionally substituted aryl;

$R^4$, $R^5$, $R^6$, $R^9$, $R^{10}$, and $R^{11}$, if present, are each members independently selected from the group consisting of hydrogen, optionally substituted alkyl, optionally substituted alkanoyl, optionally substituted alkoxycarbonyl, optionally substituted alkylcarbamoyl, and a chelating ligand, wherein at least two of $R^4$, $R^5$, $R^6$, $R^9$, $R^{10}$, and $R^{11}$ comprises a water soluble group; and $R^{12}$, $R^{13}$, $R^{14}$, $R^{15}$, $R^{16}$ $R^{17}$, $R^{18}$, $R^{19}$, $R^{20}$, $R^{21}$, $R^{22}$ and $R^{23}$ are each members independently selected from the group consisting of hydrogen, halogen, optionally substituted alkylthio, optionally substituted alkylamino and optionally substituted alkoxy, or in an alternative embodiment, at least one of i) $R^{13}$, $R^{14}$, and the carbons to which they are attached, or ii) $R^{17}$, $R^{18}$, and the carbons to which they are attached, or iii) $R^{21}$, $R^{22}$ and the carbons to which they are attached, join to form a fused benzene ring.

19. The phthalocyanine dye of claim 18, wherein $R^1$ is a bivalent radical selected from the group consisting of optionally substituted alkylene, optionally substituted alkyleneoxycarbonyl, optionally substituted alkylenecarbamoyl, optionally substituted alkylenesulfonyl, optionally substituted alkylenesulfonylcarbamoyl, optionally substituted arylene, optionally substituted arylenesulfonyl, optionally substituted aryleneoxycarbonyl, optionally substituted arylenecarbamoyl, optionally substituted arylenesulfonylcarbamoyl, optionally substituted carboxyalkyl, optionally substituted carbamoyl, optionally substituted carbonyl, optionally substituted heteroarylene, optionally substituted heteroaryleneoxycarbonyl, optionally substituted heteroarylenecarbamoyl, optionally substituted heteroarylenesulfonylcarbamoyl, optionally substituted sulfonylcarbamoyl, optionally substituted thiocarbonyl, a optionally substitated sulfonyl, and optionally substituted sulfinyl.

20. The phthalocyanine dye of claim 18, wherein said biomolecule is a member selected from the group consisting of a small molecule, a marker, a cell, a liposome, a protein, a peptide, an enzyme substrate, a hormone, an antibody, an antigen, a hapten, an avidin, a streptavidin, biotin, a carbohydrate, an oligosaccharide, a polysaccharide, a nucleic acid, a deoxy nucleic acid, a fragment of DNA, a fragment of RNA, nucleotide triphosphates, acyclo terminator triphosphates, and PNA.

21. The phthalocyanine dye of claim 20, wherein said phthalocyanine dye has the formula:

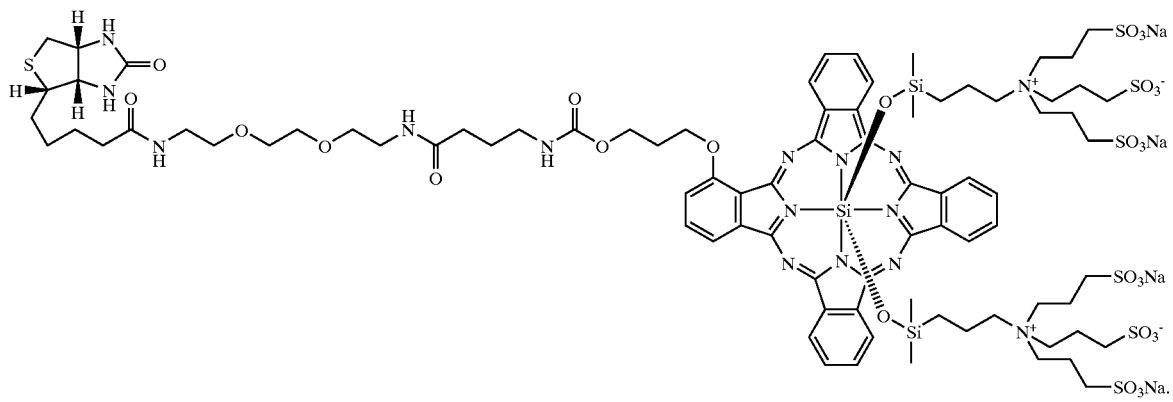

22. The phthalocyanine dye of claim 20, wherein said phthalocyanine dye has the formula:

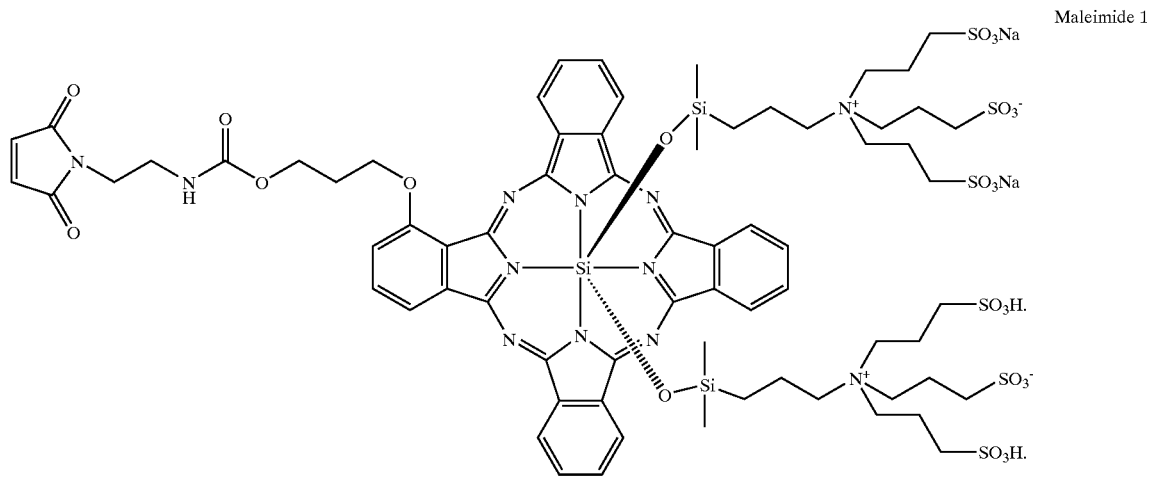

Maleimide 1

23. The phthalocyanine dye of claim 20, wherein said phthalocyanine dye has the formula:

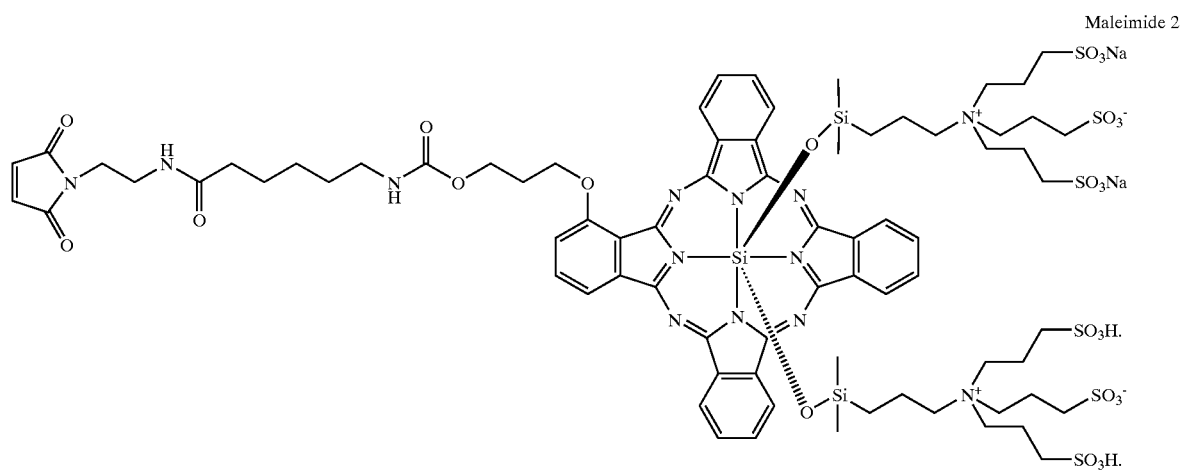

Maleimide 2

24. The phthalocyanine dye of claim 18, wherein the covalent linkage between L-$R^1$ is selected from the group consisting of a direct bond, an amide bond, an ester bond, an ether bond, an oxime bond, a phosphate ester bond, a sulfonamide bond, a thioether bond, a thiourea bond, and an urea bond.

25. A process for making a dye-labeled biomolecule, said method comprising:

contacting a biomolecule and an optional activating reagent with a compound having the formula:

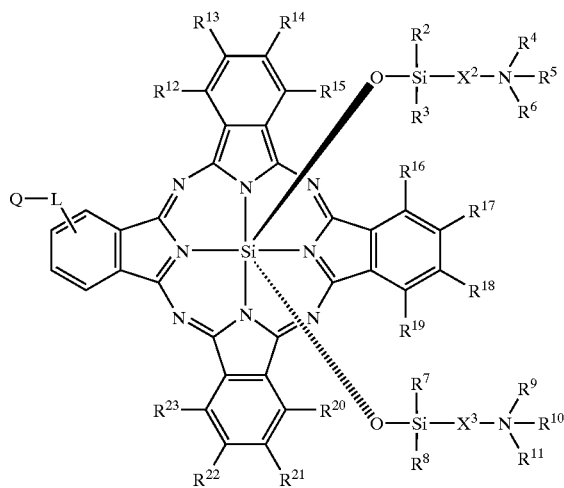

wherein:

L is a member selected from the group consisting of a direct link, or a covalent linkage, wherein said covalent linkage is linear or branched, cyclic or heterocyclic, saturated or unsaturated, having 1–60 atoms selected from the group consisting of C, N, P, O, and S, wherein L can have additional hydrogen atoms to fill valences, wherein said linkage contains any combination of ether, thioether, amine, ester, carbamate, urea, thiourea, oxy or amide bonds; or single, double, triple or aromatic carbon-carbon bonds; or phosphorus-oxygen, phosphorus-sulfur, nitrogen-nitrogen, nitrogen-oxygen, or nitrogen-platinum bonds; or aromatic or heteroaromatic bonds;

Q is a reactive or an activatible group;

$R^2$, $R^3$, $R^7$, and $R^8$ are each independently selected from optionally substituted alkyl, and optionally substituted aryl;

$R^4$, $R^5$, $R^6$, $R^9$, $R^{10}$, and $R^{11}$, if present, are each members independently selected from the group consisting of hydrogen, optionally substituted alkyl, optionally substituted alkanoyl, optionally substituted alkoxycarbonyl, optionally substituted alkylcarbamoyl, and a chelating ligand wherein at least one of $R^4$, $R^5$, $R^6$, $R^9$, $R^{10}$, and $R^{11}$ comprises a water soluble group;

$R^{12}$, $R^{13}$, $R^{14}$, $R^{15}$, $R^{16}$ $R^{17}$, $R^{18}$, $R^{19}$, $R^{20}$, $R^{21}$, $R^{22}$ and $R^{23}$ are each members independently selected from the group consisting of hydrogen, halogen, optionally substituted alkylthio, optionally substituted alkylamino and optionally substituted alkoxy, or in an alternative embodiment, at least one of i) $R^{13}$, $R^{14}$, and the carbons to which they are attached, or ii) $R^{17}$, $R^{18}$, and the carbons to which they are attached, or iii) $R^{21}$, $R^{22}$ and the carbons to which they are attached, join to form a fused benzene ring; and $X^2$ and $X^3$ are each members independently selected from the group consisting of $C_1$–$C_{10}$ alkylene optionally interrupted by a heteroatom, for sufficient time, thereby making a dye-labeled biomolecule.

26. The process of claim 25, wherein Q is a reactive or an activatible group selected from the group consisting of an alcohol, an activated ester, an acyl halide, an alkyl halide, an optionally substituted amine, an anhydride, a carboxylic acid, a carbodiimide, hydroxyl, iodoacetamide, an isocyanate, an isothiocyanate, a maleimide, an NHS ester, a phosphoramidite, a sulfonate ester, a thiol, and a thiocyanate.

27. The process of claim 25, wherein L is of the formula:

—$R^1$—Y—$X^1$—$Y^1$— wherein $R^1$ is a bivalent radical or a direct link;

Y and $Y^1$ are each independently selected from the group consisting of a direct link, oxygen, an optionally substituted nitrogen and sulfur;

$X^1$ is a member selected from the group consisting of a direct link and $C_1$–$C_{10}$ alkylene optionally interrupted by a heteroatom;

$R^2$, $R^3$, $R^7$, and $R^8$ are each independently selected from optionally substituted alkyl, and optionally substituted aryl;

$R^4$, $R^5$, $R^6$, $R^9$, $R^{10}$, and $R^{11}$, if present, are each members independently selected from the group consisting of hydrogen, optionally substituted alkyl, optionally substituted alkanoyl, optionally substituted alkoxycarbonyl, optionally substituted alkylcarbamoyl, and a chelating ligand, wherein at least two of $R^4$, $R^5$, $R^6$, $R^9$, $R^{10}$, and $R^{11}$ comprises a water soluble group; and $R^{12}$, $R^{13}$, $R^{14}$, $R^{15}$, $R^{16}$ $R^{17}$, $R^{18}$, $R^{19}$, $R^{20}$, $R^{21}$, $R^{22}$ and $R^{23}$ are each members independently selected from the group consisting of hydrogen, halogen, optionally substituted alkylthio, optionally substituted alkylamino and optionally substituted alkoxy, or in an alternative embodiment, at least one of i) $R^{13}$, $R^{14}$, and the carbons to which they are attached, or ii) $R^{17}$, $R^{18}$, and the carbons to which they are attached, or iii) $R^{21}$, $R^{22}$ and the carbons to which they are attached, join to form a fused benzene ring.

28. The process of claim 25, wherein $R^1$ is a bivalent radical selected from the group consisting of optionally substituted alkylene, optionally substituted alkyleneoxycarbonyl, optionally substituted alkylenecarbamoyl, optionally substituted alkylenesulfonyl, optionally substituted alkylenesulfonylcarbamoyl, optionally substituted arylene, optionally substituted arylenesulfonyl, optionally substituted aryleneoxycarbonyl, optionally substituted arylenecarbamoyl, optionally substituted arylenesulfonylcarbamoyl, optionally substituted carboxyalkyl, optionally substituted carbamoyl, optionally substituted carbonyl, optionally substituted heteroarylene, optionally substituted heteroaryleneoxycarbonyl, optionally substituted heteroarylenecarbamoyl, optionally substituted heteroarylenesulfonylcarbamoyl, optionally substituted sulfonylcarbamoyl, optionally substituted thiocarbonyl, a optionally substituted sulfonyl, and optionally substituted sulfinyl.

29. The process of claim 25, wherein $R^2$, $R^3$, $R^7$, and $R^8$ are each independently selected from optionally substituted alkyl, and optionally substituted aryl;

$R^4$, $R^5$, $R^6$, $R^9$, $R^{10}$, and $R^{11}$, if present, are each members independently selected from an optionally substituted alkyl, wherein at least two members of the group consisting of $R^4$, $R^5$, $R^6$, $R^7$, $R^8$, and $R^9$ comprise a water soluble functional group;

$R^{12}$, $R^{13}$, $R^{14}$, $R^{15}$, $R^{16}$ $R^{17}$, $R^{18}$, $R^{19}$, $R^{20}$, $R^{21}$, $R^{22}$ and $R^{23}$ are each hydrogen, halogen, optionally substituted alkylthio, optionally substituted alkylamino and optionally substituted alkoxy, or in an alternative embodiment, at least one of $R^{13}$, $R^{14}$, and the carbons to which they are attached, or $R^{17}$, $R^{18}$, and the carbons to which they are attached, or $R^{21}$, $R^{22}$ and the carbons to which they are attached, join to form a fused benzene ring;

$X^1$, $X^2$ and $X^3$ are each members independently selected from the group consisting of $C_1$–$C_{10}$ alkylene optionally interrupted by a heteroatom; and Y and $Y^1$ are each independently selected from the group consisting of a direct link, oxygen, an optionally substituted nitrogen and sulfur.

30. The process of claim 25, wherein $R^2$, $R^3$, $R^7$, and $R^8$ are each independently selected from optionally substituted methyl, ethyl, and isopropyl;

$R^4$, $R^5$, $R^6$, $R^9$, $R^{10}$, and $R^{11}$, if present, are each members independently selected from an optionally substituted alkyl, wherein at least two members of the group consisting of $R^4$, $R^5$, $R^6$, $R^7$, $R^8$, and $R^9$ comprise a substituent selected from the group consisting of a carboxylate ($-CO_2^-$) group, a sulfonate ($-SO_3^-$) group, a sulfonyl ($-SO_2^-$) group, a sulfate ($-SO_4^{-2}$) group, a hydroxyl ($-OH$) group, a phosphate ($-OPO_3^{-2}$) group, a phosphonate ($-PO_3^{-2}$) group, an amine ($-NH_2$) group and an optionally substituted quaternized nitrogen with each having an optional counter ion;

$R^{12}$, $R^{13}$, $R^{14}$, $R^{15}$, $R^{16}$ $R^{17}$, $R^{18}$, $R^{19}$, $R^{20}$, $R^{21}$, $R^{22}$ and $R^{23}$ are each hydrogen;

$X^1$, $X^2$ and $X^3$ are each members independently selected from the group consisting of $C_1$–$C_{10}$ alkylene optionally interrupted by a heteroatom; and Y and $Y^1$ are each independently selected from the group consisting of a direct link, oxygen, an optionally substituted nitrogen and sulfur.

31. The process of claim 25, wherein said compound has the formula:

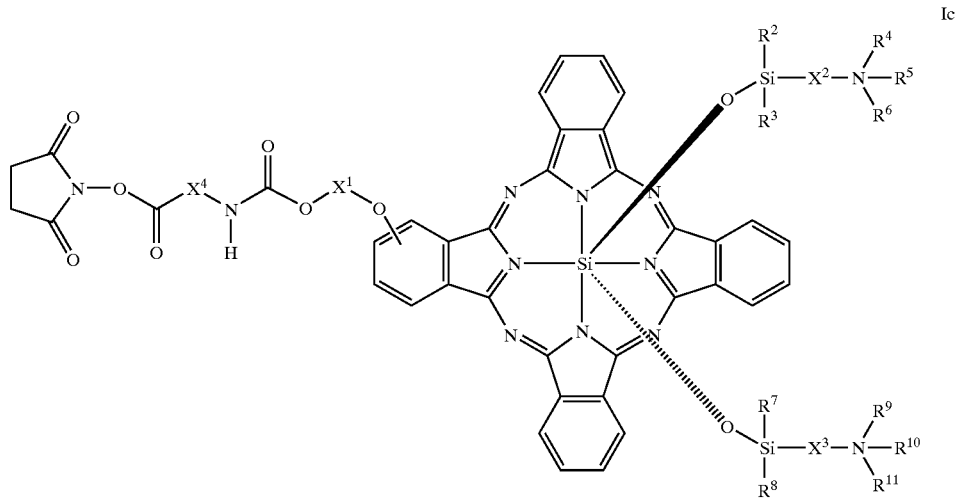

Ic wherein $X^4$ is a $C_1$–$C_{10}$ alkylene optionally interrupted by a heteroatom.

32. The process of claim 25, wherein said compound has the formula:
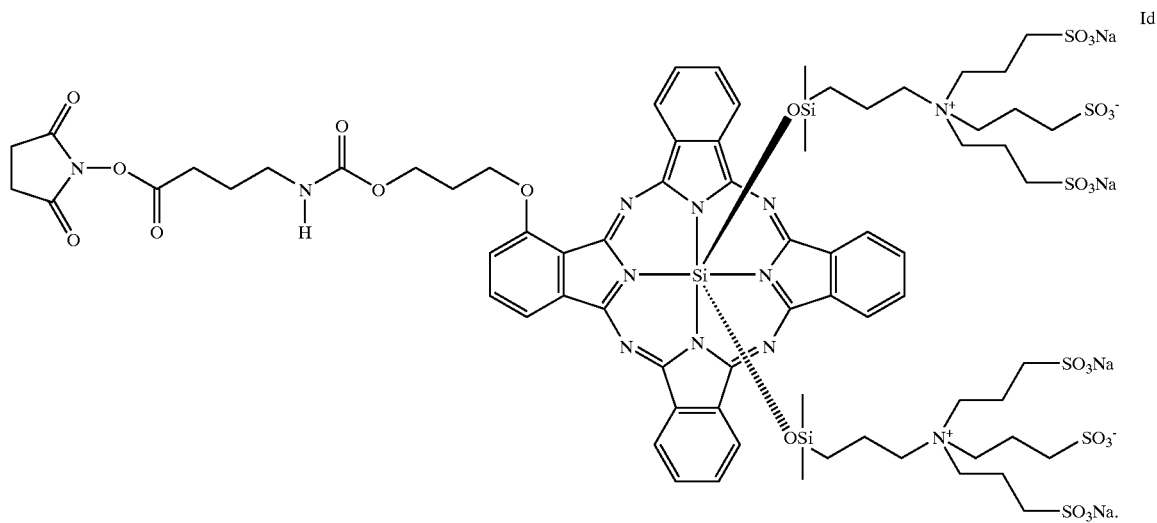
33. The process of claim 25, wherein said compound has the formula:
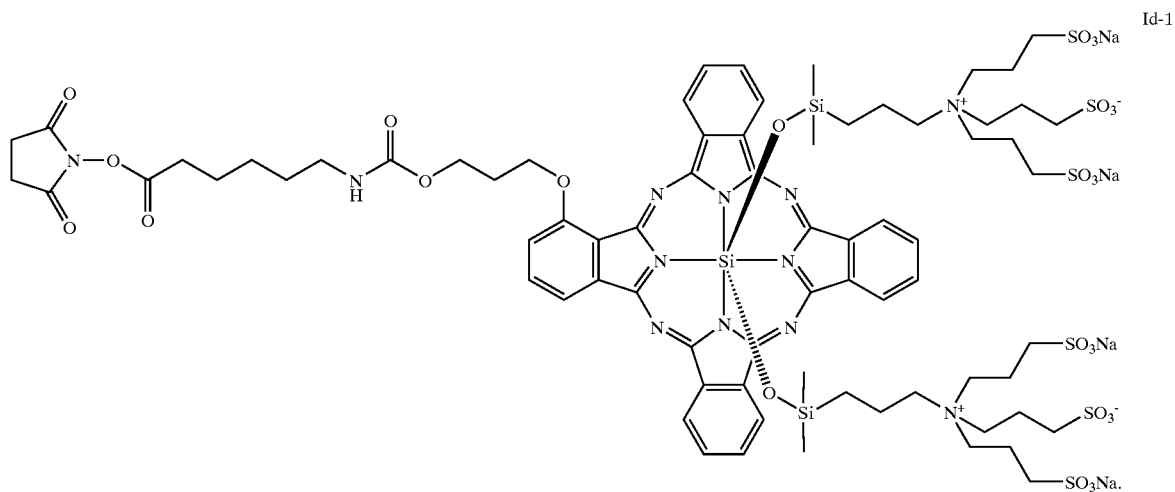

34. The process of claim 25, wherein said compound has the formula:
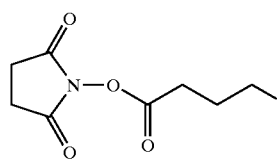 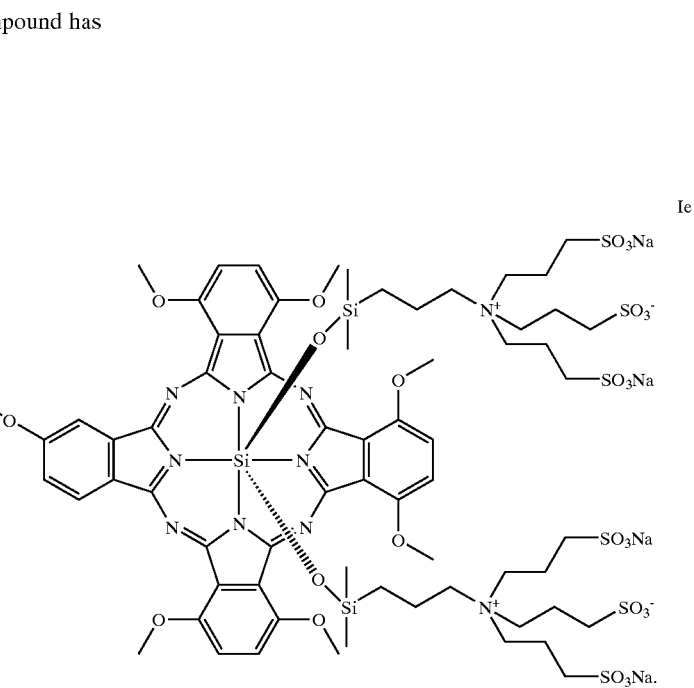
Ie
35. The process of claim 25, wherein said compound has the formula:
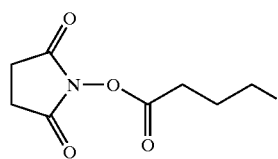 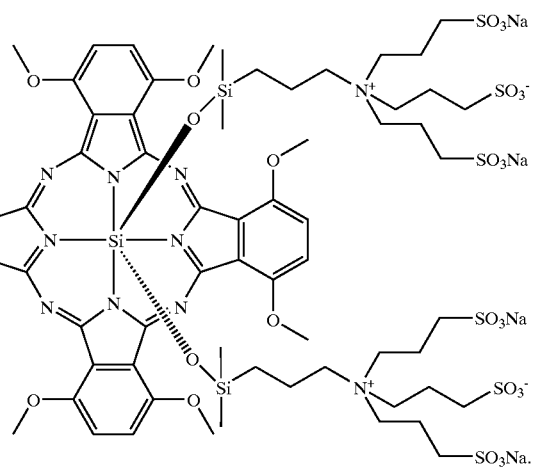
Ie-1